(12) United States Patent
Callahan

(10) Patent No.: US 10,214,904 B2
(45) Date of Patent: Feb. 26, 2019

(54) TRUSSES AND SIMILAR STRUCTURES

(71) Applicant: Michael Callahan, New York, NY (US)

(72) Inventor: Michael Callahan, New York, NY (US)

(*) Notice: Subject to any disclaimer, the term of this patent is extended or adjusted under 35 U.S.C. 154(b) by 0 days.

(21) Appl. No.: 15/614,902

(22) Filed: Jun. 6, 2017

(65) Prior Publication Data

US 2017/0350123 A1 Dec. 7, 2017

Related U.S. Application Data

(60) Provisional application No. 62/345,923, filed on Jun. 6, 2016.

(51) Int. Cl.
| | |
|---|---|
| *B62B 3/02* | (2006.01) |
| *E04C 3/08* | (2006.01) |
| *B62B 3/16* | (2006.01) |
| *F21V 21/088* | (2006.01) |
| *E04C 3/04* | (2006.01) |

(52) U.S. Cl.
CPC ............... *E04C 3/08* (2013.01); *B62B 3/02* (2013.01); *B62B 3/16* (2013.01); *B62B 2205/10* (2013.01); *E04C 2003/0495* (2013.01); *F21V 21/088* (2013.01)

(58) Field of Classification Search
None
See application file for complete search history.

(56) References Cited

U.S. PATENT DOCUMENTS

| | | |
|---|---|---|
| 3,554,318 A | 1/1971 | Knight |
| 3,631,941 A | 1/1972 | Greenman et al. |
| 4,152,834 A | 5/1979 | Stansberry |
| 4,862,336 A | 8/1989 | Richardson et al. |
| 4,884,658 A | 12/1989 | Banfield |
| 5,086,872 A | 2/1992 | Lin |
| 5,237,792 A | 8/1993 | Oberman et al. |
| 5,278,742 A | 1/1994 | Garrett |
| 5,279,387 A | 1/1994 | Swiderski et al. |
| 5,333,434 A | 8/1994 | Oberman et al. |
| 5,335,467 A | 8/1994 | Oberman et al. |

(Continued)

OTHER PUBLICATIONS

James L. Moody, Lighting Trusses on Tour, article, Theatre Crafts, magazine, Rodale Press, Feb. 1982, vol. 10, No. 2, pp. 28, 29, 60-63.

(Continued)

*Primary Examiner* — James A Shriver, II
*Assistant Examiner* — Hilary L Johns
(74) *Attorney, Agent, or Firm* — Davidson, Davidson & Kappel, LLC

(57) ABSTRACT

A truss structure is suitable for supporting lighting fixtures or other loads both in use and in transport. The truss has at least four elongated chords defining between said chords a first volume generally rectangular in cross-section. In transport, the truss is supported substantially above a surface by castered carriages bearing upon that surface, the carriages connected to said truss and in a first position producing an additional volume between said first volume and said surface. The carriages are attached to the truss so as to permit their rotation between said first position and at least a second position suitable for use while remaining connected to said truss.

9 Claims, 55 Drawing Sheets

(56) References Cited

U.S. PATENT DOCUMENTS

| | | | |
|---|---|---|---|
| 5,335,468 A * | 8/1994 | Oberman | A63J 1/02 182/186.6 |
| 5,432,691 A | 7/1995 | Garrett | |
| 5,711,131 A | 1/1998 | Thomas | |
| 6,026,626 A * | 2/2000 | Fisher | E04C 3/08 52/28 |
| 6,321,501 B1 | 11/2001 | Ignash | |
| 7,703,401 B2 | 4/2010 | Davis et al. | |
| 8,028,488 B2 | 10/2011 | Dodd | |
| 8,099,913 B1 | 1/2012 | Dodd | |
| 8,517,397 B2 | 8/2013 | Gross | |
| 8,757,641 B2 | 6/2014 | Gross | |
| 8,850,774 B2 | 10/2014 | Kempf et al. | |
| 8,893,443 B2 | 11/2014 | Davis | |
| 2004/0187426 A1 | 9/2004 | Callahan | |
| 2005/0130806 A1* | 6/2005 | Lopez | A63B 21/00047 482/38 |
| 2006/0133079 A1 | 6/2006 | Callahan | |
| 2009/0173033 A1 | 7/2009 | Baxter, Jr. | |
| 2010/0163340 A1* | 7/2010 | Allred, III | E04C 3/40 182/108 |
| 2013/0075993 A1 | 3/2013 | Christie et al. | |

OTHER PUBLICATIONS

James L. Moody, Concert Lighting : Techniques, Art, and Business, book, First Edition, 1989, Focal Press, Newton MA, Chapter 11, pp. 79-91.
James L. Moody, Concert Lighting : Techniques, Art, and Business, book, Second Edition, 1998, Focal Press, Newton MA, Chapter 12, pp. 122-134.
James L. Moody, Concert Lighting : Techniques, Art, and Business, book, Third Edition, 2010, Focal Press, Oxford UK, Chapter 13, pp. 131-142, xi, xiii.
Anthony R. Phelps, "Lighting Session Lineup, Award Winner Announced", Sightlines, periodical, Oct. 2005, United States Institute for Theatre Technology, Inc, vol. XLV, No. 10, pp. 1-2.
XSF Truss Systems, Product Cut Sheets: X-SL-26-BP.PDF, X-SL-26-FE.PDF, X-SL-30-FE.PDF, X-SL-36-FE-HD. PDF, X-SL-36-FE.PDF, undated, one page each.
James Thomas Engineering, Moving Light Truss Systems, online download Mar. 2018, as formatted, 6 pages.
Total Structures, Intelligent Pre-rig Truss Cut Sheet, online download Mar. 2018, one page.
Total Structures, Intelligent Pre-rig Truss Specialist Products page, online download Mar. 2018, one page.
Photographs, Tait Towers PAR Truss, by the applicant, early 1980s, 2 views.
Tomcat Global, online catalog, download Mar. 2018, 142 pages.
Tomcat Global, Swing 30×30 Truss download Mar. 2018, 2 pages, 64 and 65.
Photograph, "OB Swing" Truss, current, by the applicant.
Steven Armstrong, "Inside the Amish Town that builds U2, Lady Gaga, and Taylor Swift's live shows", archived article, Wired UK, Jan. 5, 2018, as formatted 20 pages.
Production Resource Group, Bat 30" Pre-rig Truss System online download Mar. 2018, 2 pages.
Christie Lites, Trussing F Type (Track) Blk 7' 10" Truss TRUF0-00 online download Mar. 2018, one page.
Tyler Truss Systems, "GT" Truss online download Mar. 2018, one page.
Tyler Truss Systems, Tyler "True-Fold" (TFT) Truss online download, Mar. 2018, one page.
Mike Wharton, "Tyler Truss Systems", online article, Projection Light Sound & Staging News, Nov. 9, 2017, as formatted four pages.
Photograph, Robin Flood Benefit truss preparation, May 22, 2007.
Up-Right Scaffolding, Truss Drawing L-3001-00, Sheet 3 of 3, date-stamped May 14, 1980.
Up-Right Scaffolding, Truss Drawing L-3001-1—Sheet 1 of 8, date-stamped May 14, 1980.
Up-Right Scaffolding Truss Drawing L-3001-1—Sheet 2 of 3, date-stamped May 14, 1980.
TTR Productions, "Main Frame Lighting Truss" brochure and "Dense Pack" insert, undated, 5 pages.
Canadian Institute for Theatre Technology, News Column, "Christie Lites appoints Arcofab as preferred truss supplier", Dec. 6, 2012, as formatted 3 pages.
Little Giant Ladders, About Us, online download Mar. 2018, as formatted 2 pages.
Arcofab, Prerigged 1424-0485_000—Prerigged, drawing, dated Oct. 26, 2012, one page.
Arcofab, Prerigged 1424-096S 11940-A-003_000, drawing, dated Oct. 26, 2012, one page.
Arcofab, "eng_3" catalog Oct. 2010, 79 pages.
"OB New Design—Folding Truss Span Ratings w—dated footer", engineering notice, apparent dates in footer, one page.

* cited by examiner

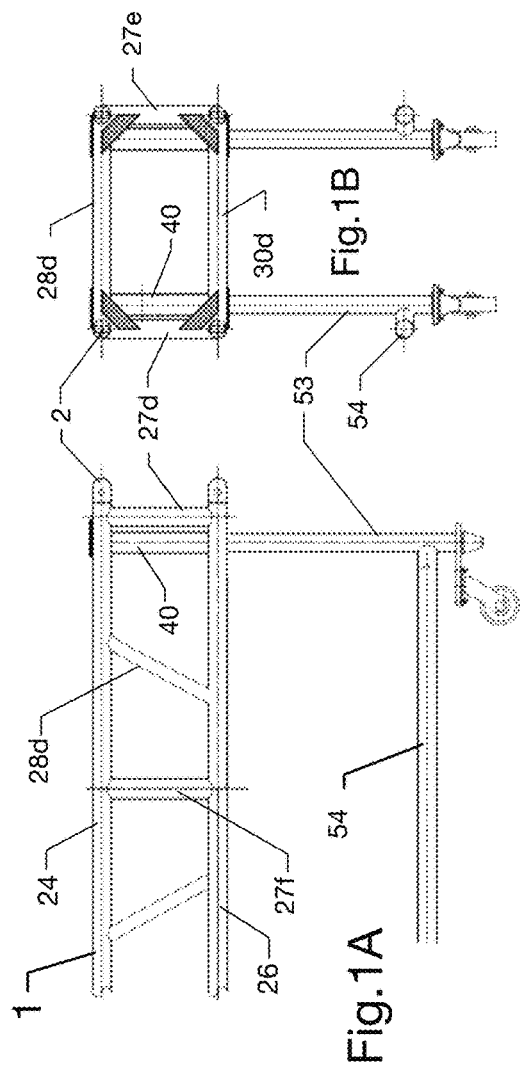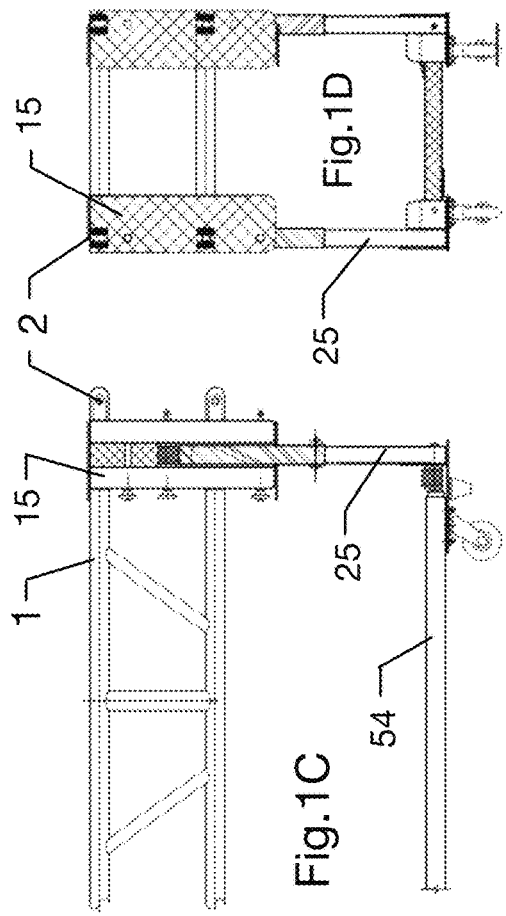

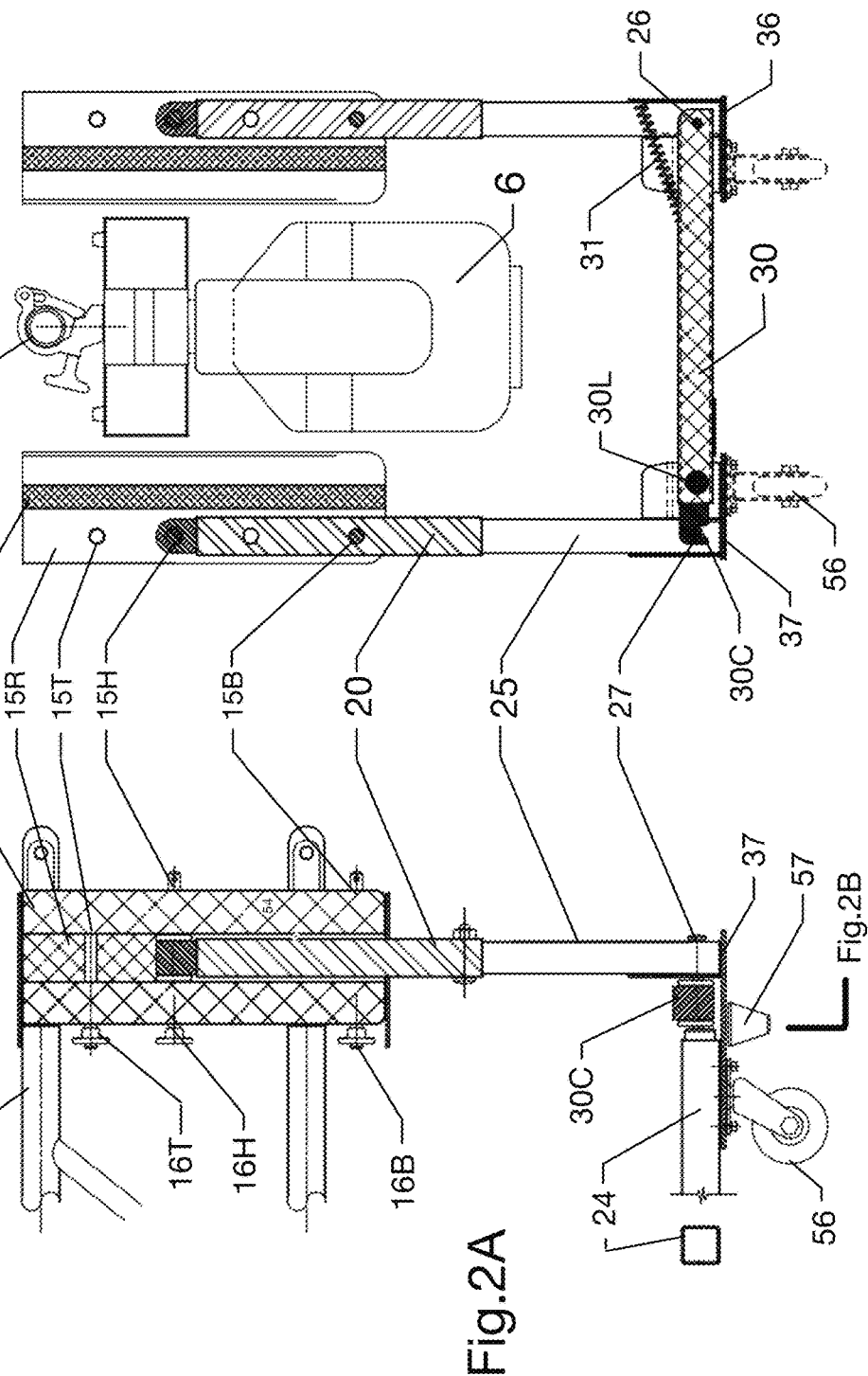

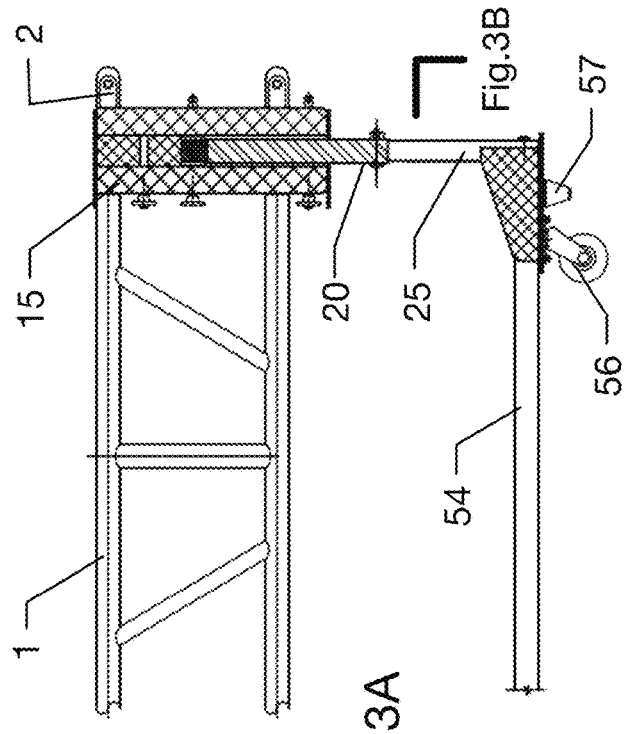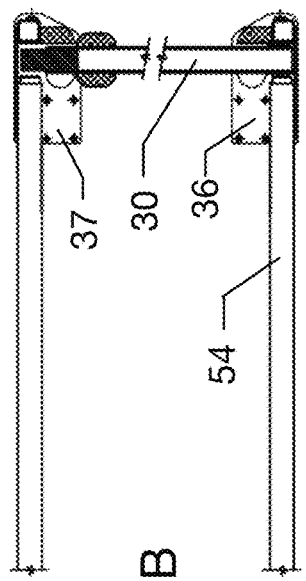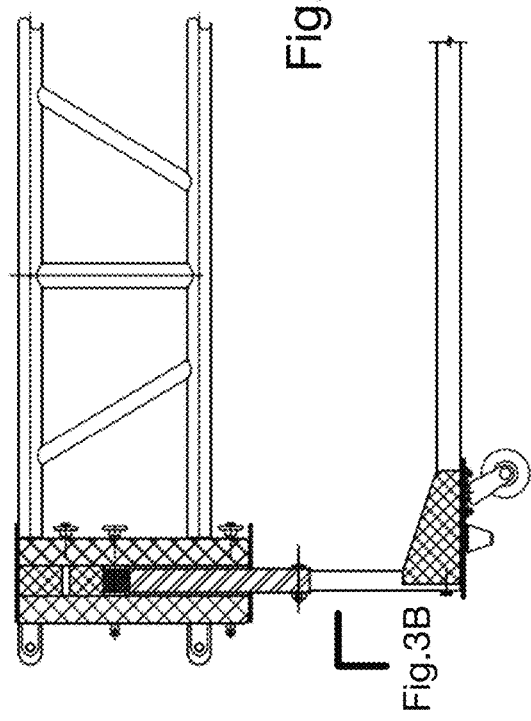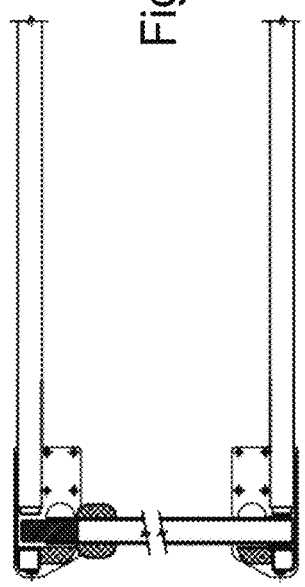
Fig.3A
Fig.3B

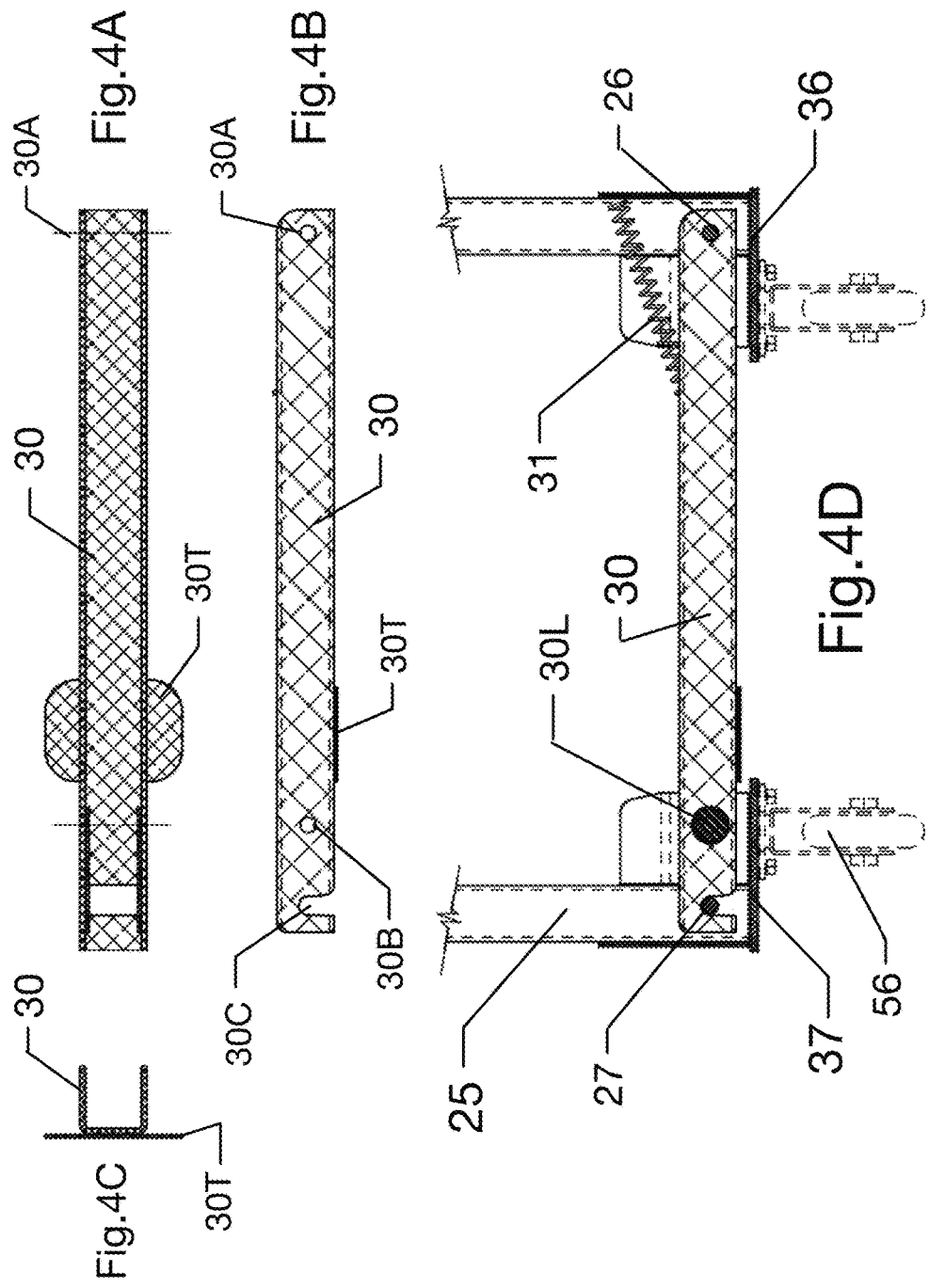

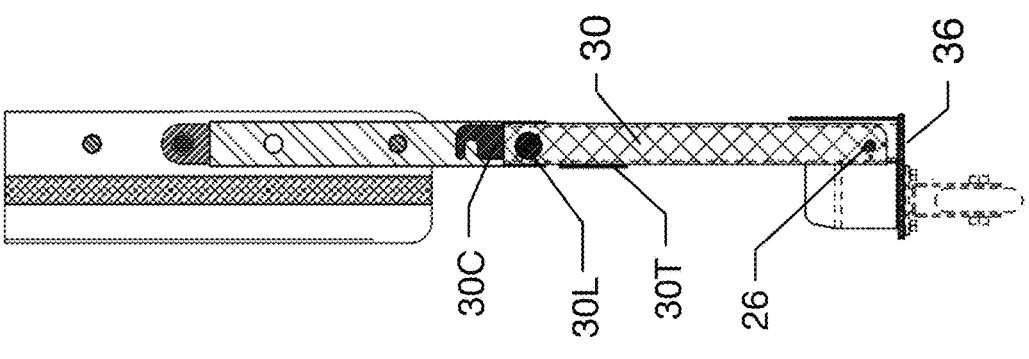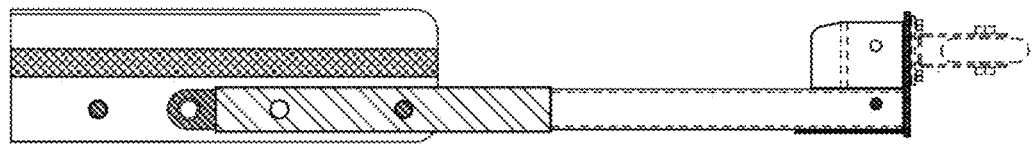
Fig.6

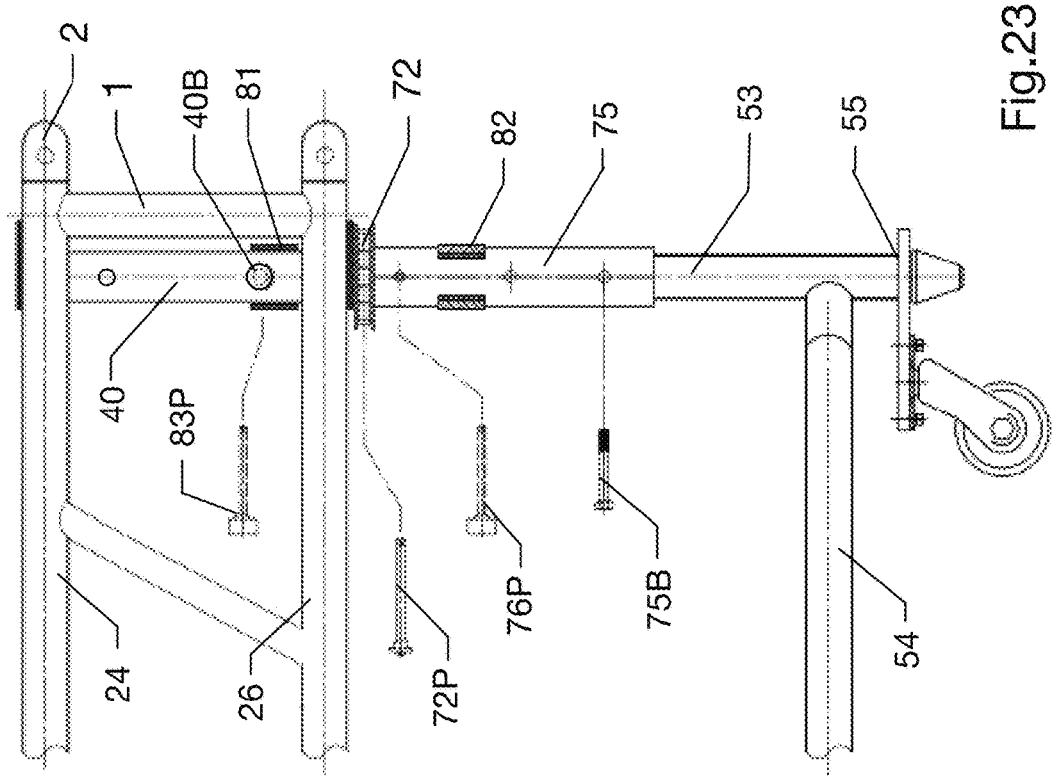

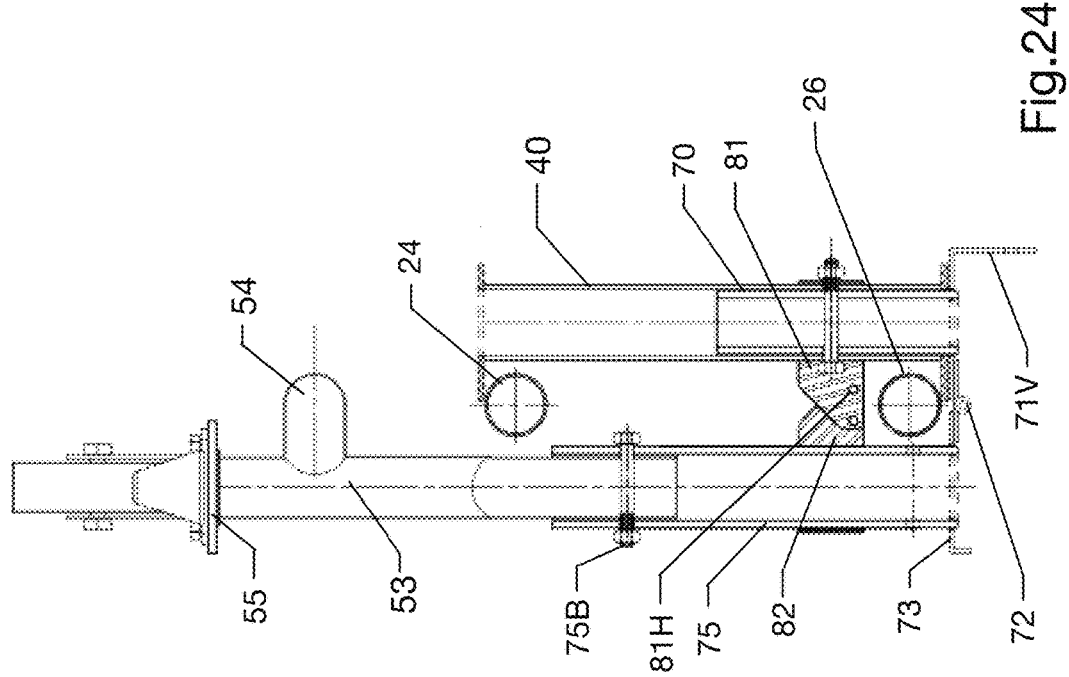

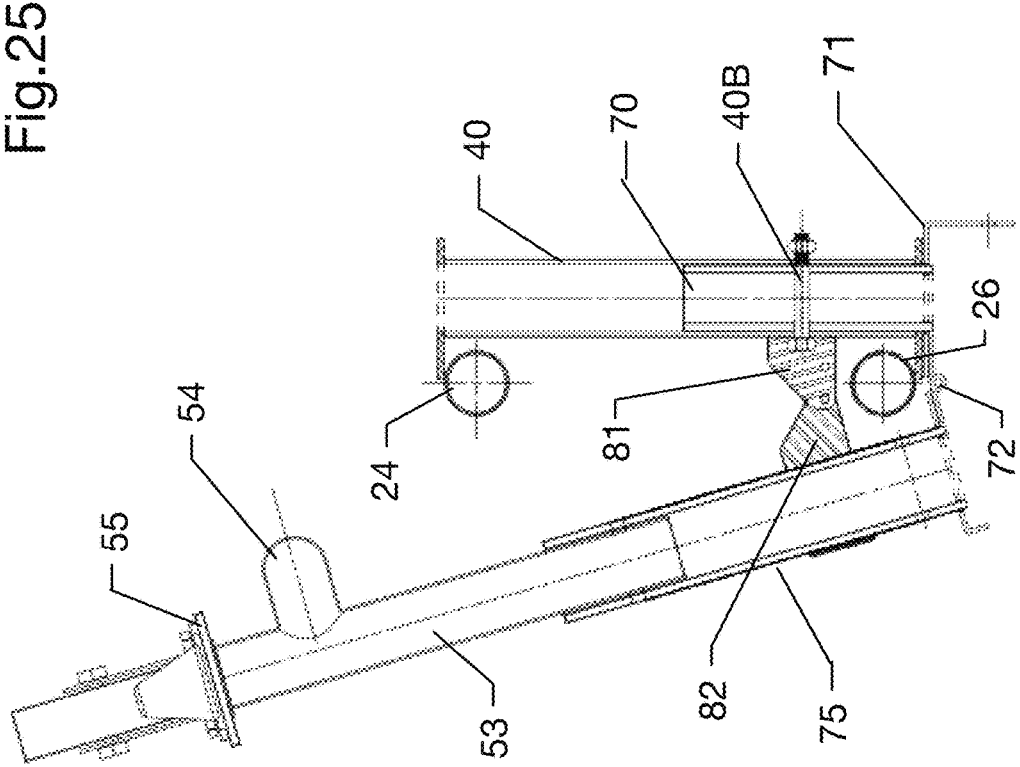

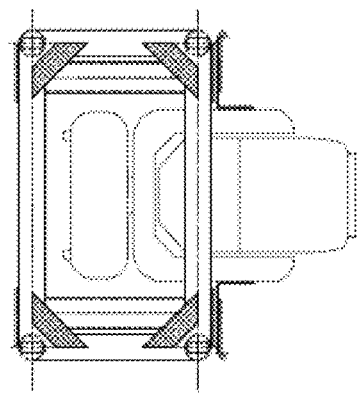
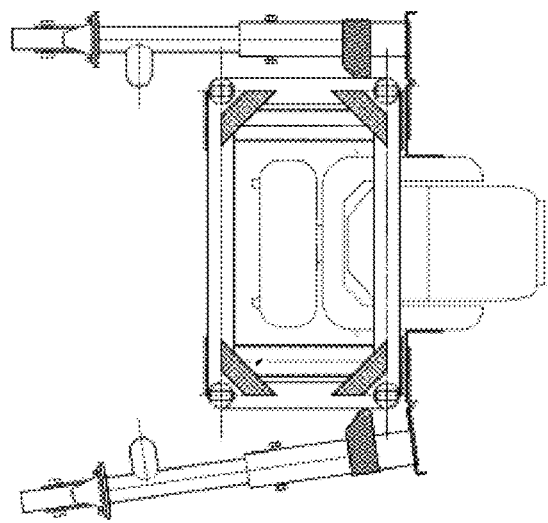
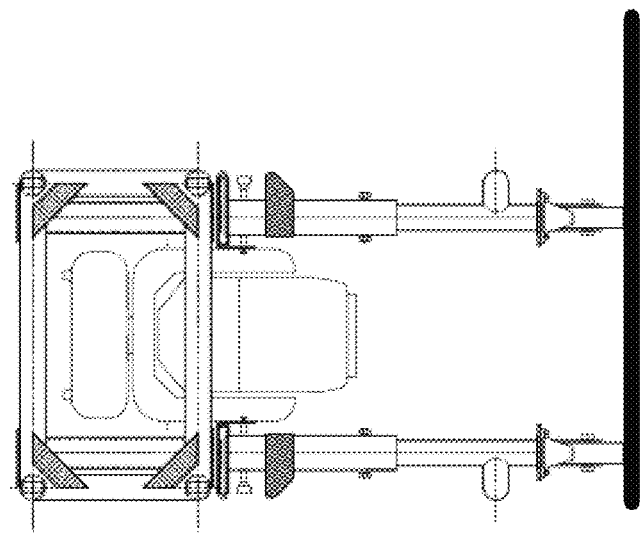

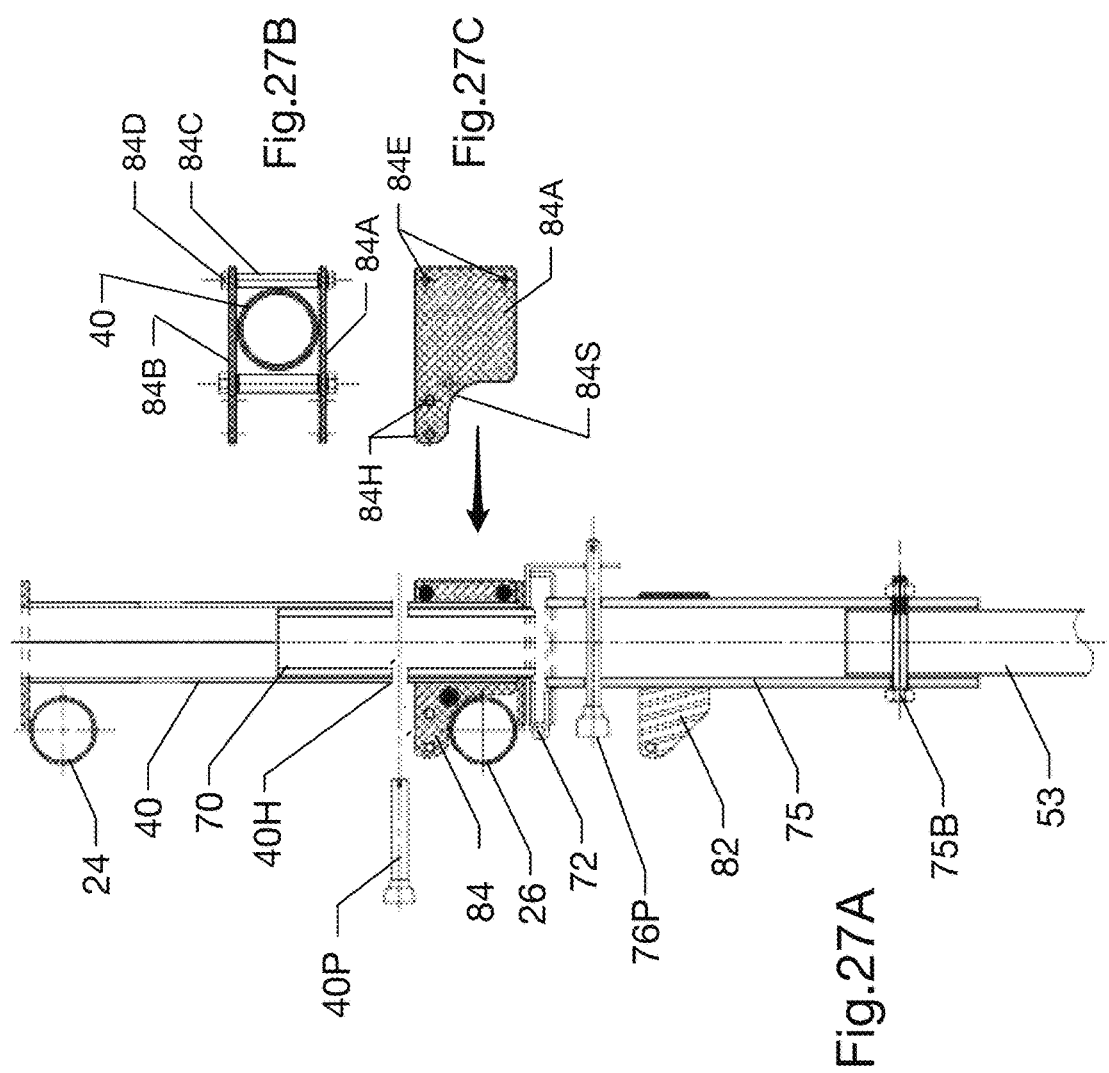

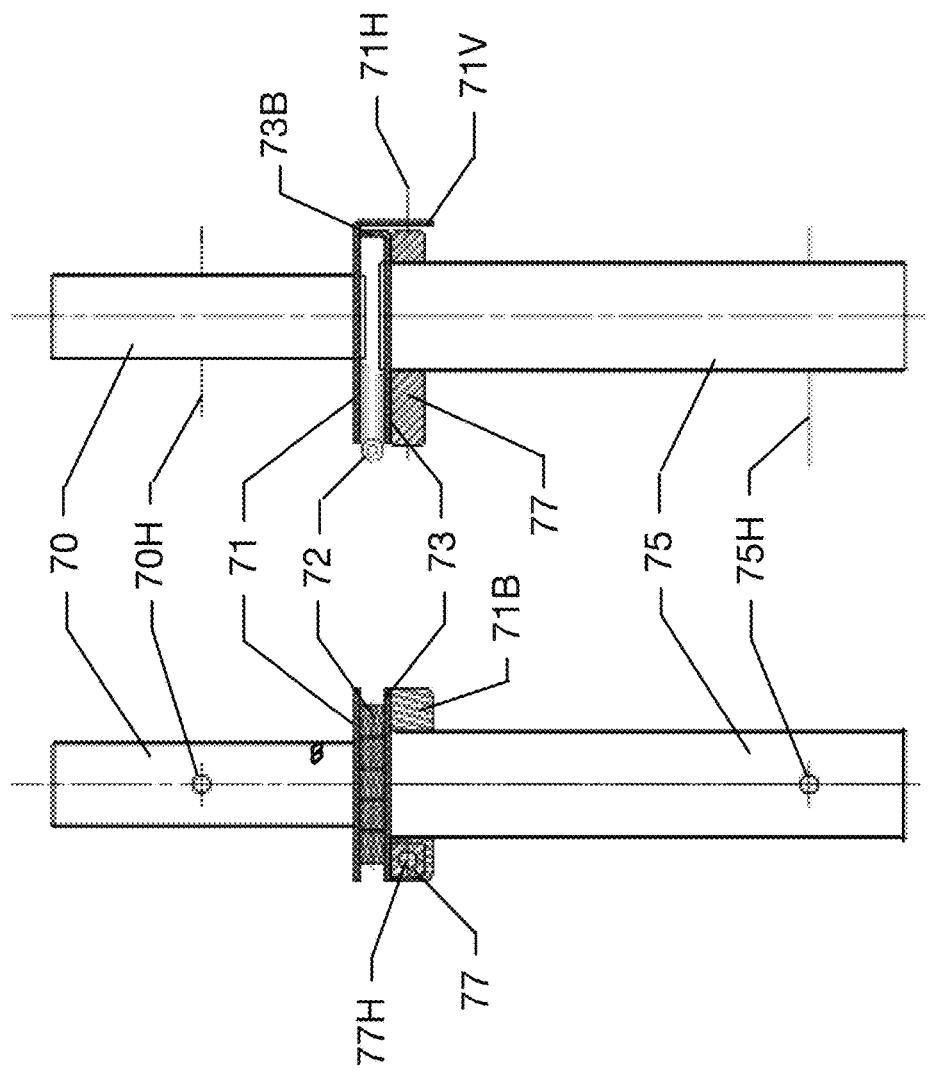

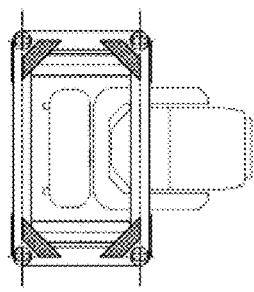
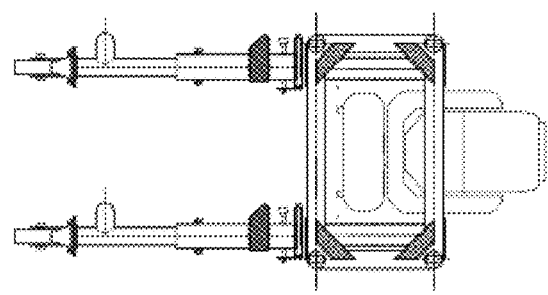
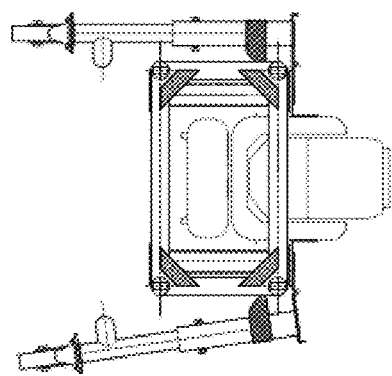
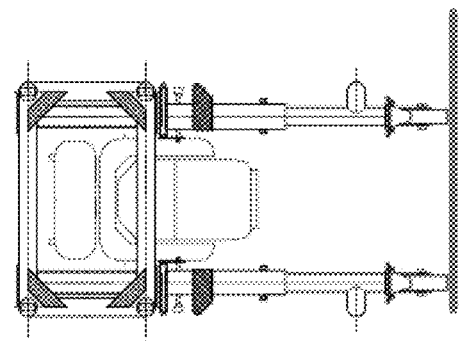

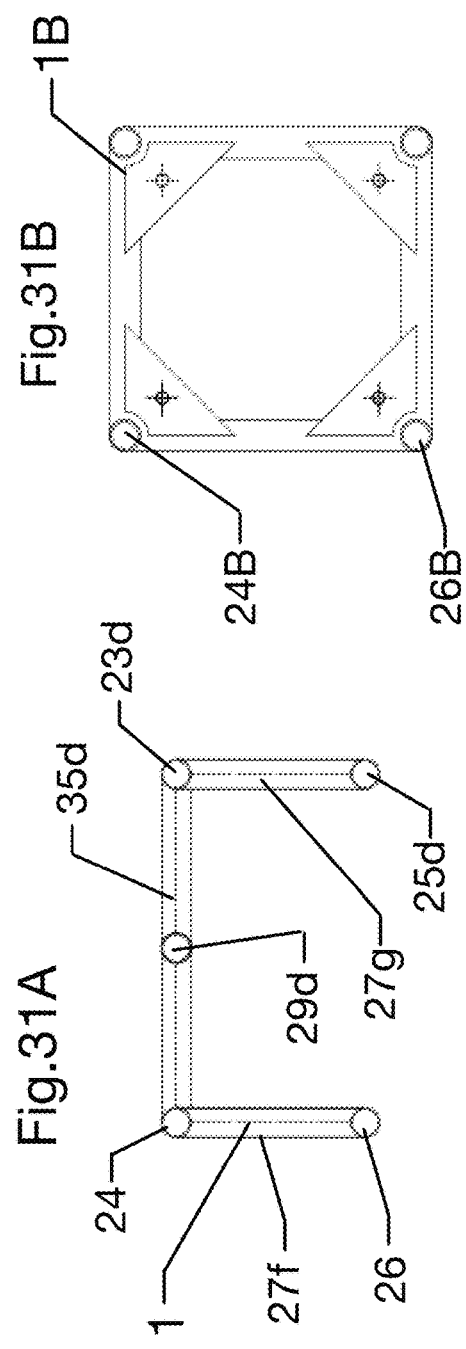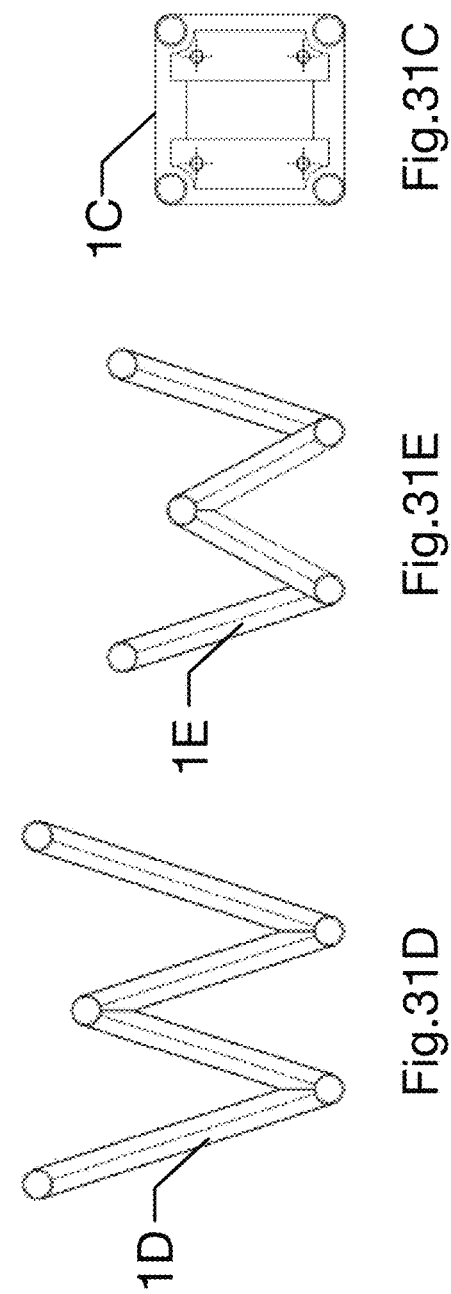

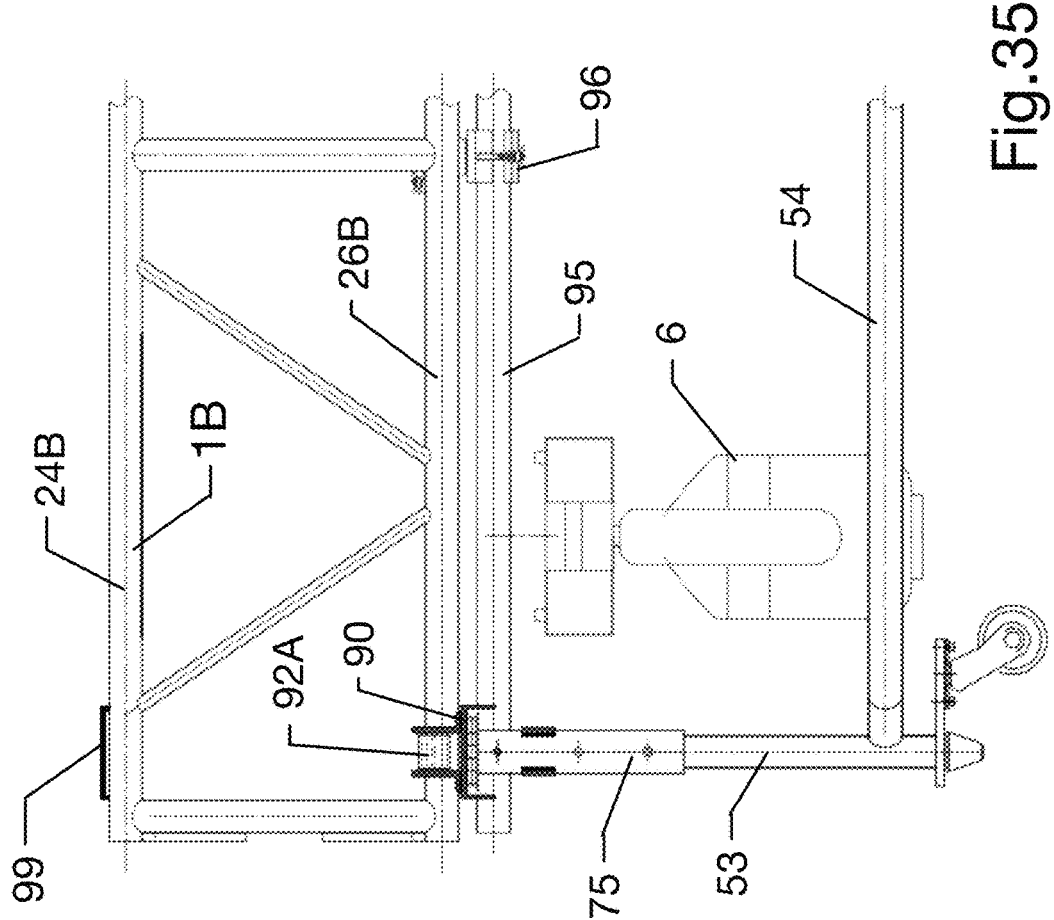
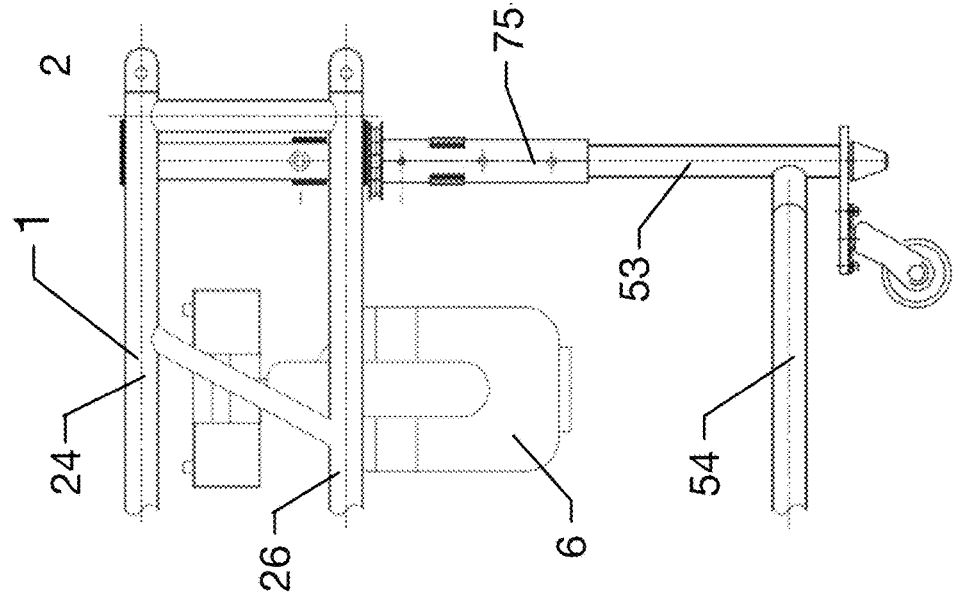
Fig.35

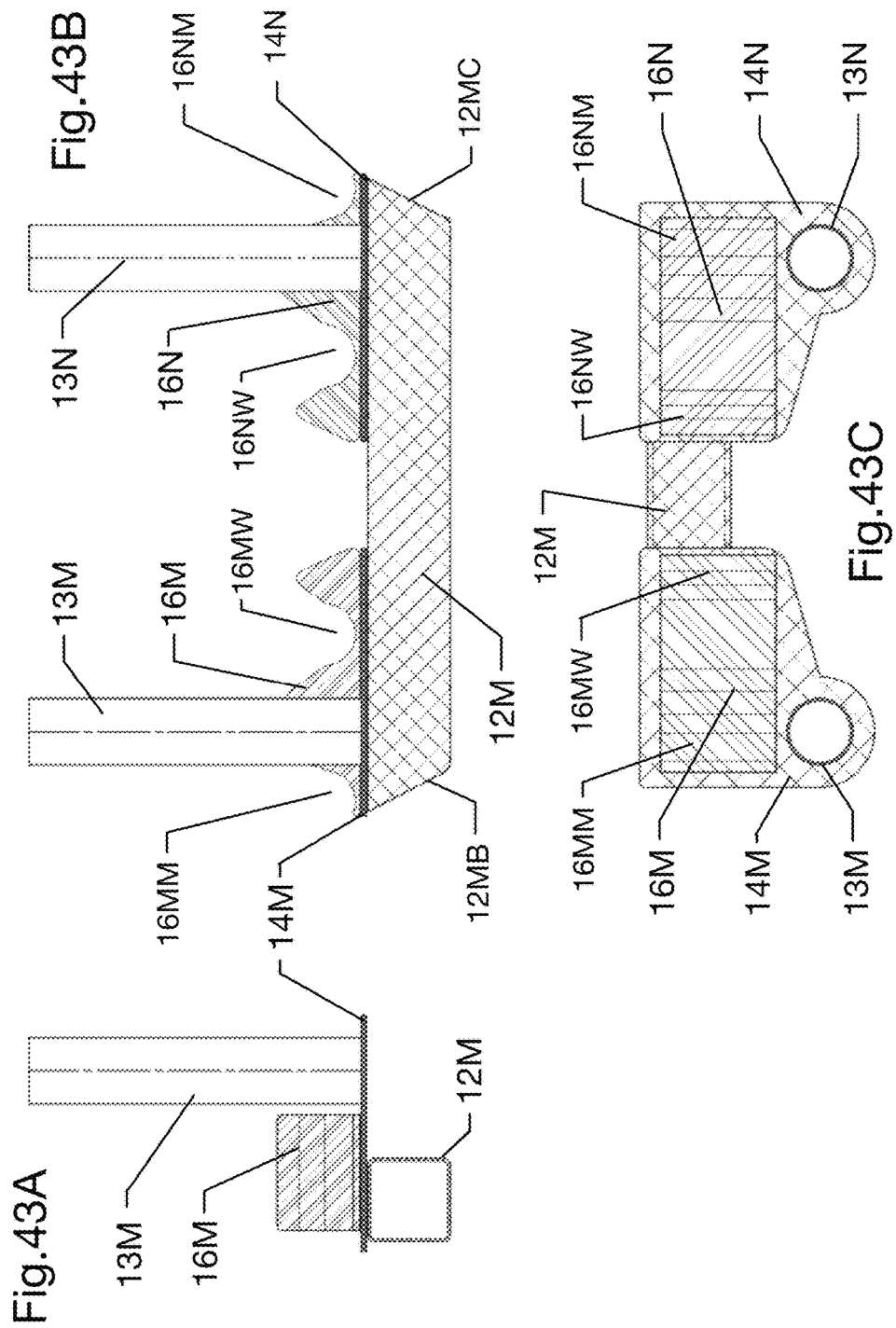

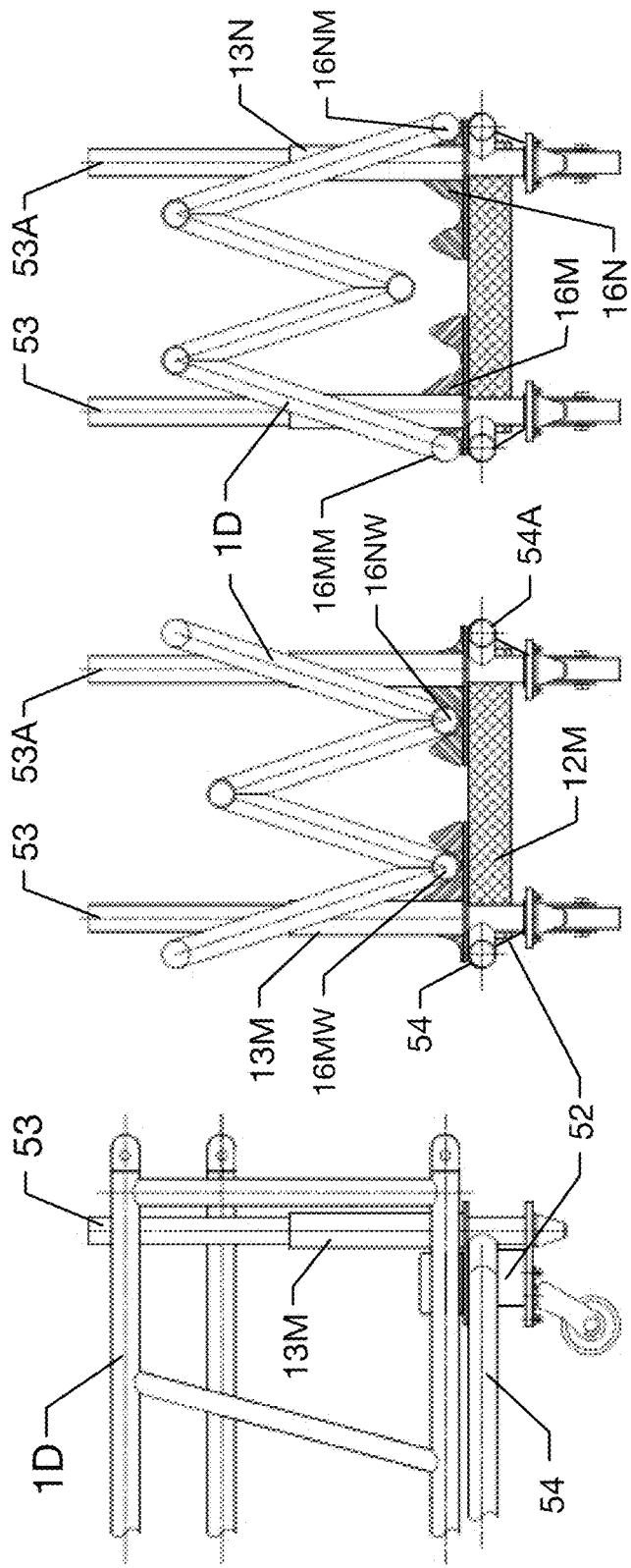

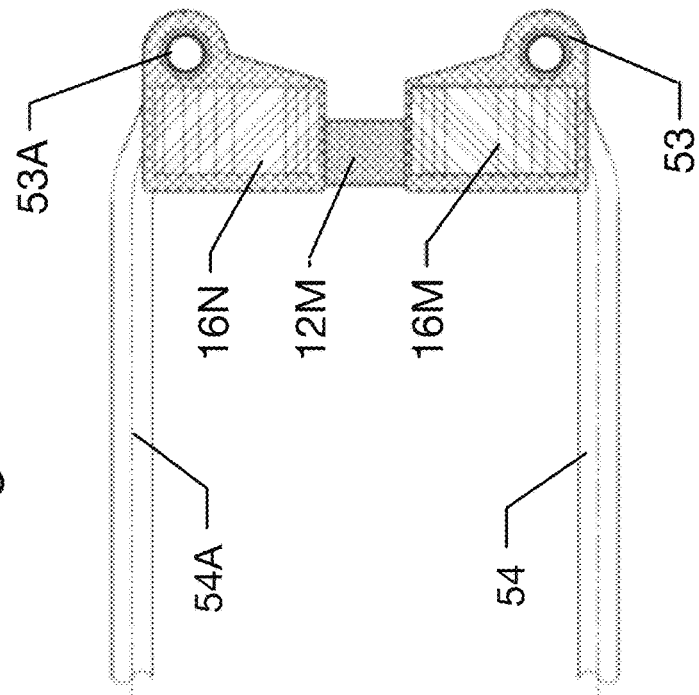
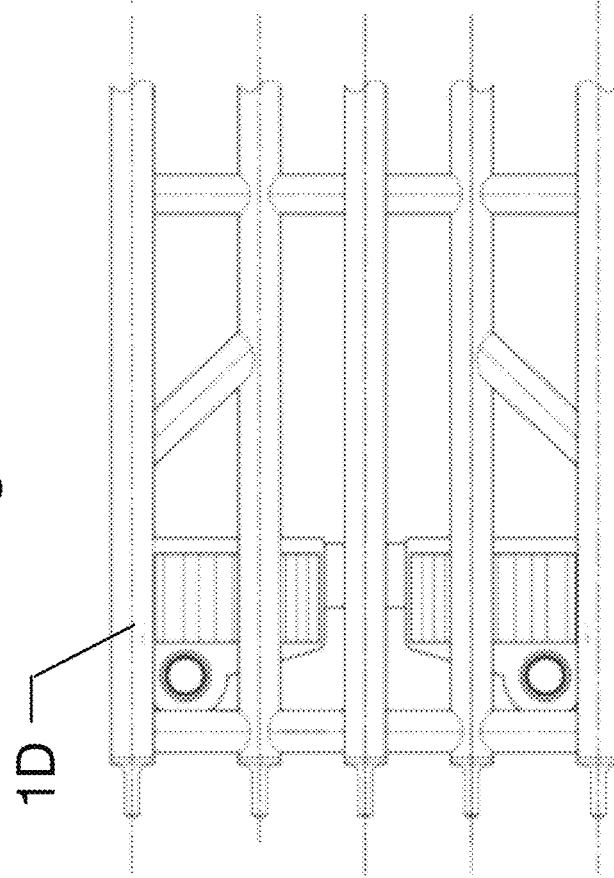
Fig.45A
Fig.45B

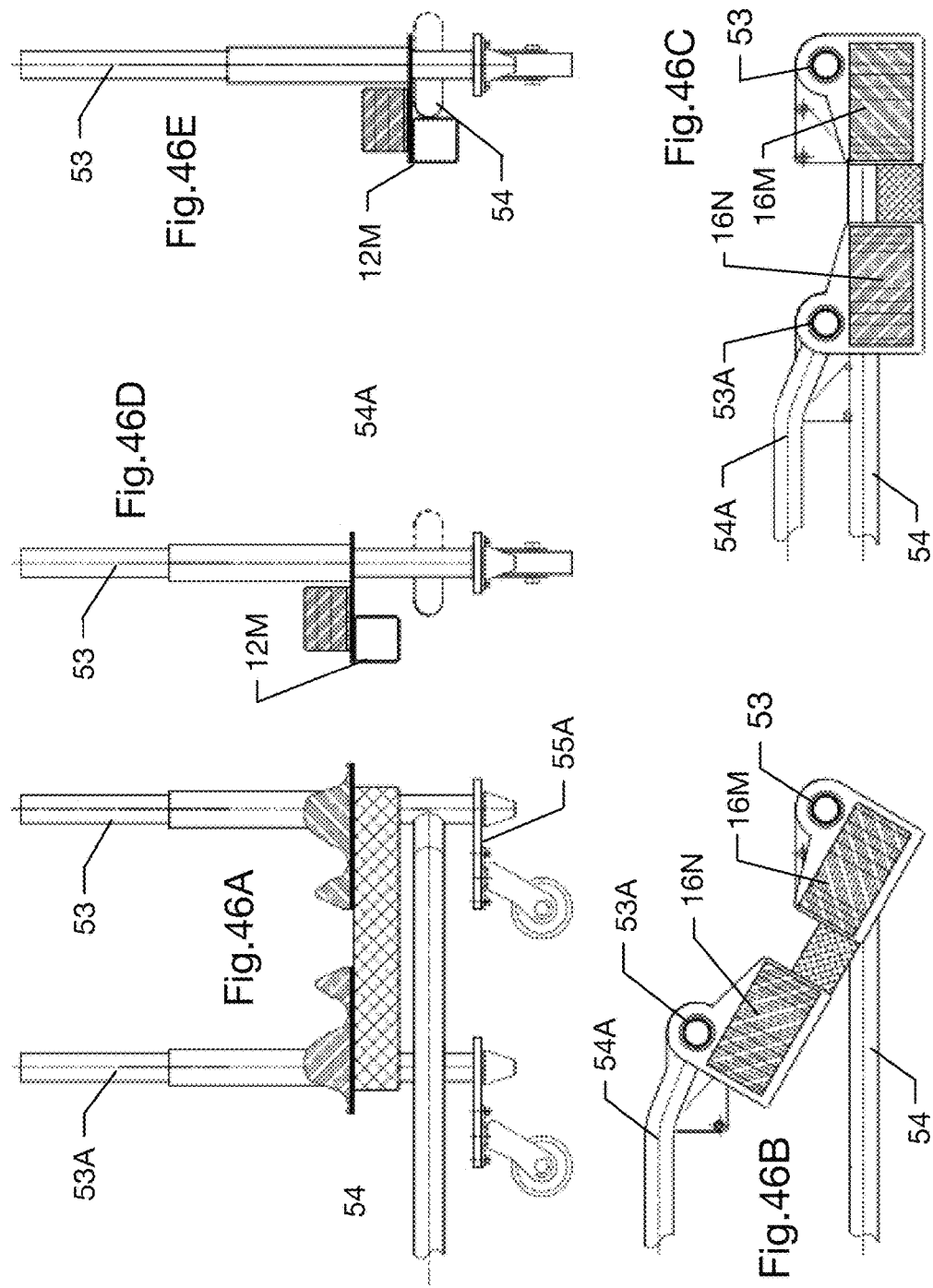

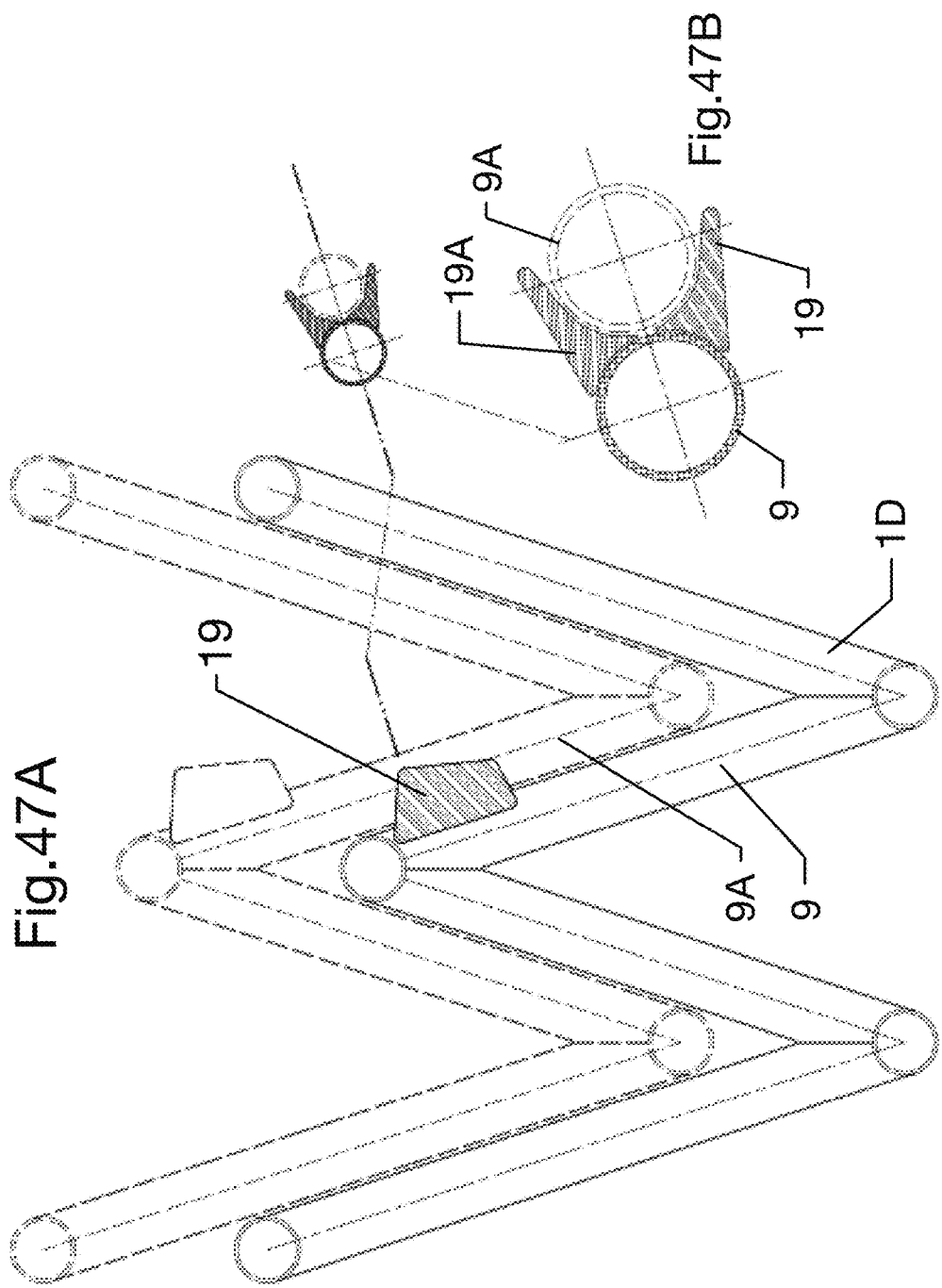

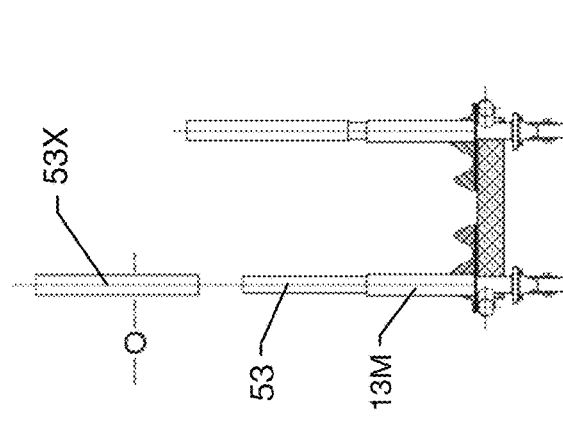
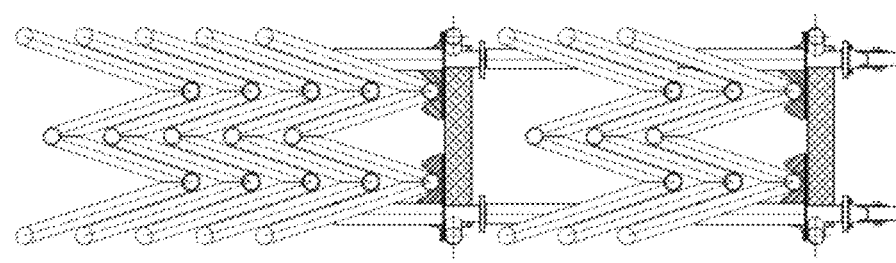
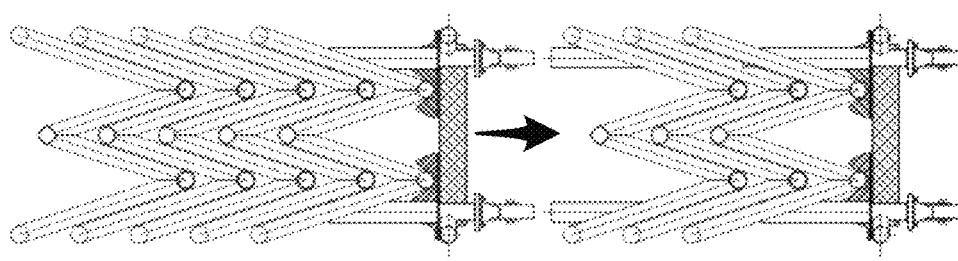

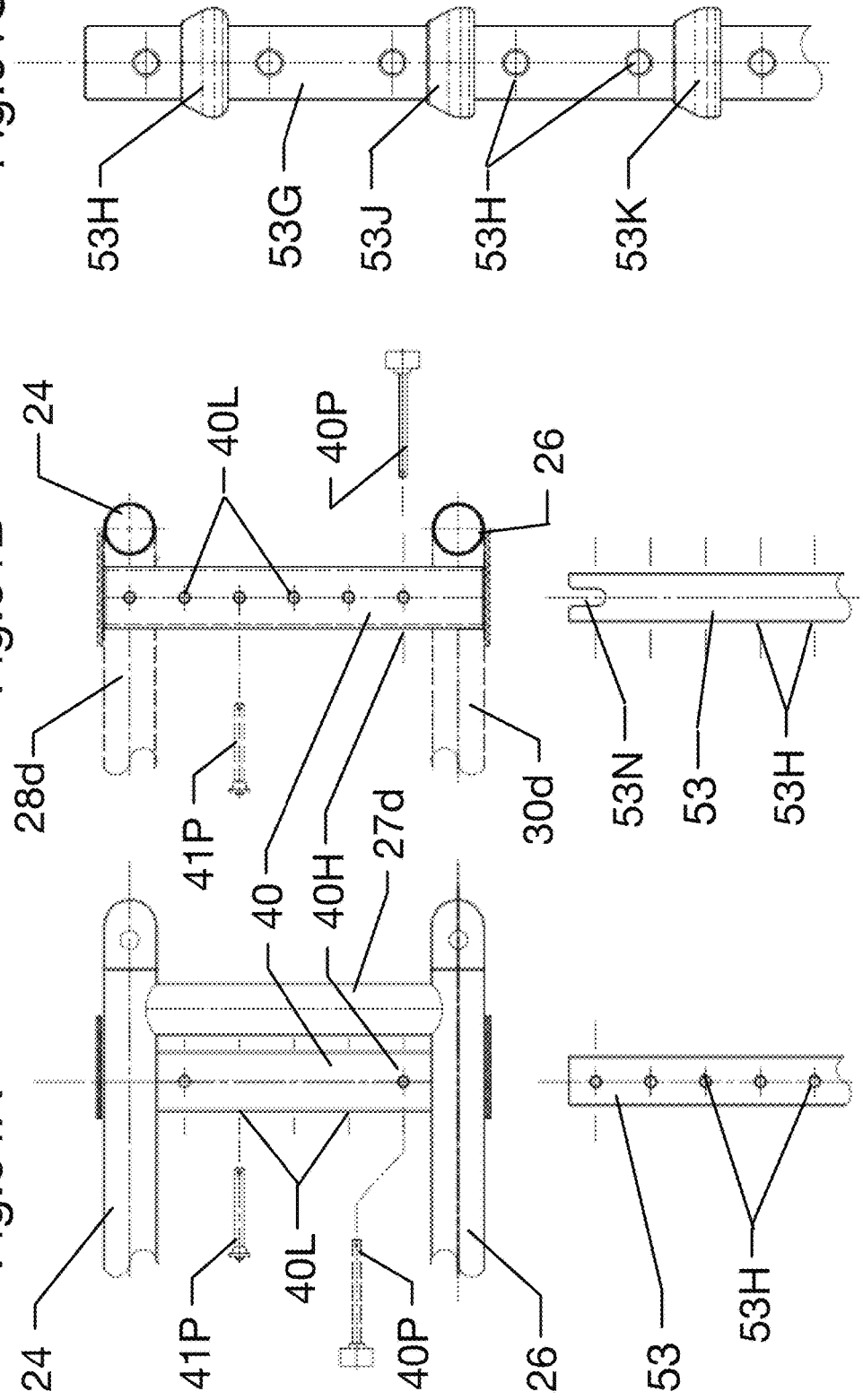

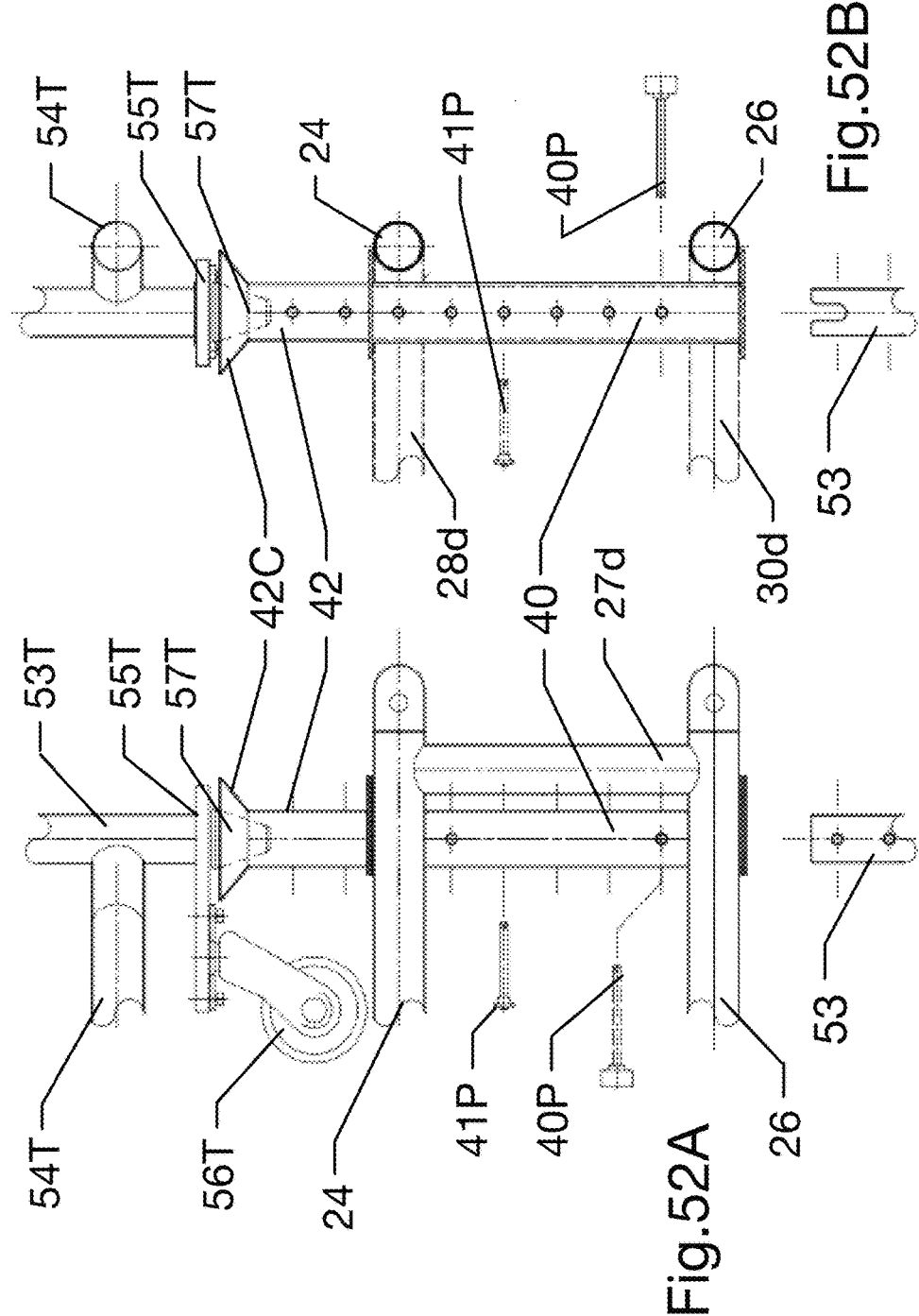

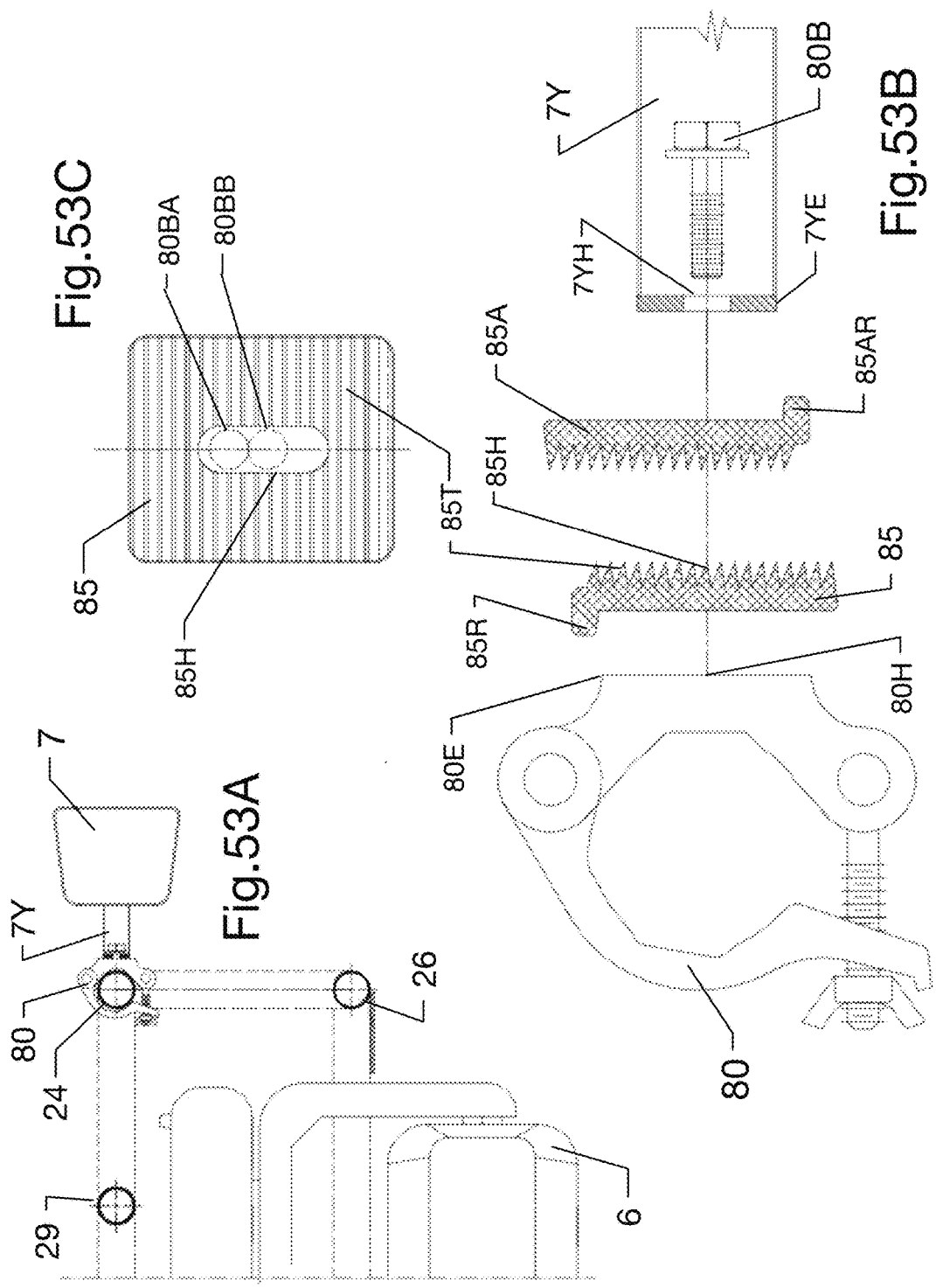

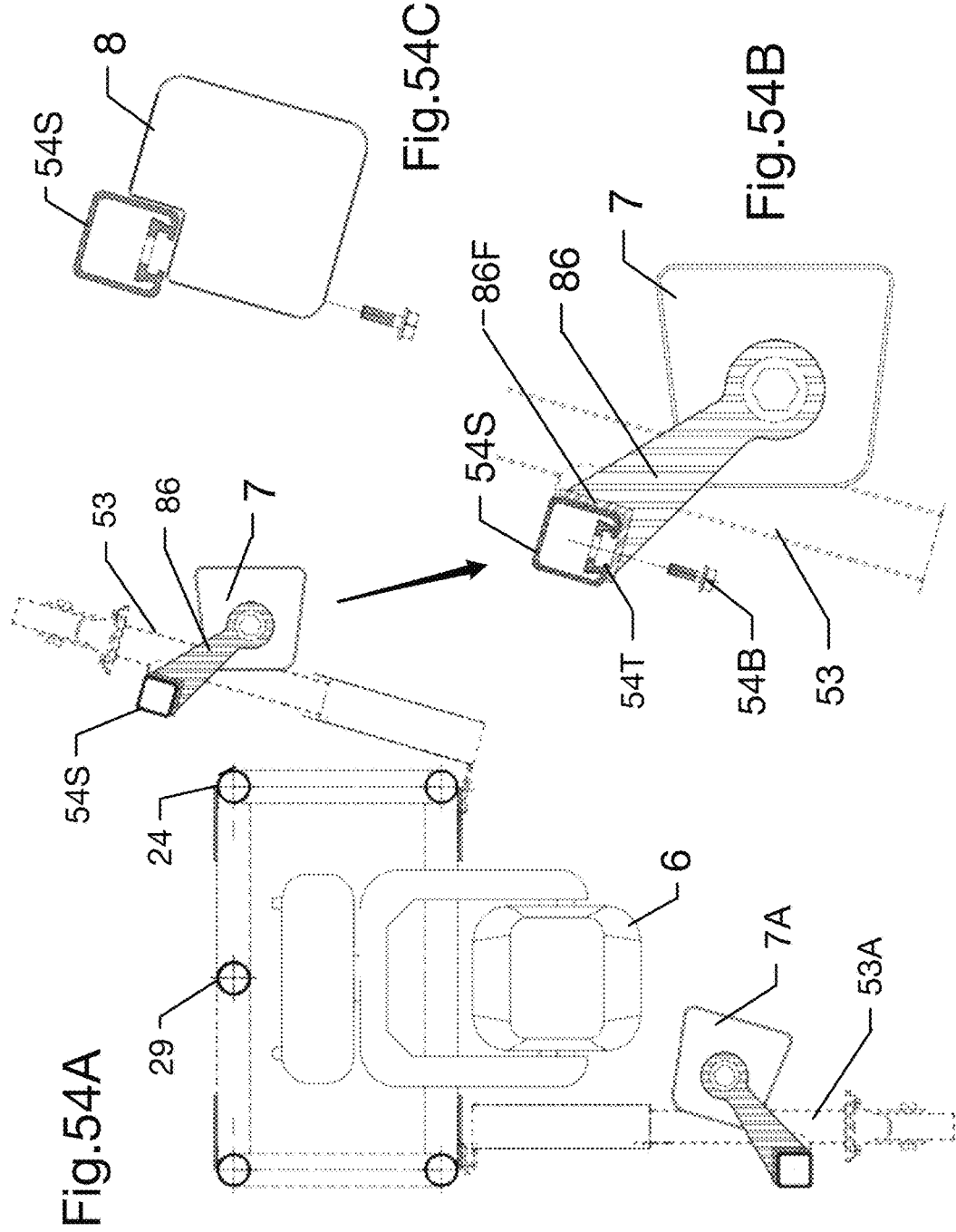

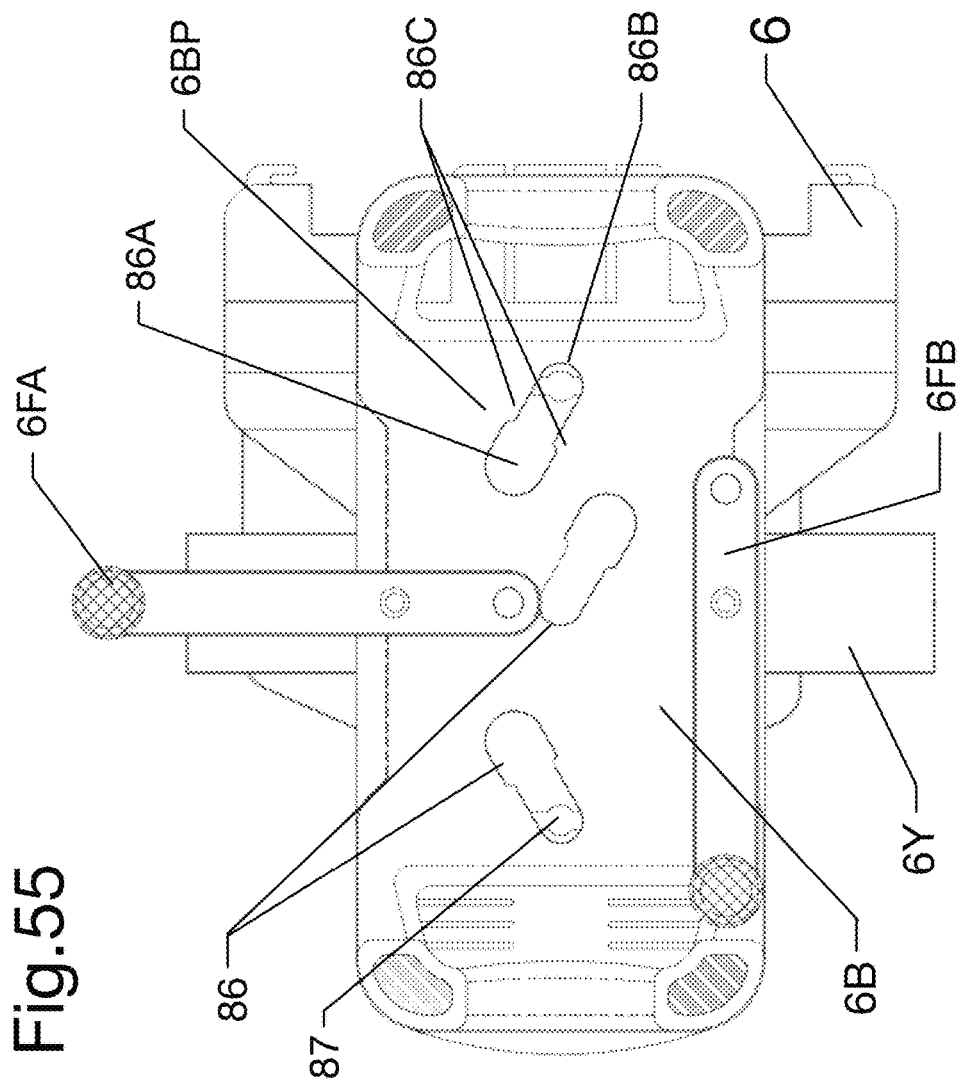

TRUSSES AND SIMILAR STRUCTURES

This application claims priority to U.S. Provisional Ser. No. 62/345,923, filed Jun. 6, 2016, the entire disclosure of which is hereby incorporated by reference. Applicant's US 2004/0187426 and pending U.S. application Ser. No. 14/676,616, filed Apr. 1, 2015, are also hereby incorporated by reference in their entirety.

BACKGROUND OF THE INVENTION

The manufacture of such structures began more than forty years ago, and the demand for them and the pursuit of solutions to the needs and objects of their application have spawned a large number of both designs and of producers. James Thomas Engineering, Tomcat, Tyler, Total, xTreme, Prolyte, and Applied are only a few of the producers.

Many such trusses are rectilinear in section, often in what have become defacto standardized cross-sections/dimensions (e.g., "12×12" and "20.5"). Loads of various kinds, including lighting fixtures, are attached to, hung from, and/or supported atop such trusses, which are supplied in a variety of standard lengths, as well as with corner blocks and hinges for joining two or more lengths at fixed or variable angles.

Portable lighting systems have long been employed in which the fixtures are shipped separately from trusses and then are temporarily attached to the trusses at the venue; attached individually, or with the fixtures having been previously mounted together in groups to a shared intermediate elongated support (a "lamp bar") which, in turn, is attached at the venue to the truss or other supporting structure.

There have also long been a family of truss designs adapted such that the loads supported (typically lighting fixtures and some of their associated wiring and accessories) can be shipped already pre-installed within the truss structure, so as to reduce the amount of time and labor required at the venue to convert the equipment from the form in which it is shipped, to that required for its use.

In one subclass of such trusses, often referred to as "box" trusses, the fixtures remain fixed entirely within the envelope defined by the truss's exterior members, protecting the fixtures in shipping by employing the truss structure itself as a shipping crate. Because the fixtures remain so enclosed during use, the truss's structure is minimized on one (and sometimes at least part of a second) side to reduce obstructions to the light beam they produce. Internal mounting still reduces the range of angles through which the fixture can be physically adjusted in a truss of reasonable size. An example "box" truss is seen (on a smaller scale) in U.S. Pat. No. 5,743,060 to Hayes et al.

Another subclass of trusses employing the truss structure as a shipping crate mounts the fixtures to an intermediate elongated support ("bar"), which can then be displaced within the truss between a shipping position (in which the fixtures are contained entirely within the structure) and a use position in which the fixtures are substantially exterior to the truss structure; dramatically increasing the range of angles through which the fixtures can be adjusted on site without obstruction of the fixture or its beam. Such "pre-rig" truss became a popular solution in the 1980s, when such lighting fixtures were the well-known PAR-64 fixture (one generally similar to FIG. 13 of U.S. Pat. No. 3,116,022). The minimal weight of an aluminum PAR-64 fixture allows a typical "lamp bar" of six such fixtures to be displaced between its shipping and use positions by hand, although motorized and cable/spring assisted versions were seen.

In the case of "automated" lighting fixtures (as disclosed in U.S. Pat. No. 3,845,351 and as widely adopted over the last quarter-century), their appeal is, in part, a reduction in the number of fixtures required to produce a series of lighting effects and, thereby, in time and labor—a benefit that is eroded if the fixtures require separate shipping and individual handling.

Automated fixtures are also vastly more complex. Handling them increases the prospect of damage.

These factors require an approach to pre-installing that is suitable for automated fixtures, but neither the "box" nor the manual "pre-rig" solution, as employed for PAR64s, proved practical.

In the case of "box" trussing, making full use of an automated fixture's potential requires maximizing its range of possible pan and tilt adjustment without obstruction of the fixture or its beam.

In the case of "pre-rig" designs, manually lifting and lowering automated fixtures weighing between 30 and 90 pounds (versus only a few pounds for a spun aluminum PAR-64 fixture) between use and storage positions is impractical.

U.S. Pat. No. 5,278,742 to Garrett is such a traditional "pre-rig" truss effecting the displacement of the fixtures between shipping and use positions using motors installed in the truss itself—increasing cost and complexity and requiring access to AC power for operation.

Another displacement method inverts the process, employing the "muscle" of the chain motors or ground support that will lift the structure to displace the truss structure, relative to the fixtures and their intermediate support, between internal shipping and externalized use configurations; the fixture weight typically born by the floor surface during the transition by wheeled temporary supports, which will then be removed or retracted. Examples include U.S. Pat. No. 5,335,468 to Oberman.

A different approach reconfigures the truss structure itself. Employed in 1987 by Morpheus Lights and disclosed in U.S. Pat. No. 4,862,336 to Richardson, it was an adoption of a truss design introduced years earlier in a PAR-64 version by Michael Tait of Tait Towers. In such designs, the fixtures are "moved" relative to the truss structure by mechanically reconfiguring the truss itself around the fixtures and their immediate support; changing between a fully enclosing shipping configuration and a different "use" configuration in which the fixtures have been, in effect, displaced from the inside of the truss to outside it (the end states illustrated in FIGS. 2 and 4 of Richardson). During shipping and the conversion process, the weight of the structure and of the fixtures is borne by wheeled temporary supports, which are removed before fixture use.

A variation was later introduced by Tomcat Global as the "Swing" truss, whose wheeled temporary supports are both captive and retracted.

Several of these truss designs, in their use configuration, produce a U-shape in which a catwalk is provided, enclosed by two side panels.

Less complex is another type of pre-hung truss, whose precursor was also first used with un-automated fixtures. In this type, a shallow rigid truss is employed having one side (nominally the bottom) from which at least the working end/head of the fixture protrudes. This affords a wide range of angular beam adjustment in use, although the reduced height of the side panels of the permanent truss structure reduce its strength, for a given construction, reducing the allowable span between supports. Protective enclosure of the fixtures in shipping is provided by a separate wheeled frame for each section that supports the permanent portion and surrounds the otherwise exposed parts of the fixtures attached to it, protecting them in shipping.

In one early example, the added protective enclosure comprised, in effect, a wheeled framework or open-sided bin, atop which an associated truss section would ride. One disadvantage of this approach is the volume of space demanded to store such rigid enclosures while the truss is in use.

U.S. Pat. Nos. 8,517,397 and 8,757,641 to Gross and employed by Production Resource Group, the industry's largest provider, illustrate another variation. Here, the enclosing frame or dolly used in shipping can be folded into a smaller volume, at the cost of its greater complexity, weight, cost, and of the additional operations required to fold and unfold it.

Another of the industry's largest providers, Christie Lites, has its own variant, generally disclosed in U.S. Pat. Application 2013/0075993 A1, in which a similar pre-hung truss 110 is shipped atop a "trolley" 100. As manufactured for Christie, the trolley sides fold.

All such approaches suffer from requiring alignment between the permanent truss and its frame/dolly at each and every section in a span for the former to be landed safely atop the latter after use, in preparation for shipping.

Another approach, as disclosed in U.S. Pat. No. 8,099,913 to Dodd and sold by Tyler Truss of Pendleton, Ind., further simplifies by supporting the permanent portion of the shallow permanent truss and enclosing the fixtures suspended in it using two U-shaped, largely planar wheeled frames ("carriages" 50 and 51 in that specification), whose vertical members (e.g., 52, 53) are accepted by and retained in sleeves or tubes 37-40 installed in the corners of the permanent truss portion. Horizontals (e.g., 54) of the carriages protect the fixtures; stiffen the verticals; and can be used in fork-lifting the truss section. The carriages, once disconnected from the truss (after it has been lifted sufficiently off the floor), can be stored separately or can be inverted and re-inserted in the other/upper end of the sleeves 37-40, as is illustrated in FIGS. 6 and 7, serve as handrails.

Simple in principle, the structure of Dodd and its implementation as the Tyler GT, although widely adopted, presents many unresolved practical difficulties that cost valuable time and complicate its use.

For one, tight tolerances between the diameters of the leg verticals (e.g., 52 and 53) and the receiving sleeves/tubes 37-40 result in binding during leg insertion and removal when the two workers necessary (one at each end of the same carriage) do not synchronize their movements.

The vertical legs offer a plurality of pass holes 61 for the insertion of a locking pin 63 captivating the leg in the sleeve, so as to permit the selection of different carriage heights, depending upon the vertical extension of the fixtures or other loads attached in the truss. Workers might (without a clear marking or accessory mechanical stop) insert and pin a leg not in the correct hole, differing from end to end of the same carriage; from side to side of the same truss section; or from section to section of a continuous series/run of sections. The need for rework and delays result.

The centerline of the Dodd/Tyler carriage horizontal (e.g., 54) is offset from the centerline of the sleeves 37 and of the leg verticals in order to bring the horizontals into the same plane as the elongated chords (e.g., 24 and 26) of the truss section during transport. When the leg carriage is simply inverted, that offset is subtracted from the leg/sleeve spacing across the centerline of the truss, such that the clearance between inverted carriage horizontals is reduced to less than the sleeve spacing, and can be insufficient for typical chain motors and rigging used to suspend the truss, as well as making it difficult to pass them. In such cases, providing adequate clearance requires that the leg carriages, which in the case of a 10' model weigh 65 pounds, must not only be inverted but also reversed end-to-end, costing further time and effort.

Inverting the carriage for storage/handrail use is not always practical or desirable for reasons of appearance; limited clearance above; or the difficulty that the carriage verticals present to access to the top surface of the structure, including for operations such as stringing cables along its length. In such situations, the carriages must be collected and stored, in piles on the floor; inserted leg-down in pairs of emptied roadcases/shipping crates used for cable or other purposes; or inverted racked on a pair of castered storage dollies supplied by the manufacturer (which dolly itself is inconvenient to handle, use, ship).

The objects addressed by the instant disclosure include more efficient approaches to the thirty-year pursuit of a "pre-hung" solution for automated fixtures, as well as addressing the practical difficulties presented by the Dodd/Tyler approach to the challenge.

Further objects include improvements to trusses designed for more general use, and for the shipping of a truss having a novel cross-section, as previously disclosed by the applicant, in a manner that cooperates with that of pre-hung truss.

BRIEF DESCRIPTION OF THE DRAWINGS

FIG. 1A is a side elevation of the prior art truss design in its transport mode.

FIG. 1B is an end elevation of the prior art truss design of the prior Figure.

FIG. 1C is a side elevation of one embodiment of an improved truss design in its transport mode.

FIG. 1D is an end elevation of the improved truss design of the prior Figure.

FIG. 2A is a detail view of FIG. 1C.

FIG. 2B is a section through the plane indicated in the prior Figure.

FIG. 3A is side elevation of one section of the improved truss.

FIG. 3B is a section through the plane indicated in the prior Figure.

FIG. 4A is a detail view of a stiffener in plan.

FIG. 4B is a detail side view of the stiffener in the prior Figure.

FIG. 4C is a detail end view of a stiffener in the prior Figures.

FIG. 4D is a detail view, comparable to FIG. 2B, of the stiffener in the prior Figures as installed and when engaged.

FIG. 6 is a detail endwise view of said stiffener when retracted.

FIG. 23 is a front elevation of the truss of the prior Figures with attention to the fasteners employed.

FIG. 24 is a section of the truss of the prior Figures with the leg carriage hinged upwards.

FIG. 25 is a section of the truss of the prior Figures with the leg carriage hinged upwards at another angle.

FIG. 26A is an end elevation of the truss of the prior Figures with its leg carriages locked in downward position for transport.

FIG. 26B is an end elevation of the truss of the prior Figures with its leg carriages in an upward position for use, at the two angles illustrated in FIGS. 24 and 25.

FIG. 26C is an end elevation of the truss of the prior Figures with its leg carriages removed.

FIG. 27A is a section through a truss with a hinged leg adaptor installed and an alternative upper up-lock bracket design.

FIG. 27B is a plan view detail of the alternative upper up-lock bracket clamped around the truss leg receiver tube.

FIG. 27C is a side elevation of one of two plates used to assemble the alternative bracket design of the prior Figures.

FIG. 29A is a front elevation of a hinged leg adaptor with one alternative transit lock design.

FIG. 29B is a side elevation of a hinged leg adaptor with the alternative transit lock of the prior Figure.

FIG. 30A is an end elevation of the truss of the prior Figures with its leg carriages locked in downward position for transport.

FIG. 30B is an end elevation of the truss of the prior Figures with its leg carriages in an upward position for use, shown at two possible angles.

FIG. 30C is an end elevation of the truss of the prior Figures with its leg carriages inverted as handrails, shown in two alternative orientations.

FIG. 30D is an end elevation of the truss of the prior Figures with its leg carriages removed.

FIG. 31A illustrates the cross-section of the Dodd and other "pre-hung" trusses of the type.

FIG. 31C is an end elevation of industry standard "20.5" general purpose truss.

FIG. 31B is an end elevation of industry standard "12×12" general purpose truss.

FIG. 31D illustrates a cross-section of the "five-chord" truss configuration previously disclosed by the applicant.

FIG. 31E illustrates a cross-section of another embodiment of the "five-chord" truss configuration previously disclosed by the applicant.

FIG. 35 is a comparative side elevation of the truss cradle of the prior Figures as installed on the 20.5" truss type of FIG. 31B and of the hinged leg adaptor as installed on the "pre-hung" truss type of FIG. 31A.

FIG. 43A is an end elevation of one embodiment of a dolly adaptor for the applicant's 5-chord truss of FIG. 31D.

FIG. 43B is a side elevation of the embodiment of a dolly adaptor of the previous Figure.

FIG. 43C is a plan view of the embodiment of a dolly adaptor of the prior Figures.

FIG. 44A is a side elevation of one end of an assembled truss dolly with one truss section aboard.

FIG. 44B is an end view of an assembled truss dolly with one truss section aboard, in the "W" orientation with its wider face up.

FIG. 44C is an end view of an assembled truss dolly with one truss section aboard, in the "M" orientation with its narrower face up, as also shown in FIG. 44A.

FIG. 45A is a plan view of one end of an assembled truss dolly.

FIG. 45B is a plan view of the other end of an assembled truss dolly with a section of truss aboard.

FIG. 46A is a side elevation of the assembled truss dolly in the process of folding for storage.

FIG. 46B is a plan view of the prior Figure.

FIG. 46C is a plan view of the of the assembled truss dolly completely folded for storage.

FIG. 46D is an end elevation of the assembled truss dolly folded for storage.

FIG. 46E is an end elevation of the assembled truss dolly locked for storage.

FIG. 47A is an end elevation of stacked 5-chord truss illustrating one method of establishing and maintaining their vertical alignment.

FIG. 47B is a sectional detail of the subject matter of the previous Figure.

FIG. 48A is an end elevation illustrating the stacking of two of the truss dollies.

FIG. 48B is an end elevation illustrating the two truss dollies stacked.

FIG. 48C is an end elevation of a truss dolly illustrating the extension of its vertical legs.

FIG. 51A is a side elevation of a truss with internal stops for leg height adjustment.

FIG. 51B is a section of the subject matter of the previous Figure.

FIG. 51C is an elevation of a leg vertical with anti-binding features.

FIG. 52A is a side elevation of a truss with improved stacking features.

FIG. 52B is a section of the subject matter of the previous Figure.

FIG. 53A is a section of a pre-hung truss illustrating the "yoking out" of a fixture from a truss chord.

FIG. 53B is an exploded side elevation of the use of a pair of fittings to maintaining the rotational position of a fixture around its yoke mounting axis.

FIG. 53C is a front elevation of one such fitting.

FIG. 54A is a section of a pre-hung truss illustrating the attachment of a fixture to the leg carriage horizontal.

FIG. 54B is a detail of the prior Figure showing one method of mounting the fixture to one such horizontal.

FIG. 54C is an example of a fixture adapted for mounting to a leg carriage horizontal.

FIG. 55 illustrates an improved method of attaching clamp and hangers to lighting equipment.

DETAILED DESCRIPTION

Figure 5:
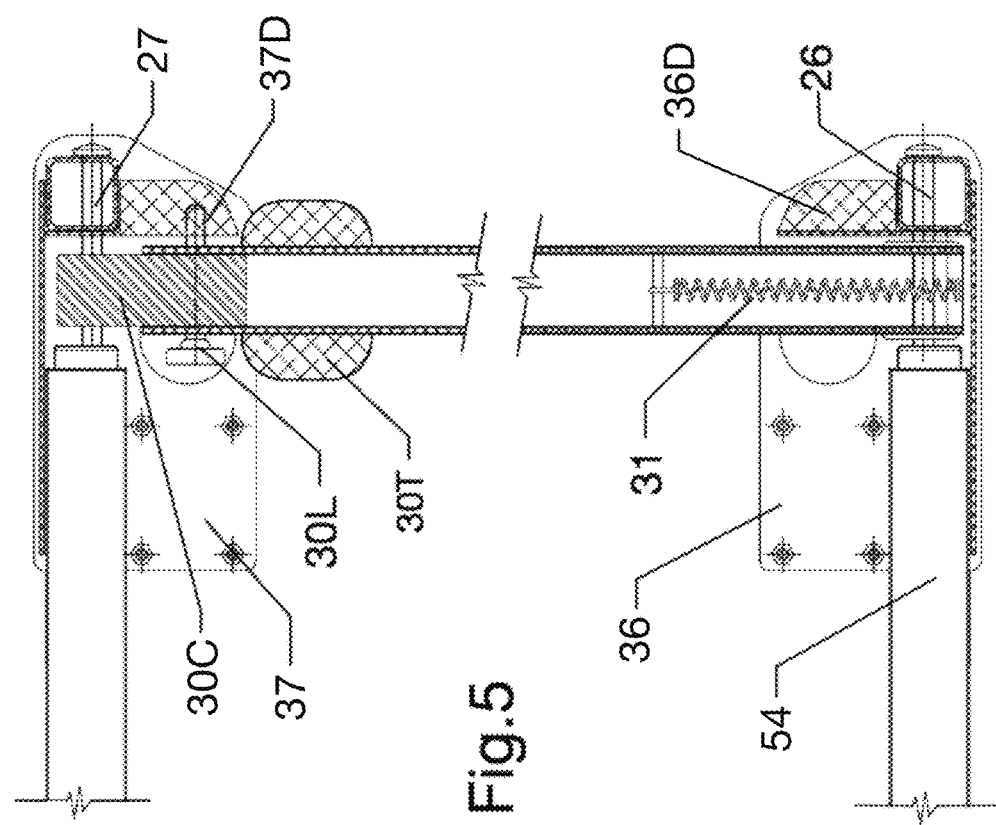
FIG. 5 is a detail plan view, comparable to FIG. 3B, of said stiffener as installed and when engaged.

Refer now to FIGS. 1A-31A, where some embodiments of pre-hung trusses suitable for automated (and other) fixtures, and for other uses, are disclosed.

In various Figures are illustrated example truss sections 1. Four elongated structural members 23d, 24, 25d, and 26 extend between two section ends, at which are provided means (here, known clevis-type fittings 2) for endwise joining multiple such sections to each other and/or to known corners or hinges. Cross-members connect elongated members 23d, 24, 25d, and 26; defining a generally rectangular interior volume. For example, in FIG. 1B, cross-members 29d, 30d, 27d, and 27econnect the elongated members at a truss end. Cross-members are also illustrated between the elongated members on the same nominally vertical side at intermediate locations between ends (e.g., 27f between 24 and 26 in FIG. 1A). Diagonal cross-members (e.g., 28d) may be provided. As is seen in FIG. 31A, cross-members 35d connect nominally upper elongated members 24 and 23d.

FIGS. 1A and 1B are general side and end elevations of the prior art Dodd/Tyler/GT truss. FIGS. 1C and 1D are similar views of one embodiment of an improved truss, as will be seen in greater detail in the following figures.

FIGS. 2A and 2B are a more detailed side elevation and a section of one end of the improved truss.

The function of the vertical leg of the Dodd "carriage" is served by a telescoped pair of shapes 20 and 25. The lower shape 25 is attached to a plate (36 or 37) mounting the caster 56, stacking cone 57, and, here, attached to the carriage horizontal 54. The upper shape 20 connects to the permanent portion of the truss 1. The total height of the combination of 20 and 25 is determined by differently fixing their overlap using a fastener 21L and pass holes and therefore varying the distance between the truss 1 and the surface supporting it, responsive to the needs of the vertical extension of the fixtures 6 and/or other loads mounted to the truss in transport.

Unlike the Dodd/Tyler approach, the operations necessary to convert the improved truss between transport and use—whether the carriage assembly is removed or is converted to a handrail—do not disturb or present the opportunity to misadjust truss height setting. And the time and effort required is much reduced.

Referring to FIGS. 6-9, it will be seen that, unlike prior disclosures, the leg carriage need not be removed, reinserted, and/or retracted, but, rotationally hinged to the truss, can simply be raised/rotated from its downward transport position to an upward-facing use position equivalent to the "handrail" mode of the Dodd design.

Figure 11:
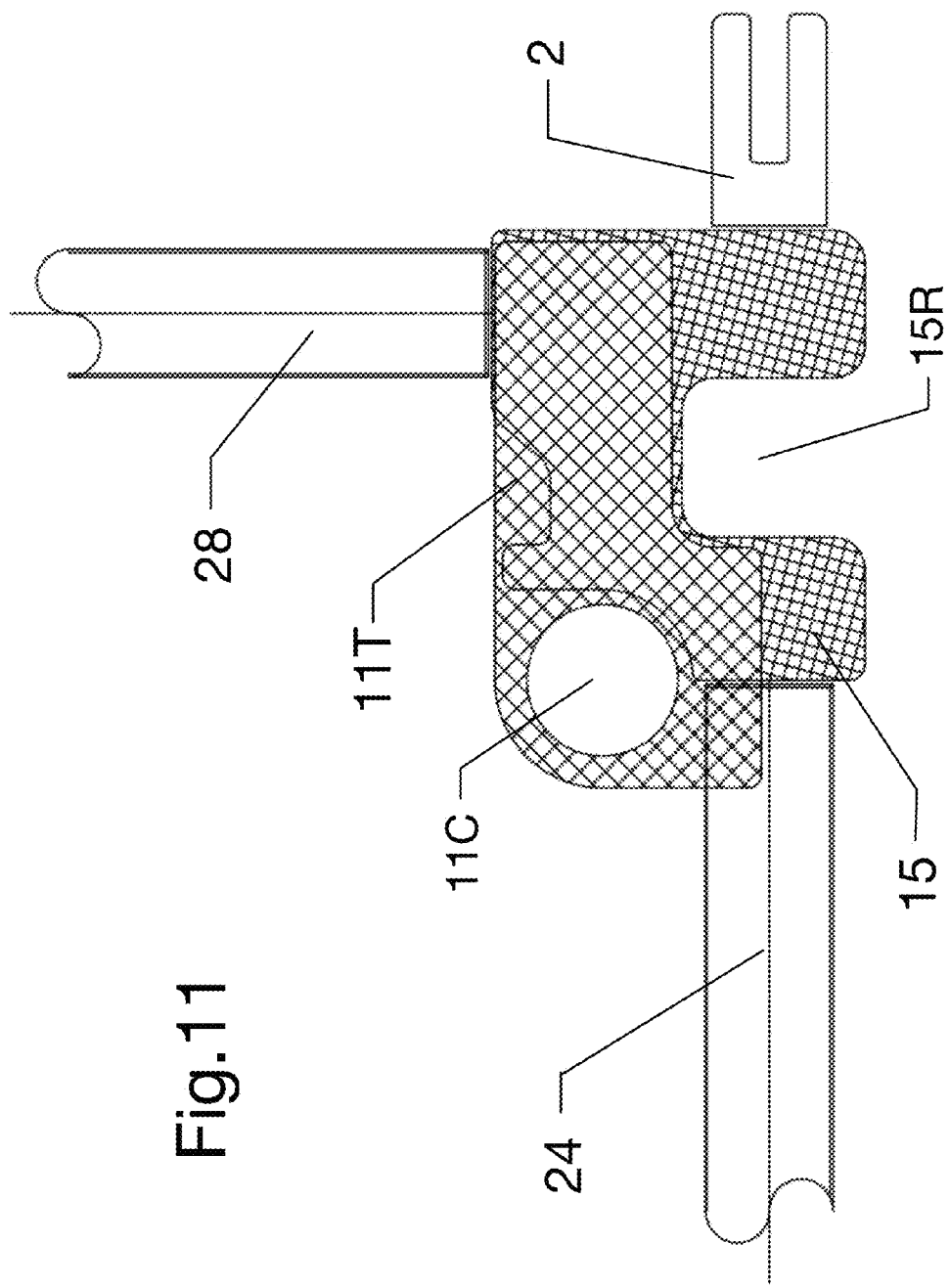
FIG. 11 is a detail in plan view of one corner of the truss illustrating corner detail 15.

Leg 20 is illustrated as attached to a "corner detail" 15, by means of a locking pin 16H through a fitting 20H and pass holes 15H in the corner detail 15. Leg 20 is disposed within a recess 15R afforded in corner detail 15, which is illustrated in FIG. 11 as, for example, an extruded or milled shape that also affords connection of the truss chords on the same truss side and the truss end (e.g., 1A and 1B), and of the clevis fittings 2 (or other provision) for endwise joining truss sections. A top plate 11T provides a hole 11C to receive the stacking cone 57 of a truss above for transporting the pair together. A second plate 11T, is provided on the bottom of the corner detail to allow inverting the truss section (in the known manner), including to serve as a bin for cable.

As illustrated in various figures, pass holes are provided in the corner detail 15 for locking pin insertion as a hinge (pin 16H at pass hole 15H); to lock the carriage in a downward transport position (pass hole 15B and pin 16B); and to lock the carriage in one or more "use" position (pass hole 15T and pin 16T). Other methods for retention and locking can be employed.

Figure 7:
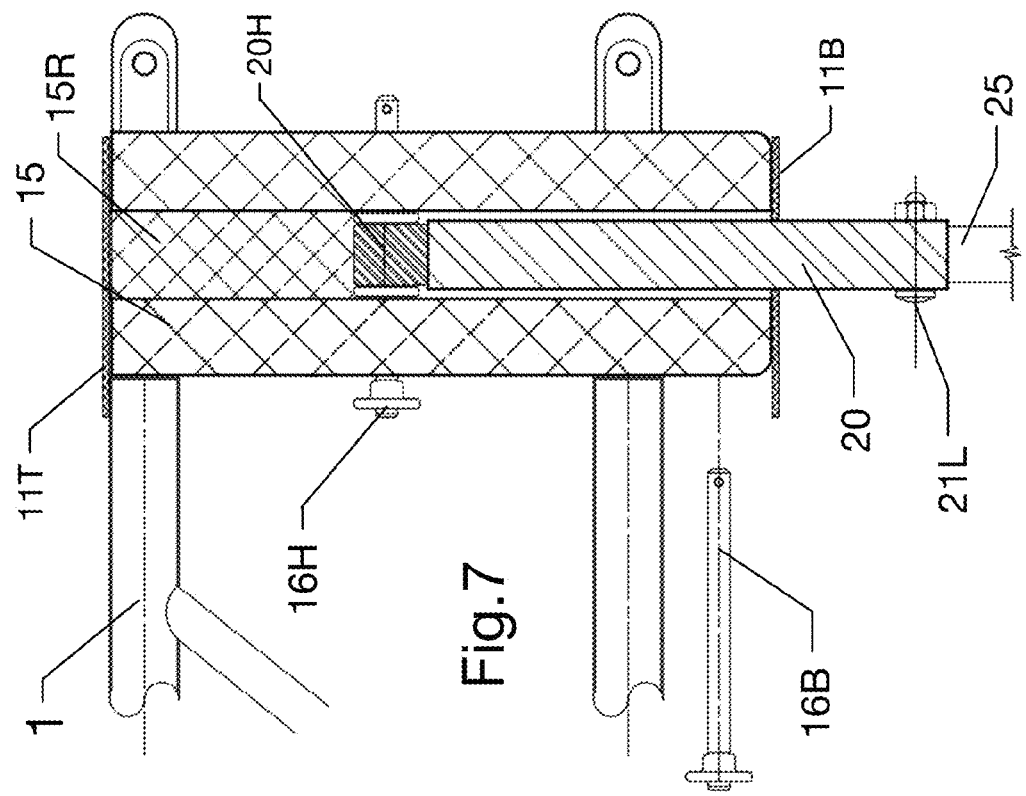
FIG. 7 is a detail side view of the locking/unlocking of the leg carriage to/from its transport mode.

In FIG. 7, the leg locking pin 16B is shown withdrawn from the leg in its lower, transport position.

Figure 8:
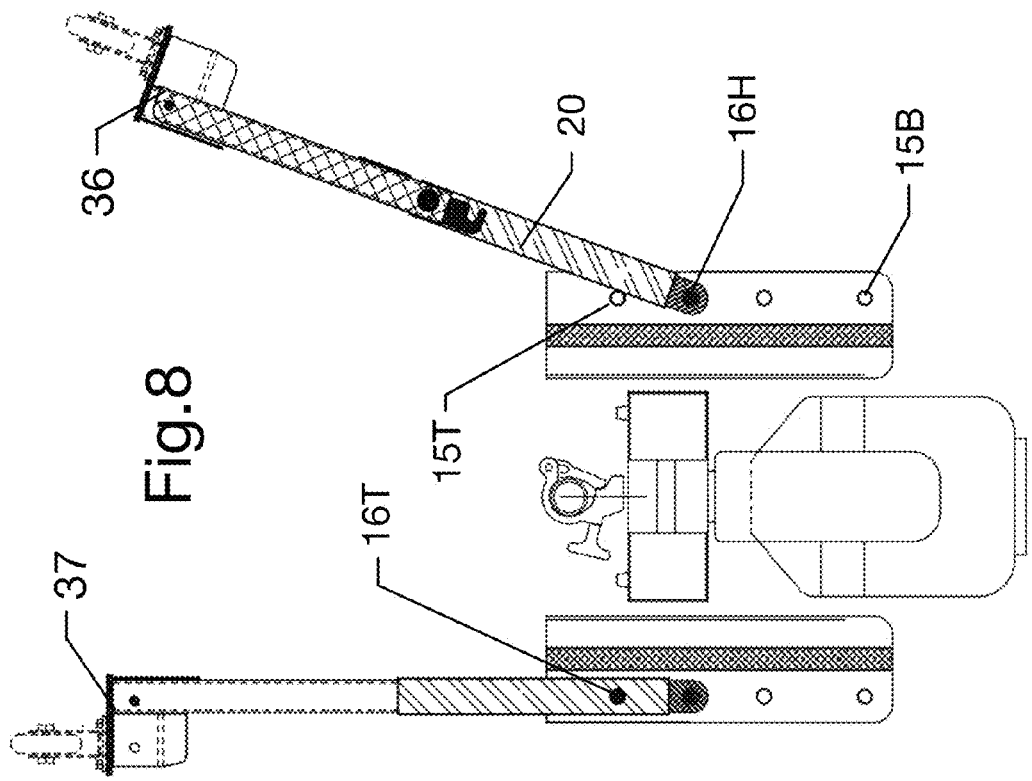
FIG. 8 is a detail endwise view of leg carriages in both hinging and locked use positions.
Figure 9:
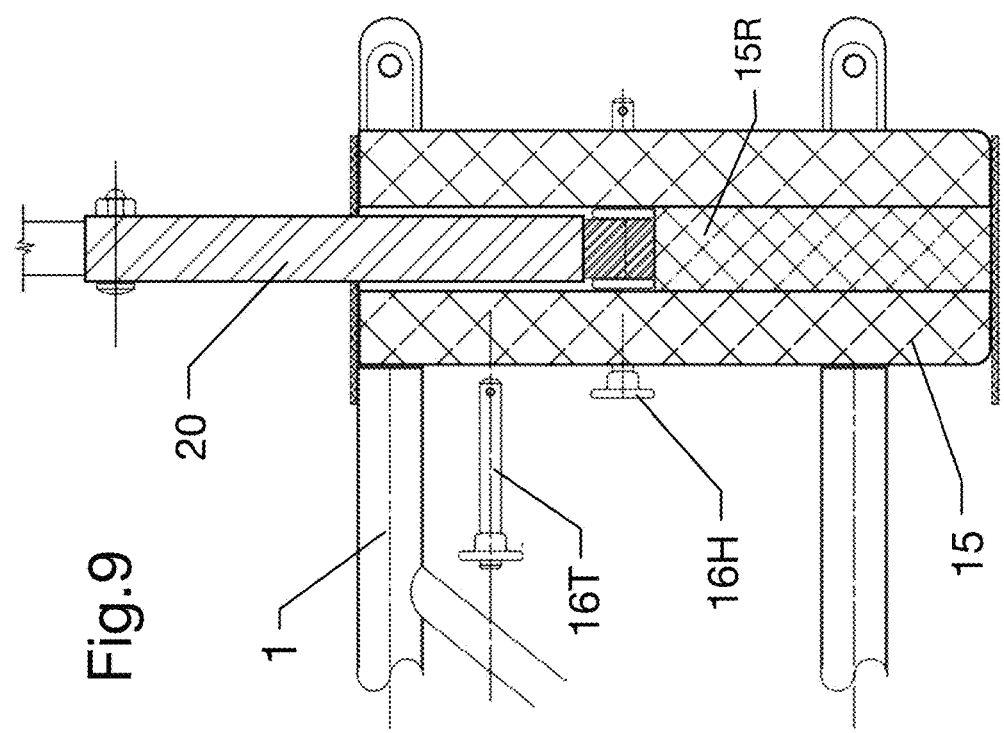
FIG. 9 is a detail side view showing the locking/unlocking of the leg carriage to/from its transport mode.

In FIG. 8, the leg carriage with plate 36 is shown as partially rotated upwards. The leg carriage with plate 37 is seen as fully rotated to the upward position, and as locked there by insertion of pin 16T (as is also seen in process in FIG. 9). (The same pin can be used for both the 15T and 15B pass holes, being transferred from one to the other as the leg is changed between modes.)

Figure 10:
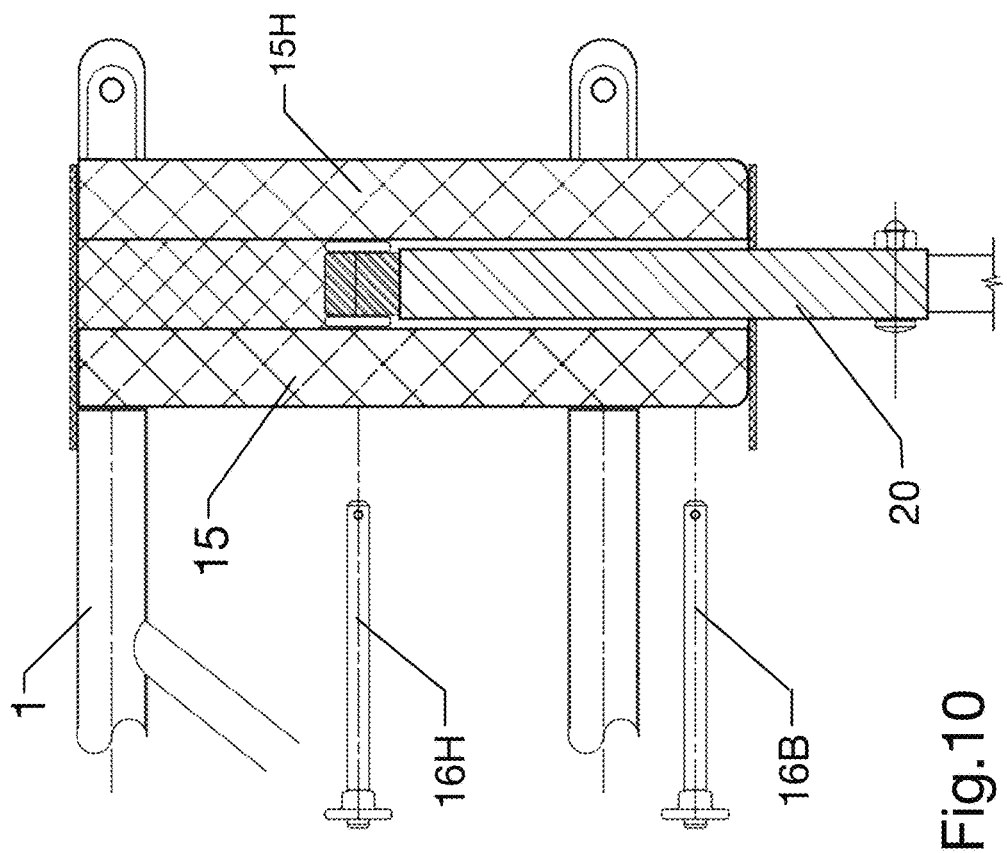
FIG. 10 is a detail side view showing the disconnection of a leg carriage.

FIG. 10 illustrates that, when separate storage of the leg carriage is desired, removing both the leg locking and the hinge pins allows its ready removal.

The time and effort required for conversion to and from transport and use modes is substantially reduced; the problems of binding and mis-pinning eliminated; and potentially one worker might perform the conversion, where two are presently required.

As seen in the Figures, the leg carriage horizontals 54 are substantially in the same plane as the vertical legs and the hinge axis. Eliminating the offset between the leg and carriage horizontal centers required by Dodd, greater clearance is provided for motors and rigging, without requiring end-for-end reversal of the carriages.

Temporary stiffeners between two members of a truss structure are well known, typically between two parallel members; often for the purpose of stiffening; often performed with a "snap-brace", a length of tubing with a hook at each end that latches over a tubular truss member.

In the Dodd-type truss, the two leg carriages being independent of each other, their leg verticals can flex under high loads and/or at tall extensions, particularly when their casters encounter obstacles and irregularities. Because the footprint of the casters has been narrowed for both the 24" width of the truss structure and further by the recessing of the caster centers towards the section's elongated centerline, such that the casters will nest between the top chords of another truss section when stacked atop it, the result is a safety and stability concern. For this reason, stiffeners/snap braces are employed between two carriage leg verticals or horizontal rails on opposing sides, to stiffen them and thereby reduce such flexing and the risks that it presents.

Such "snap-braces" represent loose parts that require additional handling to remove; storage when not in use; and may be neglected or mis-located in restoration. For decades, some truss structures have employed captive stiffeners that have been fixed to one member at the desired position, and travel attached to the structure in shipping.

The instant disclosure includes several captive stiffener designs.

The prior figures illustrate one captive stiffener design having several advantages. As illustrated, it remains attached to the leg, and is retracted by a spring (or other means) against the leg when not in use. It can be lowered and locked with the use of a foot, without bending down. A foot-operated release can be provided.

FIGS. 4A-4C illustrate.

Figure 12:
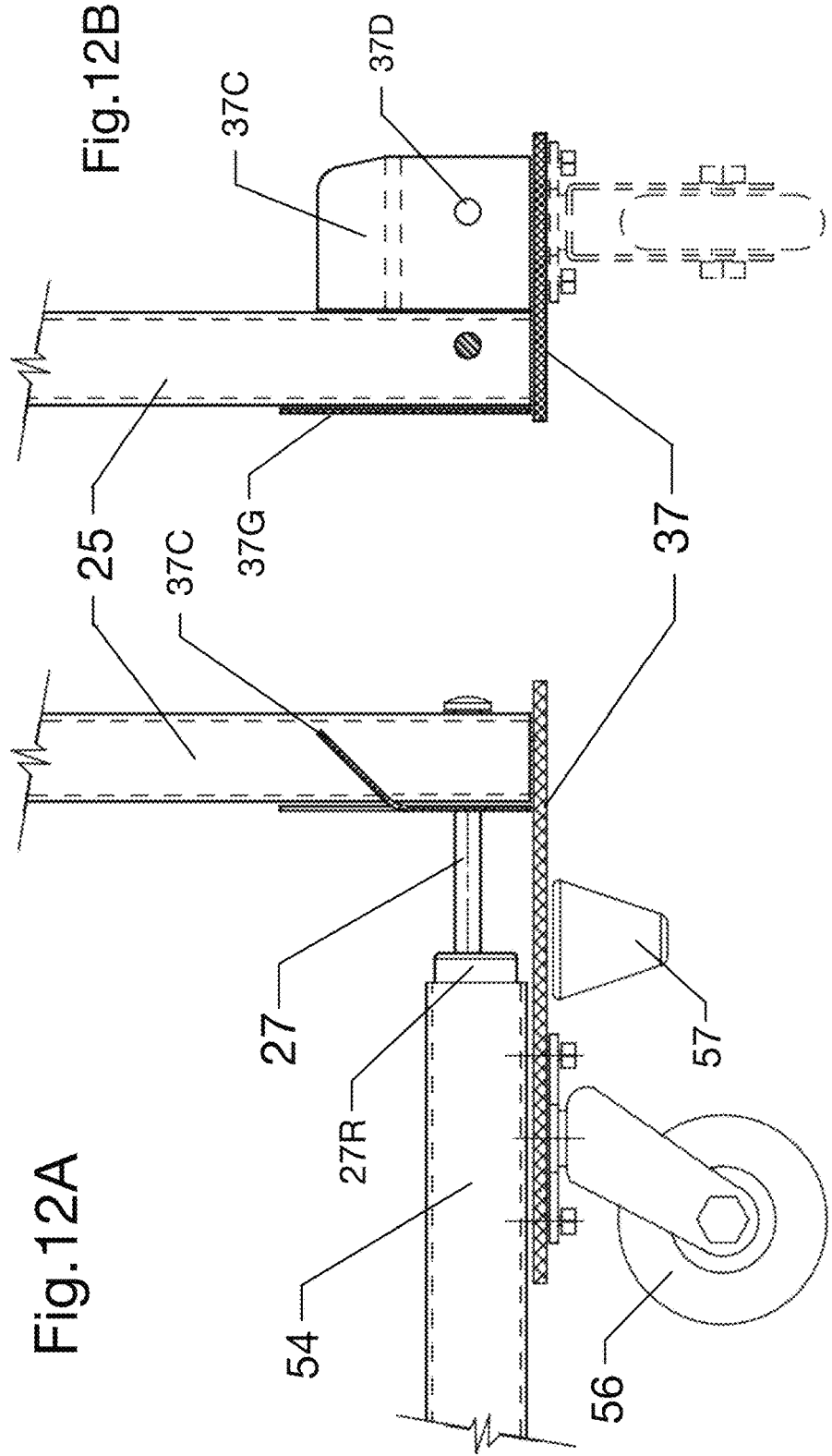
FIG. 12A is a side elevation detail of the stiffener illustrated in the prior Figures.
FIG. 12B is an endwise elevation detail of the same subject matter as the prior Figure.

A U-shaped member 30 is shown as provided with a pass hole 30A at one end and a hooked detail 30C at the other (In some views, end fittings are illustrated as alternatives.) On stiffener 30, a tab 30T and a mounting detail 30B for a latch 30L are both illustrated. As is seen in FIGS. 4D, 5, and 12, the base plates 36 and 37 on opposing leg assemblies are each provided with an axle, here illustrated, on plate 37, as bolt 27 passing through leg section 25 and into a fitting 27R in horizontal 24. At the opposing plate 36, bolt 26 will pass through hole 30A (or a fitting) in stiffener 30. Spring 31 urges/retracts the stiffener 30 upwards until tab 30T touches the face of the attached leg (as shown in FIG. 6). Pressing the stiffener downwards against the spring 31 will bring the hooked detail 30C to engage bolt 27. The stiffener could then latch to the bolt itself. Alternatively, illustrated here is a metal shape 37C on the base 37 and a spring-loaded plunger-type latch 30L on the stiffener 30. As the stiffener's free end approaches bolt 27, the latch's plunger contacts the angled face of shape 37C, which presses the plunger inwards until it reaches opening 37D, into which it snaps. Stiffener 30 is thus locked in position, as are the two carriage legs.

Other methods are possible.

Figure 13:
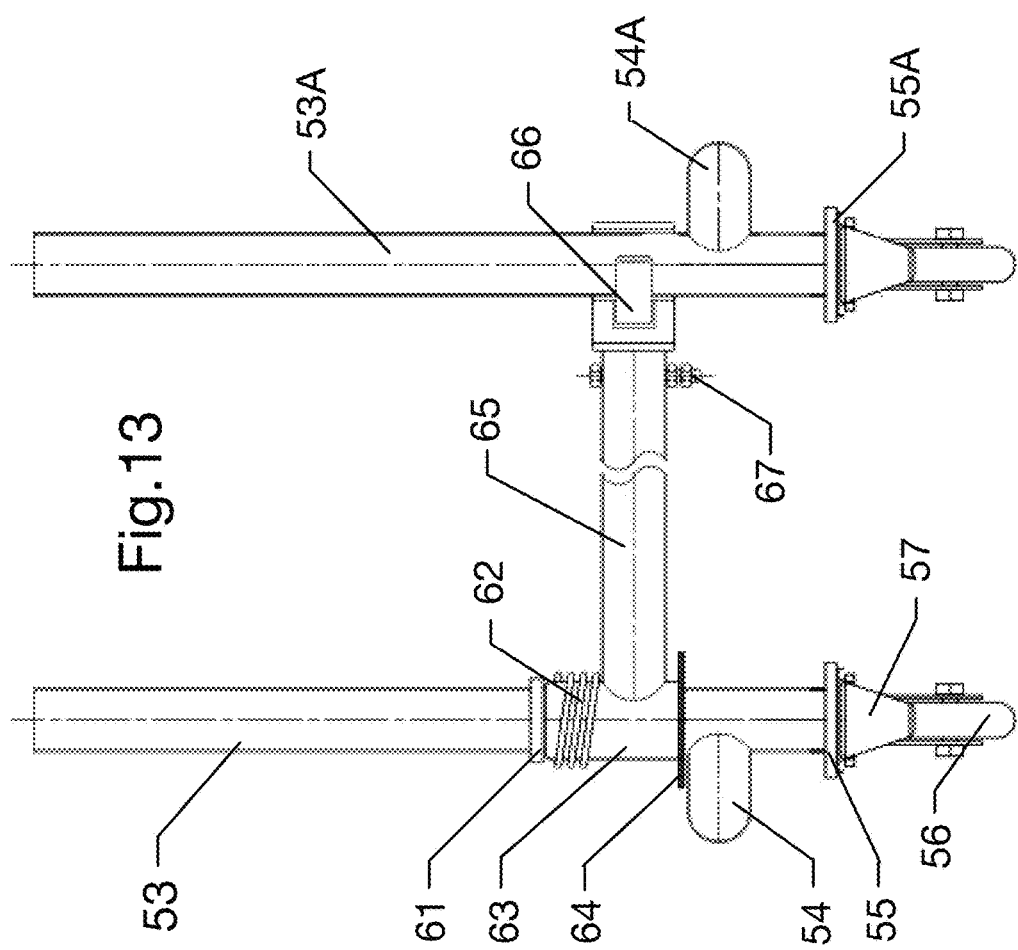
FIG. 13 is an endwise view of a stiffener adapted to rotate around a carriage member.
Figure 14:
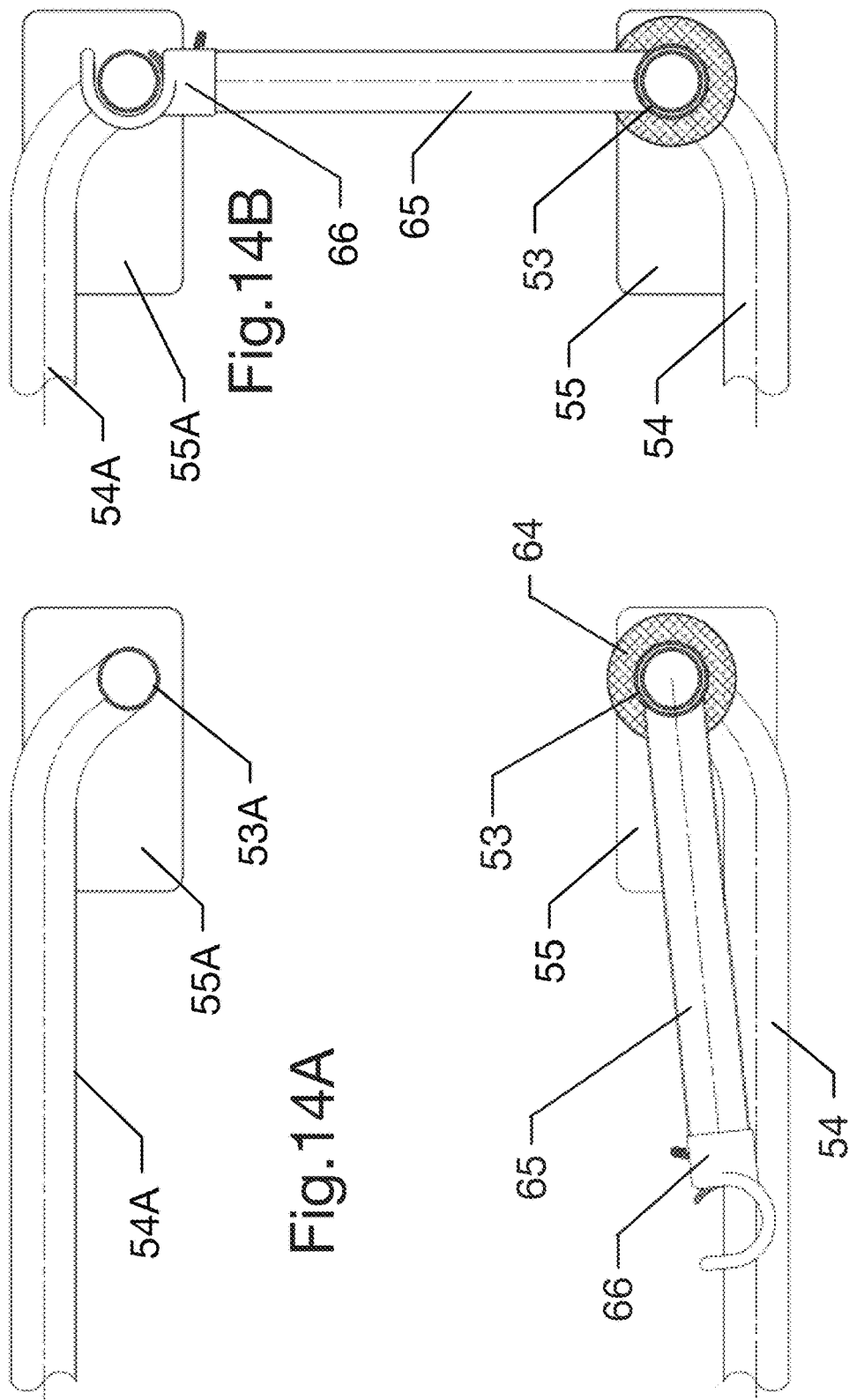
FIG. 14A is a plan view of the stiffener of FIG. 13 in "open" position.
FIG. 14B is a plan view of the stiffener of FIG. 13 when engaged with the opposing carriage.
Figure 15:
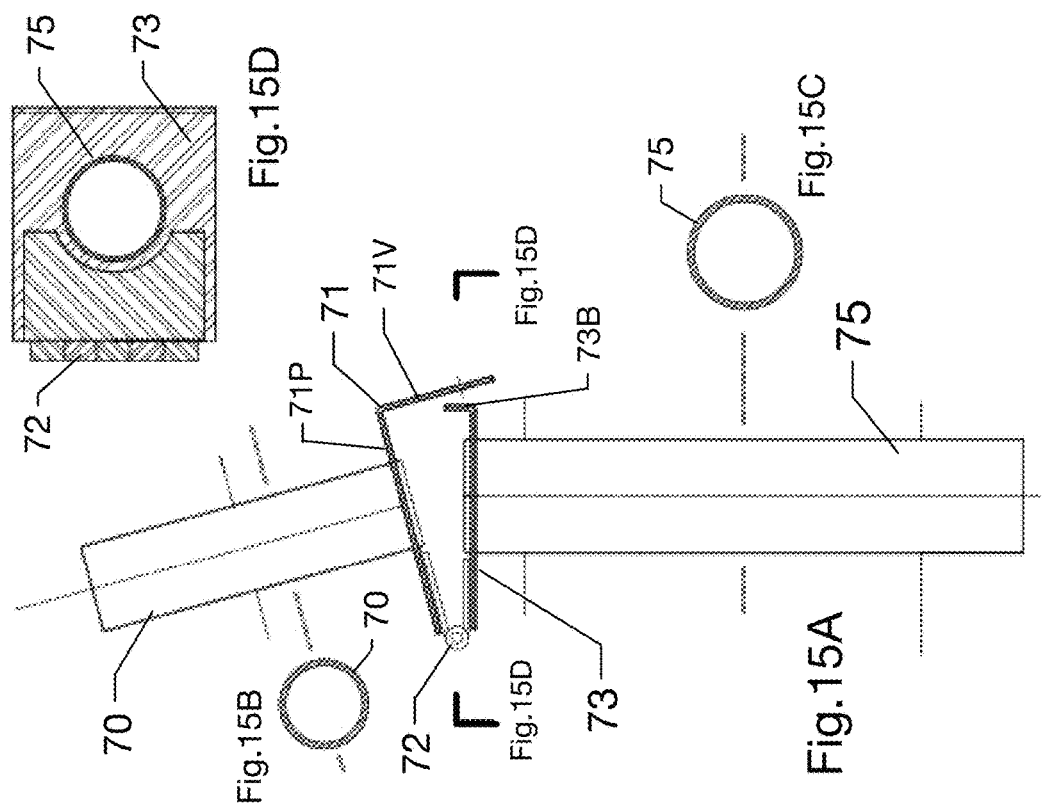
FIG. 15A is a general side elevation of a hinged leg adaptor shown hinged partially open.
FIG. 15B is a section through tube 70 of the adaptor of FIG. 15A.
FIG. 15C is a section through tube 75 of the adaptor of FIG. 15A.
FIG. 15D is a sectional view as indicated in FIG. 15A.
Figure 16:
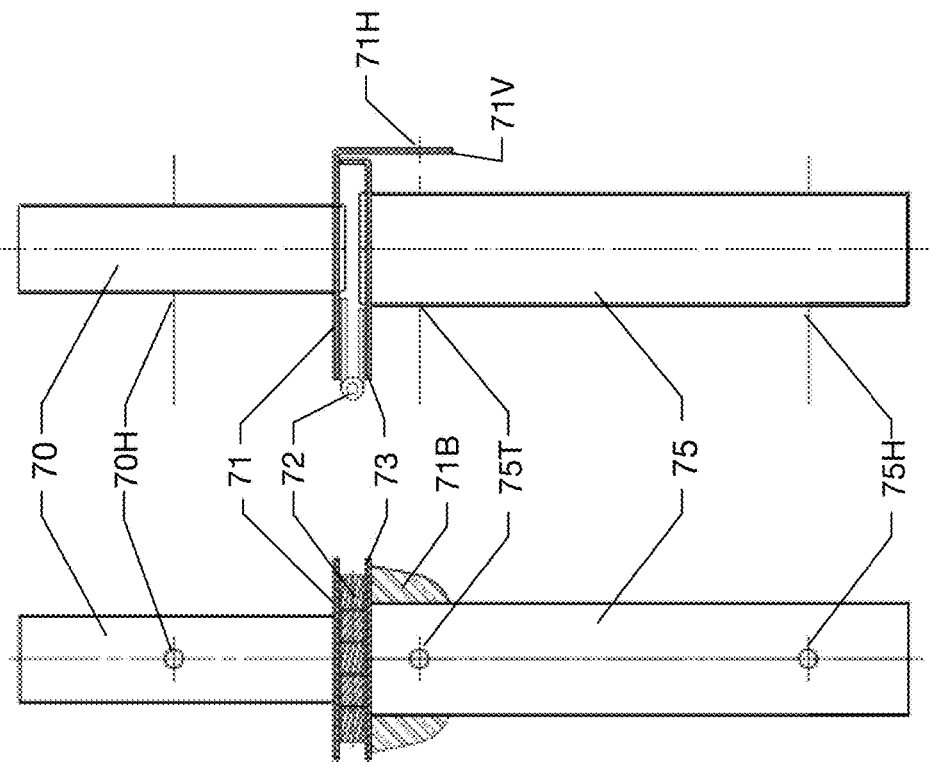
FIG. 16A is a front elevation of the hinged adaptor of the prior Figures.
FIG. 16B is a side elevation of the hinged adaptor of the prior Figures.
Figure 17:
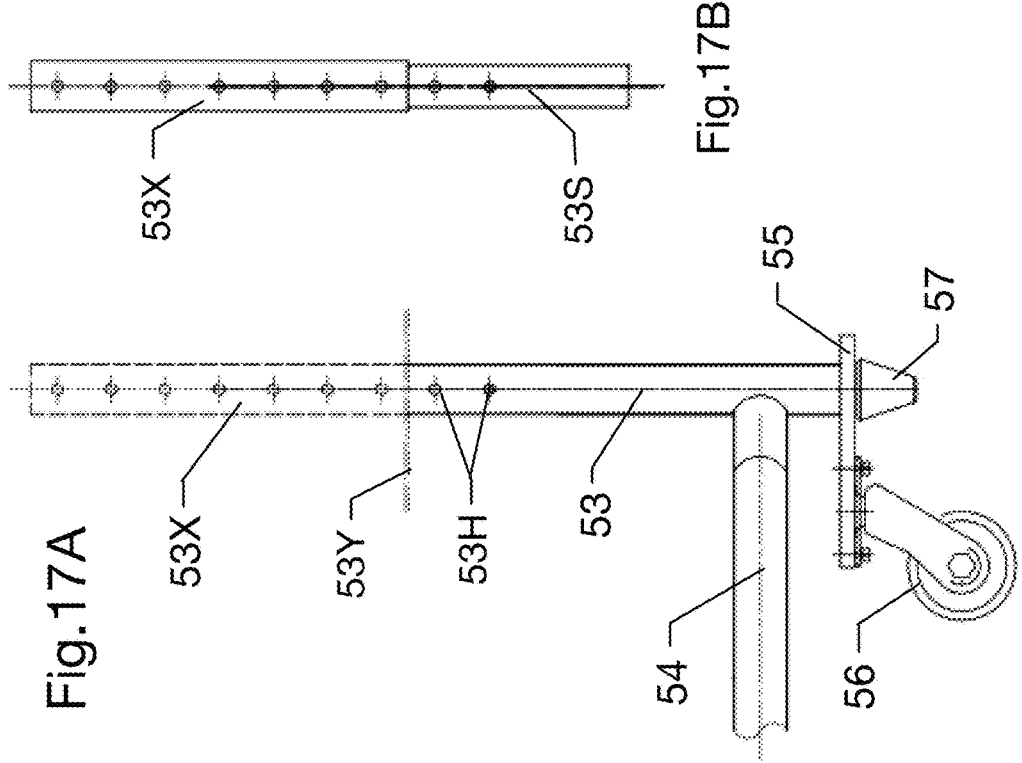
FIG. 17A is a front elevation of a leg carriage with a shortened vertical leg.
FIG. 17B is a front elevation of a vertical leg extension.

FIGS. 13-14B illustrate a captive stiffener 66 with a tube 63 that slip-fits over leg carriage vertical 52, and is terminated with a snap-brace fitting 66 on its free end. The stiffener is retained on the leg, here by locking collar 61. Optional disc 64 rides atop leg carriage horizontal 54. Spring 62 urges stiffener 65 towards horizontal 54 until a projecting fastener 67 (also serving to retain fitting 66) contacts the horizontal 54, resulting in stowage of the stiffener as seen in FIG. 14A. Alternatively, the stiffener can be manually moved to its stowage position and there maintained by a latch, spring clip, or other retainer. To engage the stiffener with the leg carriage opposite, the user swings the stiffener towards it until fitting 66 latches. A stiffener extending between vertical legs is shown, although one connecting the horizontals can be provided. The captive end, in that case, would permit attachment in the span of the horizontal.

A Hinged Leg Adaptor

FIGS. 15A-30C illustrate how the advantages of the disclosed approach can be brought to the existing Dodd/Tyler truss design and inventory, without any modification to the truss sections, and while allowing reuse of the prior art leg carriages.

FIGS. 15A-16B illustrate the core of one embodiment, a "hinged leg adaptor".

A lower portion of the adaptor is a tubular sleeve 75 whose interior diameter offers a slip fit for the tubing used for carriage leg vertical 53.

At one end, sleeve 75 as illustrated here is attached to a plate 73, also mounting one leaf of a standard hinge 72.

As seen in FIG. 15D, the large rectangular leaf of the hinge 72 has been notched around the attachment of the tubular sleeve 75.

An upper portion of the adaptor includes another tubular stud 70 whose outer diameter offers a slip fit into the leg receiver tubes 37-40 installed in the corners of Tyler/GT truss sections. The upper portion/stud 70 is attached to a second plate 71, which is attached to the other leaf of the hinge 72.

As illustrated in FIGS. 16A and 16B, pass holes including 70H, 75T, and 75H are provided in the tubular elements 70 and 75 for various purposes.

In this embodiment, at least one edge 73B of the lower plate 73 is formed, such that, when plates 71 and 73 are parallel, the weight of the truss bears down on both hinge 72 and on the braked edge 73B where it contacts upper plate 71. Many other methods of distributing weight and of establishing and/or maintaining alignment are possible. A projection from one adaptor portion could insert into the other for alignment, to resist shear loads, and/or to provide a shoulder for weight bearing.

Here, one edge 71V of the upper plate 71 is braked or otherwise configured to project downwards past the lower plate 73 and will be employed in one possible embodiment of a lock used in transport.

It will be understood that many suitable variations and embodiments are possible, including those in which the illustrated hinge and plate are a single construction, with or without all or part of the upper or lower elements incorporated.

FIGS. 16A and 16B offer side and front elevations of the adaptor of the prior Figures in a closed position.

The upper stud 70 is illustrated as having at least one pass hole 70H.

The lower sleeve 75 is illustrated as having at least a pass hole 75T that aligns with a pass hole 71T in vertical face 71V of plate 71, and also a pass hole 75H.

FIG. 17A illustrates a revision to the prior art Dodd/Tyler leg carriage to adapt it for use with the invention. A leg carriage for the purpose can also be fabricated.

In the prior art design, leg vertical 53 is welded to a plate 55, which mounts both a caster 56 and a stacking cone 57. The vertical leg 53 is provided with regularly spaced pass holes 53H. The vertical distance between plate 55 and the truss section, in the Dodd/Tyler design, is determined by the degree of insertion of leg 53 in receiver tube 40, which relationship is fixed by means of a locking pin inserted through pass hole 40H in the receiver tube 40 and one of the pass holes 53H in leg 53.

In this embodiment of the instant invention, the leg vertical will be inserted into sleeve 75, which extends below the bottom of the truss's leg receiver tube 40, so that a shorter vertical leg 53 is necessary to maintain a similar, useful, range of height adjustment. In the "recycling" approach, illustrated in FIG. 17A, vertical leg 53 of a prior art Dodd/Tyler design carriage can be cut at a point 53Y to compensate. As shown in FIG. 17B, the leg portion removed, 53X, (or a fabricated equivalent) can be provided with a sleeve 53S, which can be reinserted in a shortened vertical leg and be fixed with a suitable fastener when the full height of prior art leg 53 is desired for use of a leg carriage in the prior art manner. Additional pass holes 53H may be desirable in the lower portion of a shortened leg.

Figure 18:
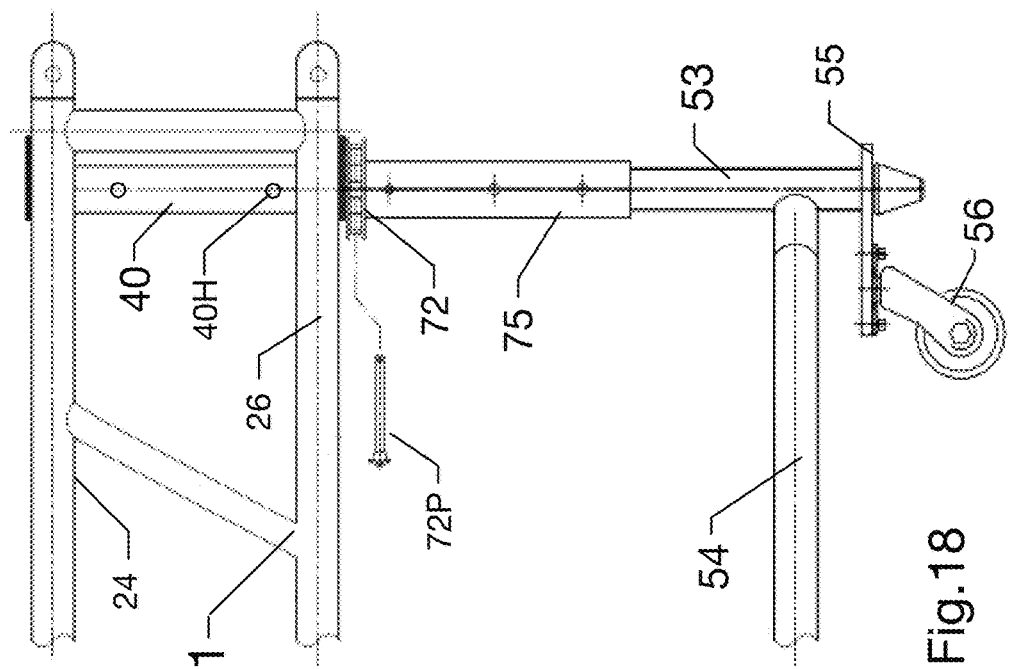
FIG. 18 is a front elevation of a truss section end with a hinged leg adaptor in use.
Figure 19:
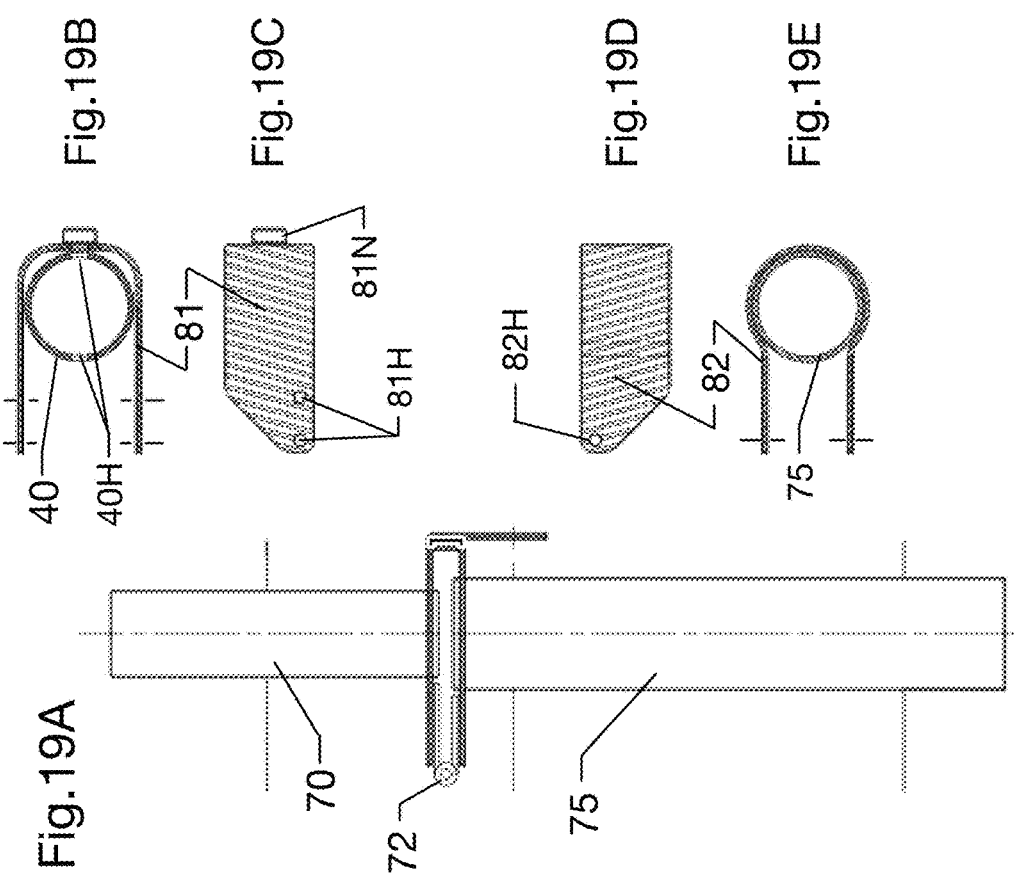
FIG. 19A is a side elevation of the hinged leg adaptor provided for reference with FIGS. 19B-19E.
FIG. 19B is a plan view of an upper up-lock bracket 81 in installed relation to a truss leg receiver tube 40.
FIG. 19C is a side elevation of the upper up-lock bracket 81.
FIG. 19D is a side elevation of a lower up-lock bracket 82.
FIG. 19E is a plan view of the lower up-lock bracket 82 as installed on sleeve 75 of a hinged leg adaptor.

FIG. 18 illustrates stud 70 of the hinged leg adaptor as inserted in receiver tube 40 of the truss section 1. Pass hole 70H in stud 70 aligns with pass hole 40H in receiver tube 40 and a locking pin or other fastener can be used to retain stud 70, and therefore, the hinged leg adaptor, to truss 1.

The shorter leg carriage vertical 53 is inserted in sleeve 75 of the hinged leg adaptor to the extent required to achieve the desired vertical clearance of truss 1 and a fastener inserted through (or latch provided) for fixing the adjustment, including by insertion through aligned pass holes 75H in sleeve 75 and pass holes 53H in leg 53.

Hinge 72 is illustrated here in a known "loose pin" variation in which the hinge halves are connected by a removable pin 72P. Thus, the leg carriage can be removed from the truss section 1 by separating the hinge halves at both truss/carriage ends by pulling hinge pins, or by removal of the leg carriage along with the complete hinged leg adaptors still attached, by removing the fasteners extending through the pass holes 40H in the receiver tube 40 and 70H in stud 70.

(In various embodiments, locking pins or bolts are illustrated as simple solutions, but it will be understood that other means and mechanisms may be employed.)

FIGS. 19A-19E are various views of one embodiment of a means for locking the leg carriage in a position suitable for use, for example. of fixtures hung in the truss.

FIGS. 19B and 19C are a plan and side elevation, respectively, of an "upper up-lock bracket" 81. The illustrated version is a U-shaped form sized to fit around leg receiver tube 40 in the truss section 1. Bracket 81 is illustrated with two sets of pass holes 81H aligned through both sides of the bracket, as well as a nut plate 81N aligned with a pass hole to the bracket interior, shown aligned with pass holes 40H in leg receiver tube 40.

FIGS. 19D and 19E are a side elevation and plan, respectively, of a "lower up-lock bracket" 82. The embodiment illustrated is a generally U-shaped form sized to fit around hinged leg adaptor sleeve 75, and having an overall span between its two sides or an offset (among other alternatives) permitting it and bracket 81 to mate with pass holes 82H aligning with one pass hole set 81H in bracket 81.

Figure 20:
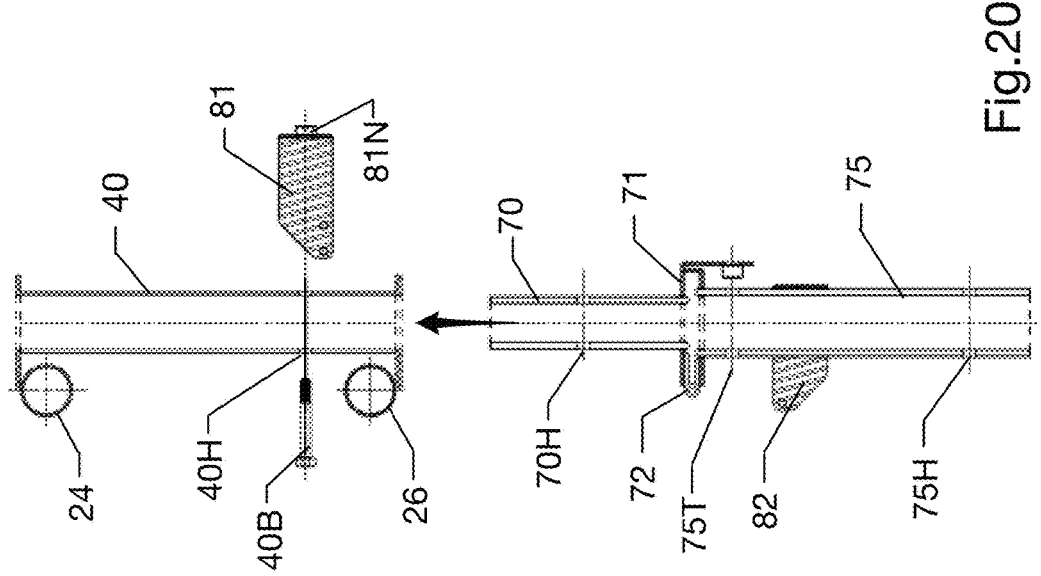
FIG. 20 is an exploded section of a truss showing a hinged leg adaptor and both up-lock brackets.

FIG. 20 is an exploded section through both the truss and adaptor showing the relationship of the parts.

Figure 21:
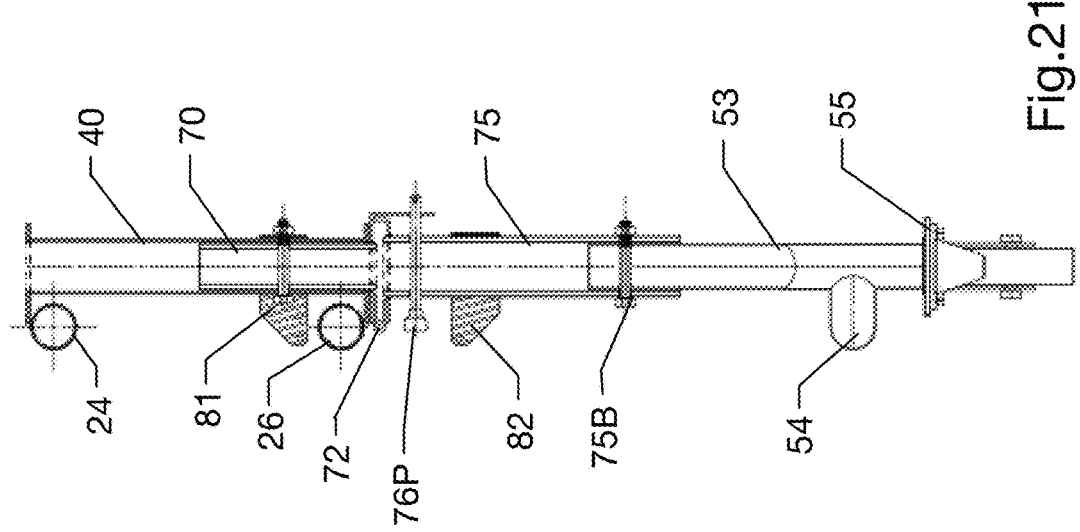
FIG. 21 is a section of a truss with an assembled hinged leg adaptor installed.

FIG. 21 is an assembled version of the same view as the prior Figure.

Figure 22:
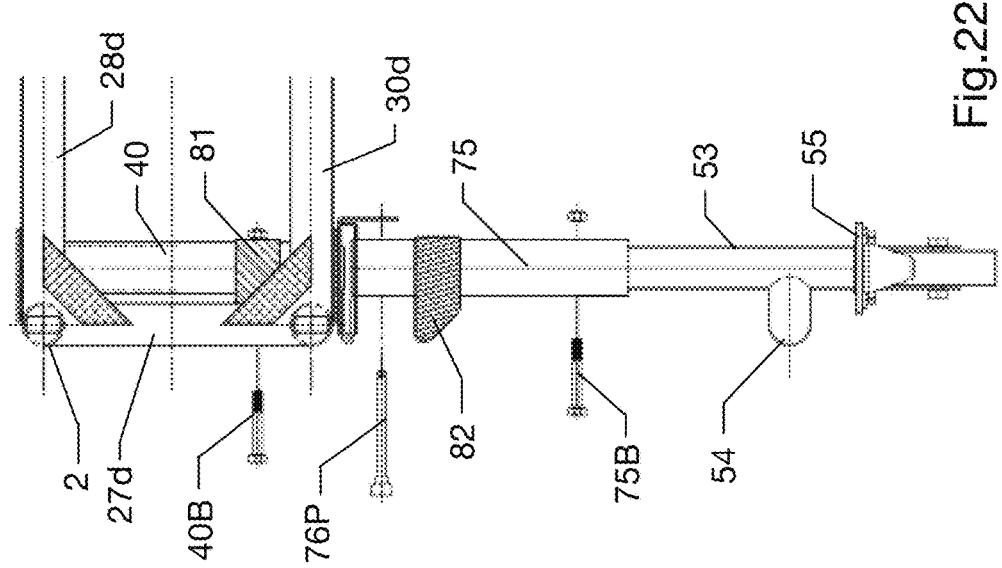
FIG. 22 is an end elevation of the truss of the prior Figure with attention to the fasteners employed.

FIG. 22 is an end elevation from the same perspective as the prior Figures with emphasis on the fasteners employed in the illustrated embodiment.

FIG. 23 is a front elevation of the same subject matter as the prior Figures.

As illustrated in the Figures, a bolt 40B is inserted through pass hole 40H in leg receiver tube 40, as well as (stud 70 having been inserted in tube 40) also through pass holes 70H in stud 70 to captivation by nut plate 81N of upper up-lock bracket 81. The upper portion of the hinged leg adaptor is thus secured to the truss and also bracket 81 to leg receiver tube 40.

Bolt 75B inserts through pass holes 75H in leg sleeve 75 of the adaptor; also through one set of the pass holes 53H in leg vertical 53. Thus, the vertical clearance below the truss is fixed as is necessary for the application and, as will be seen, will not be disturbed by other operations involving the leg carriage.

Pin 72P has previously been described as permitting separation of the halves of hinge 72, and therefore, removal of the lower portion of the adaptor with the leg carriage still attached.

Locking pin 76P inserts through pass holes 75T in leg sleeve 75 and thence through pass hole 71H in face 71V of plate 71. Thus, hinge 72 is locked closed and the leg carriage attached to sleeve 75 is fixed vertically below the truss section for transport.

Removal of locking pin 76P from the adaptors on both ends of a leg carriage allows rotation of the leg carriage around their hinges 72.

FIG. 24 illustrates the leg carriage as rotated 180 degrees from its transport position to an upward "use" position, where it can be locked by inserting a pin 83P in now aligned pass holes 81H and 82H of the upper and lower up-lock brackets 81 and 82 (or by another method).

With the provision of the adaptor and its hinge, the leg carriage can be moved between a downward shipping position and an upward use position generally comparable to the approach illustrated in the early Figures—but without modification to the present Dodd/Tyler/GT design truss itself, and with none of the drawbacks of the Dodd design as have been described.

It will be seen that the truncation of the carriage leg vertical 53, because it need no longer extend into the leg receiver tube 37-40 of the truss, means that the leg carriage, when hinged upward, extends a far shorter distance above the top chord 24 of the truss than does an inverted carriage of the Dodd design.

The value of carriage-as-catwalk-handrails has proven limited, including because it cannot replace the requirement for a known horizontal fall arrest system, and because of the other drawbacks and considerations described. These often result in the leg carriages being stripped from the truss and stored instead, which is at least as time and labor demanding.

The illustrated hinged leg adaptor reduces the vertical profile of inverted carriages, addressing both the visual and practical problems with their inversion in the Dodd design, such that their removal will less frequently be required.

Improved methods for storing leg carriages are also disclosed in this and in co-pending provisional application Ser. No. 15/583,103 filed 1 May 2017, included in its entirety by reference.

FIG. 25 illustrates that additional upward positions/angles for the leg carriages can be provided for, here by use of alternate pass holes 81H in upper bracket 81, which allows additional working clearance between the leg carriage horizontal 54 and the truss upper chord 24.

FIGS. 26A-26C summarize how the disclosed invention offers truss transport and several use configurations.

It should be understood that the various embodiments shown are for illustrative purposes, and should not be understood as limited except by the scope of the allowed claims.

For example, there are many approaches suitable for locking the leg carriages.

In the prior Figures, upper up-lock bracket 81 is illustrated as retained by bolt 40B, which also locks the stud 70 of the adaptor into truss leg receiver tube 40. No physical alteration is therefore required to existing Tyler trusses themselves. This illustrated embodiment, however, complicates removal of the hinged leg adaptor.

FIGS. 27A-27C illustrate one variant of an upper up-lock bracket design that permits ready, independent insertion and removal of the stud 70 in leg receiver tube 40, in the prior art manner. Upper up-lock bracket 84 is fixed to the leg receiver tube without use of receiver tube pass hole 40H. As here illustrated, two flat plates 84A and 84B are employed in assembling bracket 84, each plate having pass holes 84H for use with pass holes 82H of a lower up-lock bracket 82 in fixing the leg carriage with a locking pin in use position(s) in the manner previously illustrated. Here, bolts (e.g. 84D) extend through aligned pass holes 84E in the plates 84A and 84B and through spacers (e.g., 84C) and are tightened to clamp between the plates the outer surface of leg receiver tube 40. The shape of plates 84A and 84B at an edge 84E conforms to the profile of the external surface of lower truss chord 26, which maintains bracket alignment. In this embodiment, locking pin 40P serves only to retain the adaptor stud 70 in the leg receiver tube 40 in the same manner as is vertical leg 53 in the prior art Dodd design.

Figure 28:
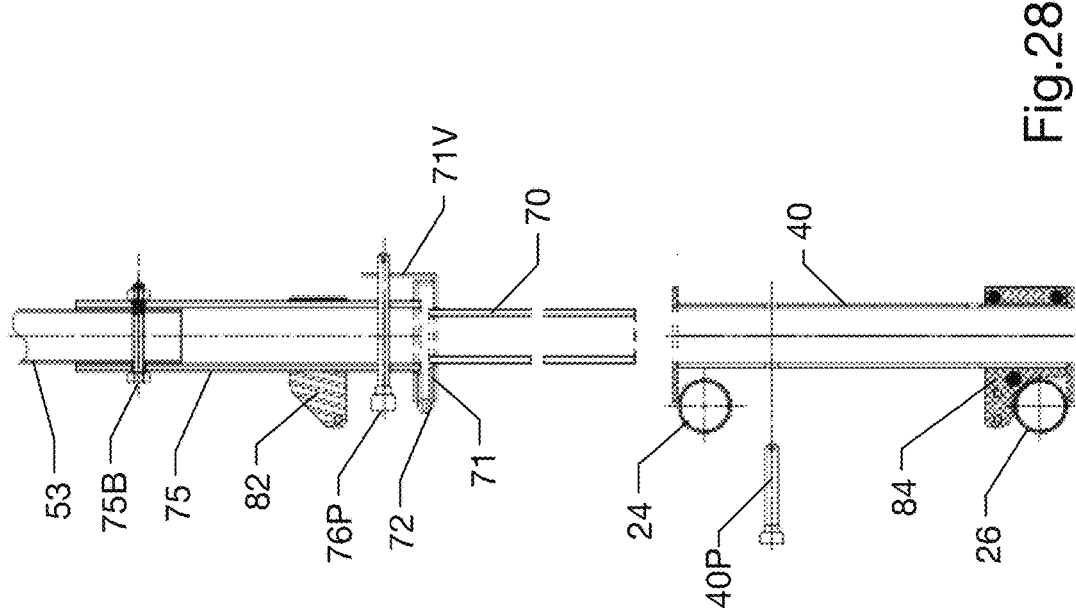
FIG. 28 is a section through the truss illustrating the insertion of the hinged leg adaptor with the leg carriage attached, inverted in the top opening of the truss leg receiver tube 40.

Thus, as FIGS. 28 and 30C illustrate, a leg carriage can not only be removed with the complete hinged leg adaptor still attached to each vertical leg 53, but can be inverted; reinserted in the top opening of leg receiver tube 40; and can be re-pinned in the prior art Dodd manner, to form the "handrails" of the Dodd design, and with carriage horizontal 54 oriented either towards or away from the elongated centerline of the truss (as is illustrated in FIG. 30C) as is desired.

FIGS. 29A and 29B illustrate another example variant, this in a means for locking the leg carriage under the truss during transport.

Where the embodiment of earlier Figures illustrates a locking pin 40P passing through aligned pass holes 40H in leg sleeve 40 and a set of pass holes 53H in vertical leg 53, then engaging a pass hole 71H in the vertical face 71V of bracket 71, a lock, here, is illustrated that offsets the axis of the locking pin 40P so as not to intersect either leg 53 or adaptor sleeve 75. As illustrated here, a part 77 attached to (or formed or fabricated in) lower plate 73 includes an opening 77H that is aligned with a pass hole 71H in vertical face 71V of plate 73. Insertion of pin 76P through pass hole 77H to engage pass hole 71H locks the hinge closed for truss section transport, independently of adaptor retention to the truss.

FIGS. 30A-30D illustrate that the present invention permits a variety of useful configurations, with dramatic reductions in the time and effort required, as well as reducing or eliminating known problems with the prior art Dodd design.

With Various Truss Types

It should be specifically understood that the advantages achieved are not limited to this general "pre-hung" truss type, or to the specific construction of the prior art Dodd/Tyler/GT design. Other truss designs can, with provision for permanent or temporary attachment of a leg hinge fitting or equivalent, employ the same or similar approach.

FIGS. 31A-31E illustrate several different truss cross-sections/configurations, presented in the same drawing and scale for comparison.

FIG. 31A is the cross-section typical of the low-profile "pre-hung" truss type as is employed in the Dodd/Tyler and in both the Gross/Production Resource Group and Christie variants.

FIG. 31B is an end elevation of the "20.5" general-purpose truss, long in widespread use in a variety of applications. FIG. 31C is an end elevation of the common "12x12" type as also widely employed. FIGS. 31D and 31E are views of an improved "5-chord" truss as previously disclosed by the applicant.

The retention of a hinged and/or separable connection between a truss and a leg carriage does not require a truss with a leg receiver tube 40, including of a "pre-hung" type. One portion of a hinge feature comparable with plate 71 can be formed in or attached to the truss itself, or to a mounting provision on the truss, either permanently or by clamping or by another method.

Similarly, a feature generally comparable to plate 11T of FIG. 11 with its hole 11C (or to the plate seen in FIG. 5 of Dodd '913 at the top 64 of the leg receiver sleeve/tube) can be provided on the nominal top face of a truss, permanently or temporarily, to accept stacking cone 57 of the leg carriage of a truss above.

Pre-hung trusses of the Dodd/Gross/Christie type are specialized, and their use largely limited to lighting applications and providers. Their labor saving advantages in "pre-hanging" lighting fixtures and other loads are not available in the use of general-purpose types, which are in far wider distribution.

FIGS. 32-36 illustrate one embodiment of how the benefits of the applicant's invention can be quickly and inexpensively brought to many truss types, including such generic types.

A structural member 90, here illustrated as a section of channel, spans at least the distance between two lower chords of a truss. Provisions to engage the truss by such lower chords are illustrated as brackets/flanges 91A-91H, which can be shaped to receive the lower truss chords, clamped in place by a hinged cover (e.g., 92A), which will be recognized as a standard half scaffold clamp or "half-cheseboro" detail and component. Here, the outboard brackets/flanges (e.g., 91A) are also provided with pass holes (e.g., 91AH) serving the same function as those in upper up-lock brackets 81 or 84 as previously illustrated.

Figure 34:
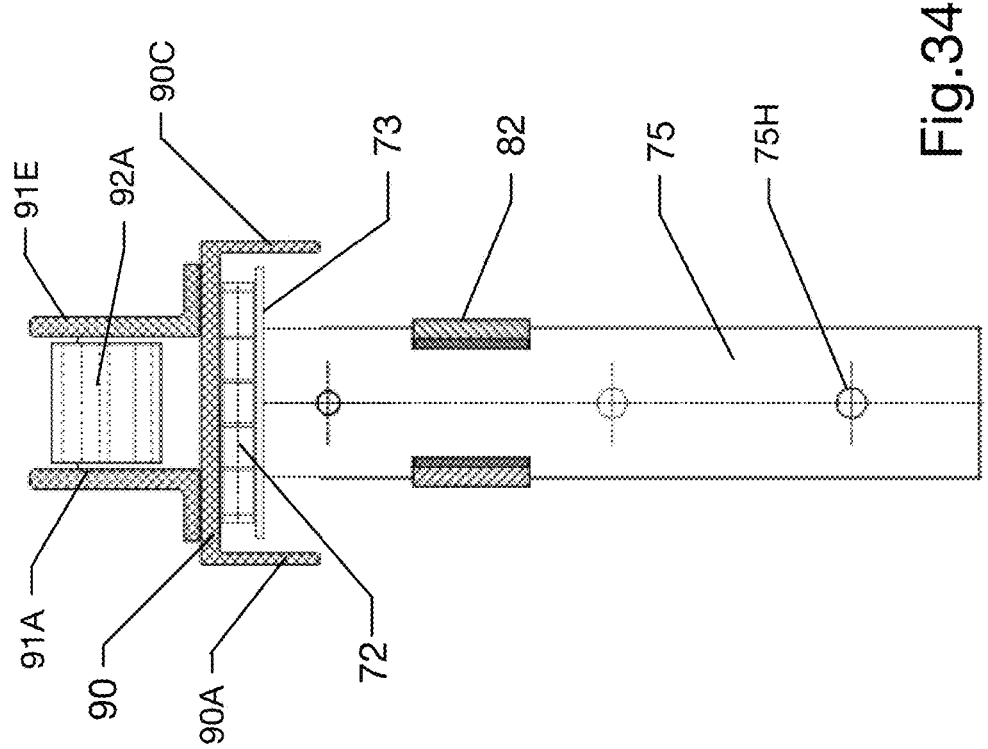
FIG. 34 is an end elevation of the truss cradle of the prior Figures.

FIGS. 33A and 34 illustrate the attachment of one leaf of a hinge (e.g., hinge 72) to the underside of member 90, and the other leaf (visible in outline 73L) is attached to a plate 73 also mounting a leg sleeve 75, forming an assembly comparable to that of the hinged leg adaptor embodiment previously illustrated. Any suitable method for locking sleeve 75 in its perpendicular position for truss transport can be employed, including those illustrated in prior Figures. Similarly, a removable hinge pin can permit separation of the leg carriage at the hinge.

Figure 32:
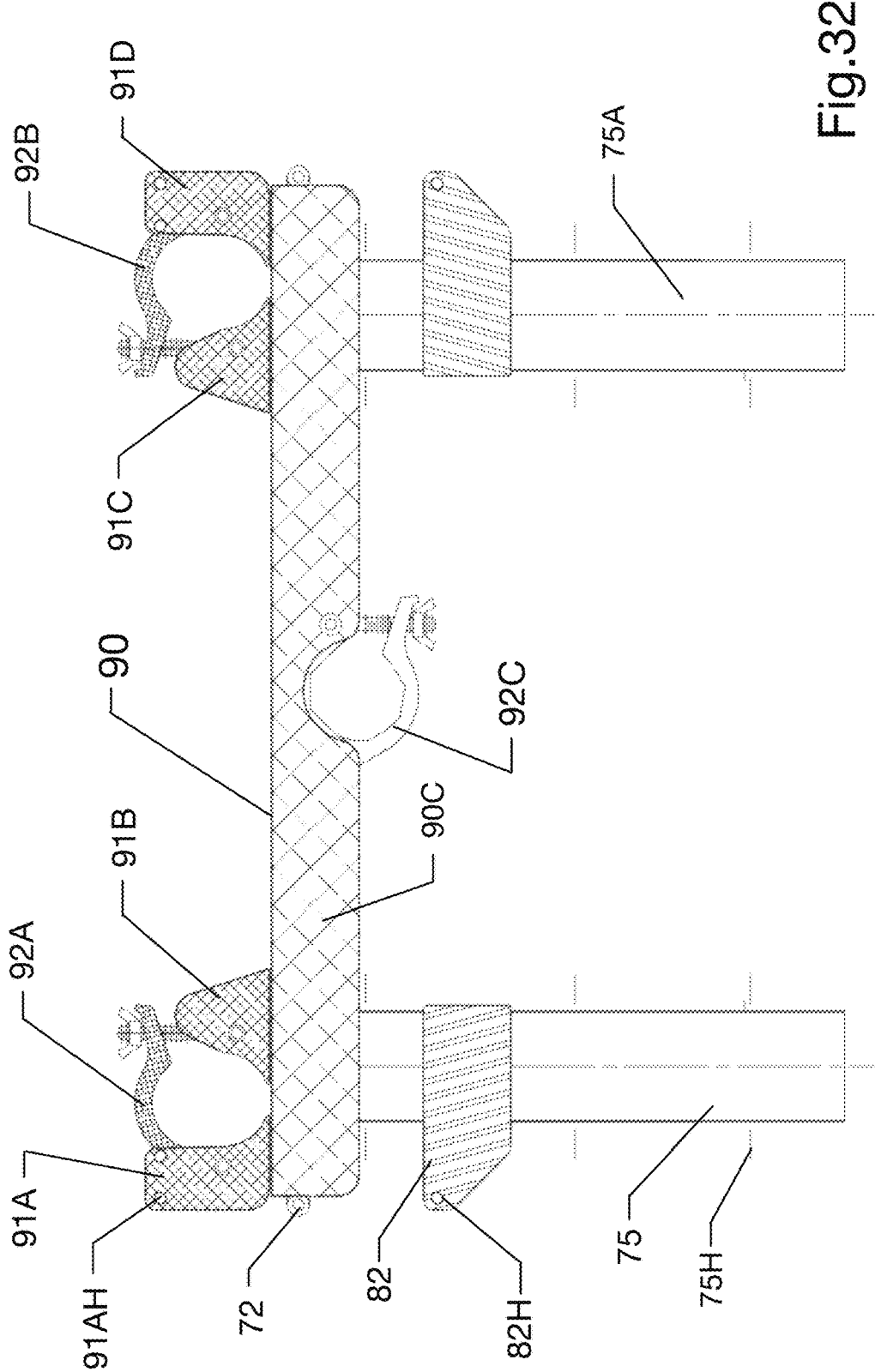
FIG. 32 is a side elevation of a truss cradle.
Figure 33:
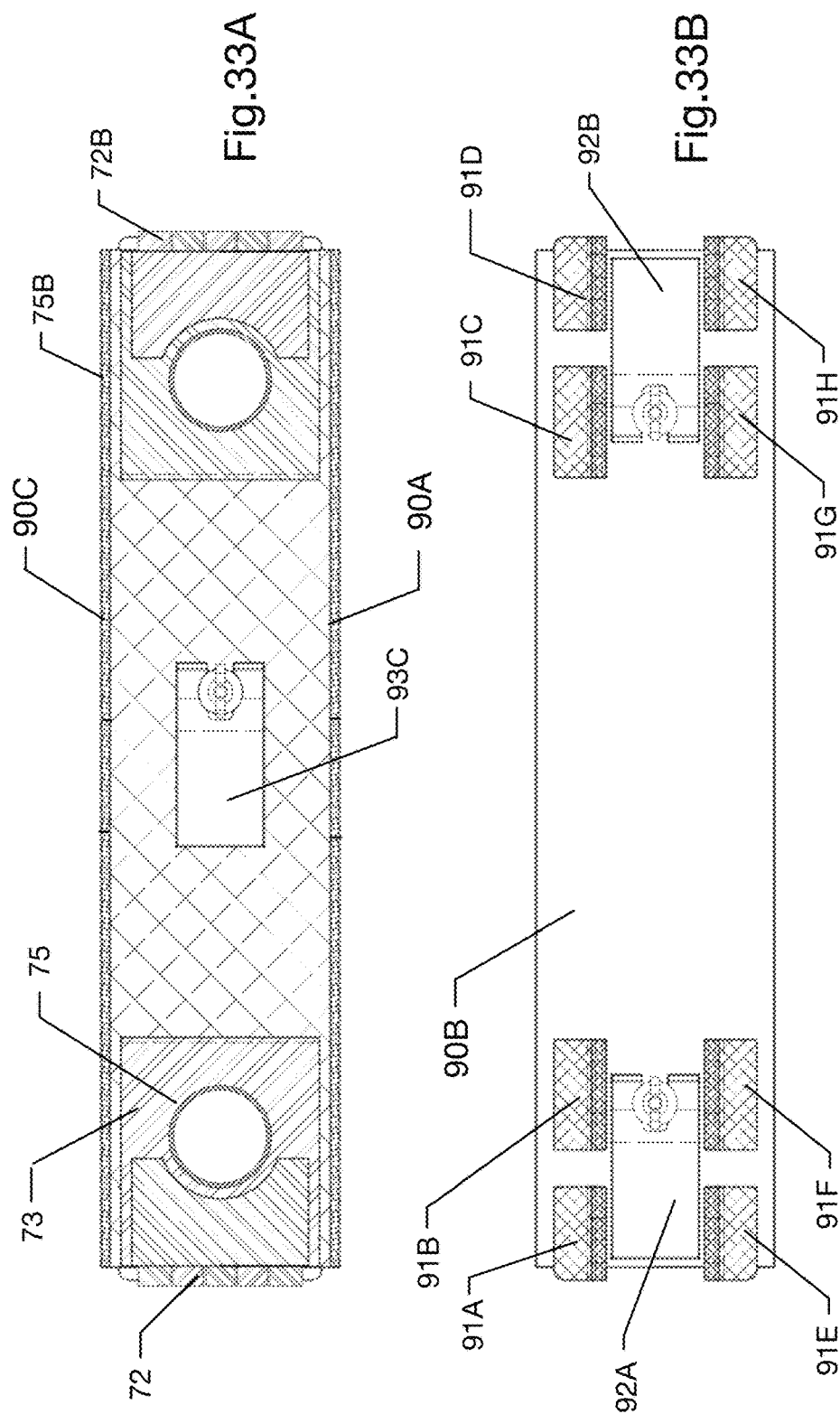
FIG. 33A is a reverse plan view of the truss cradle of the prior Figure.
FIG. 33B is a plan view of the truss cradle of the prior Figures.

A typical generic truss, such as 20.5" truss type 1B, does not provide a continuous member along its centerline suitable for hanging fixtures and other loads, as does the "pre-hung" type 1 (e.g., member 36 in FIG. 31A) or the applicant's "five-chord" type (e.g., FIGS. 31D and 31E). The FIGS. 32 and 33A illustrate an additional detail (e.g., 93C) provided below member 90 to support a length 95 of suitable tubing for the purpose. Such supporting provision can be vertically dimensioned so that additional supporting connections for the added member (e.g., 95) can be made to those cross-members of the truss spanning between its low chords, by means of standard scaffold clamps/"cheseboros" (e.g., 96).

As illustrated in FIG. 35, another comparison, the same or similar leg carriage assembly can be employed for both the hinged leg adaptor and truss cradle.

Figure 36:
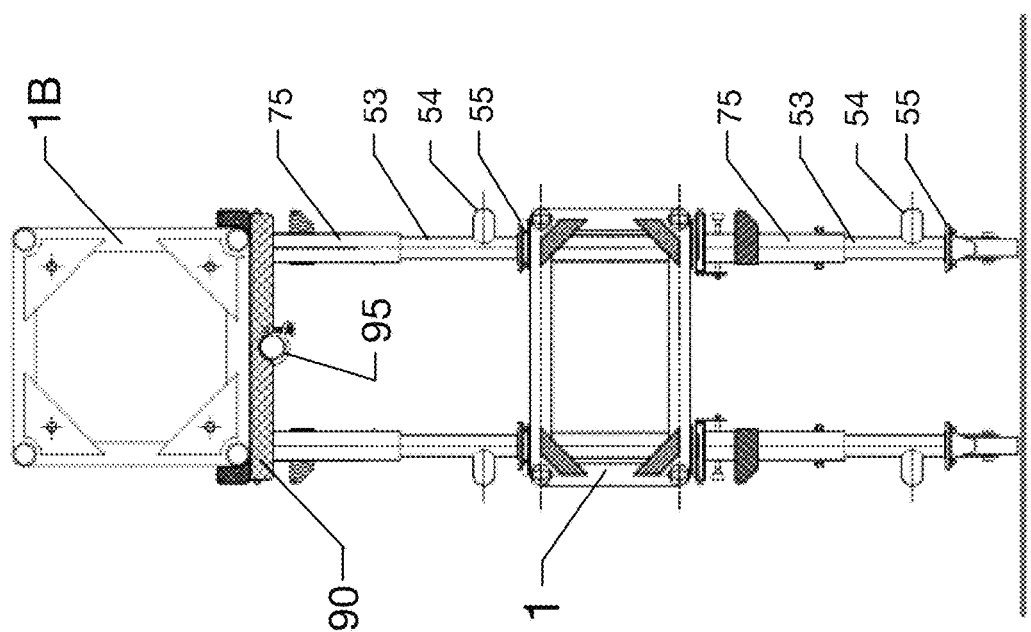
FIG. 36 is an end elevation of the two truss types illustrated in the prior Figure illustrating their compatibility in stacked transport.
Figure 37:
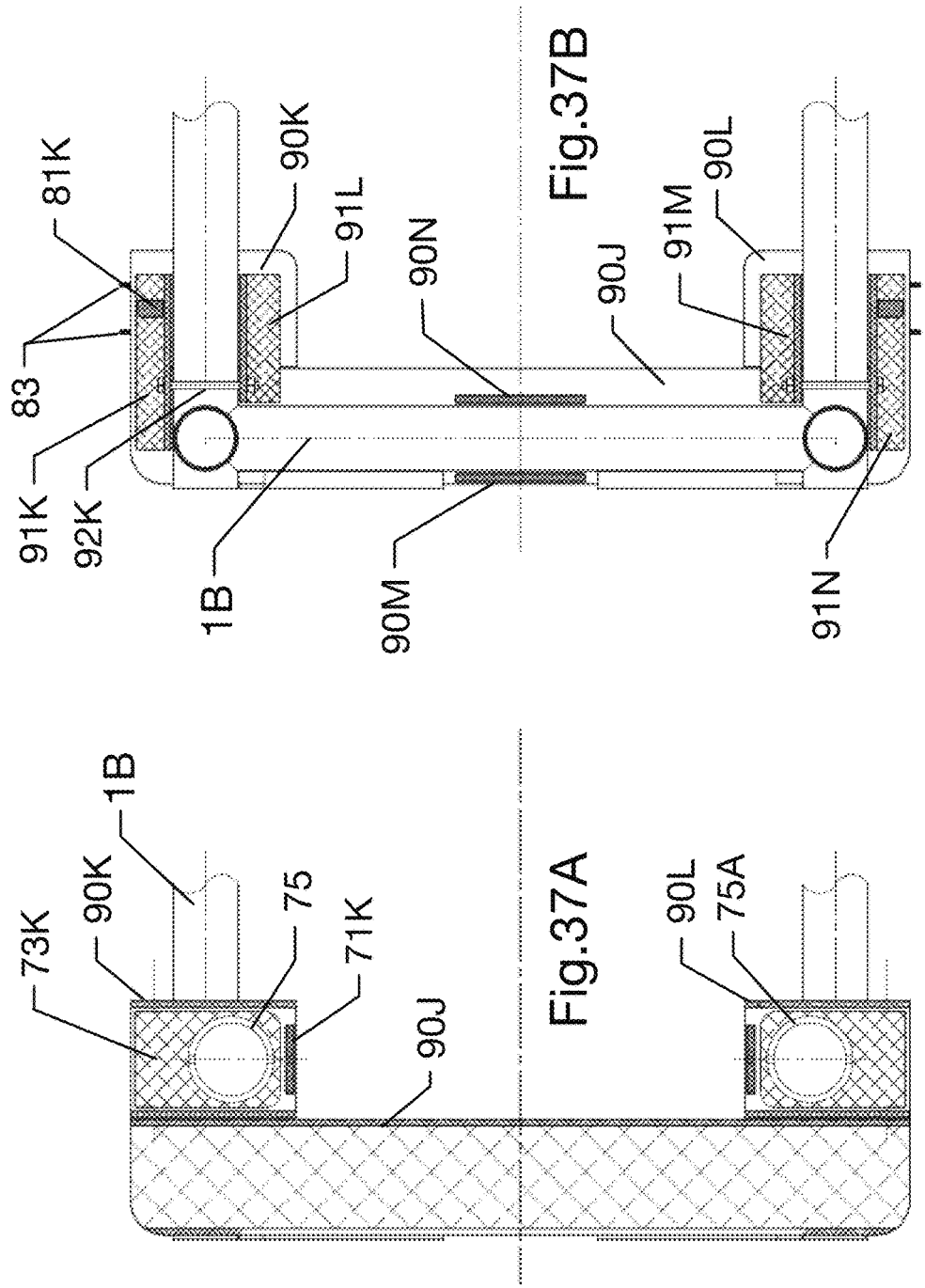
FIG. 37A is a reverse plan view of another embodiment of truss adaptor.
FIG. 37B is a plan view of the embodiment of the prior Figure.

As illustrated in FIG. 35, a bracket 99 or other feature can be provided at the top face of the truss with receiving detail for the stacking cone or other provision used in stacking another truss above. FIG. 36 illustrates a generic 20.5 truss 1B that has been adapted to permit pre-hanging, including loads from additional member 95, and which has been stacked atop a truss section 1 of "pre-hung" type.

Figure 39:
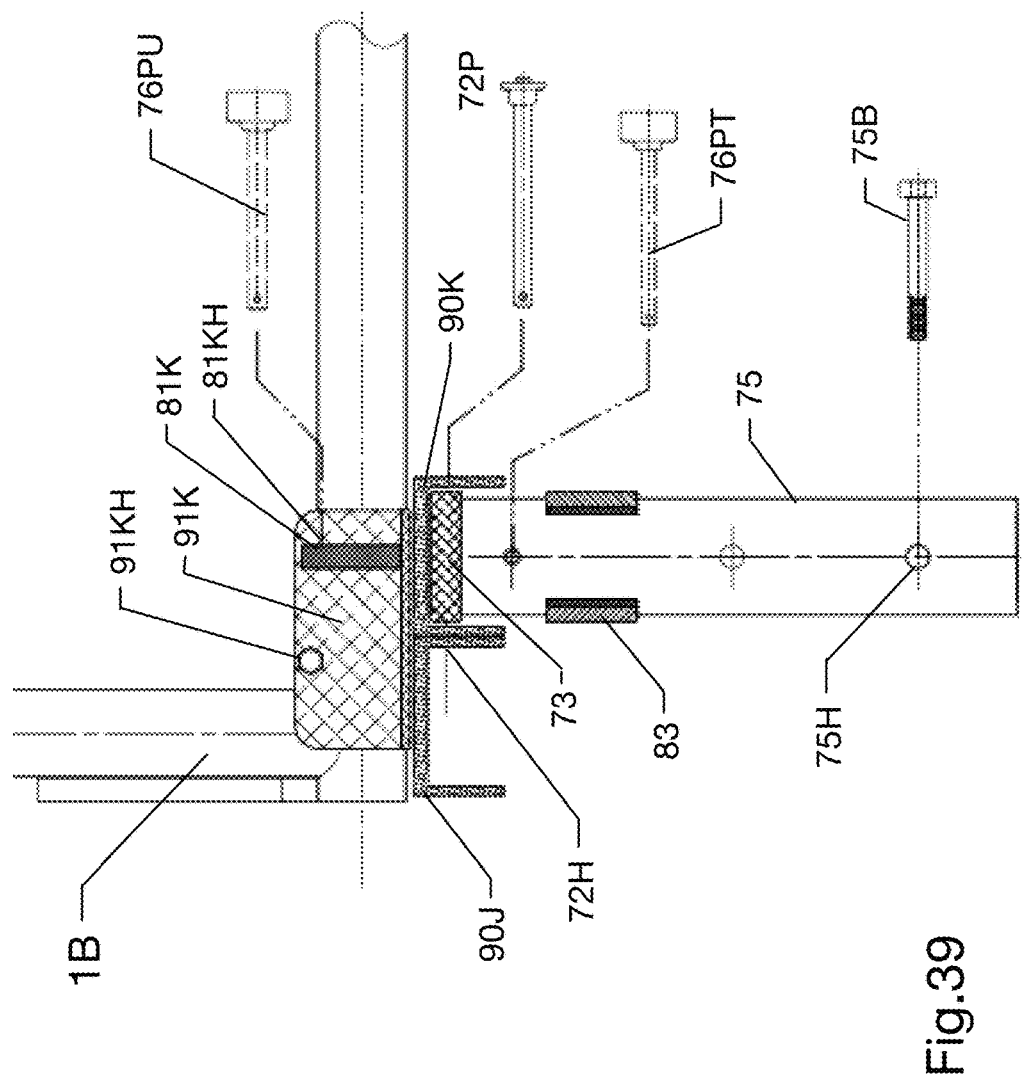
FIG. 39 is a side elevation of the truss adaptor of the prior Figures.

FIGS. 39A-39 illustrate another embodiment useable with a variety of truss types, as well as variations in constructional details of any such adaptor.

Channels are illustrated for structure. Channel section 90J extends substantially the width of truss section 1B and connects with short channel sections 90K and 90J. The relationship between the leg adaptor and the truss is fixed by brackets 91K-91N, which bracket the two lower elongated truss chords, and by locating tabs 90M and 90N, which bracket a truss cross-member spanning between them. The leg adaptor can be clamped to the truss in the previously illustrated manner, but is here illustrated as retained by fasteners (e.g., 92K) through pass holes in the brackets.

An alternative hinge design is illustrated. The leg sleeve 75 is retained in a dimensional part 73K, which also affords a pass hole 73H, which aligns with pass holes 72H in sections 90K (and in adjacent section 90J). Insertion of a locking pin 72P through aligned pass holes 72K and 73K produces a hinge fitting, which can be "split" for separation of the leg carriage from the bracket by removal of the locking pin, when desired.

Figure 38:
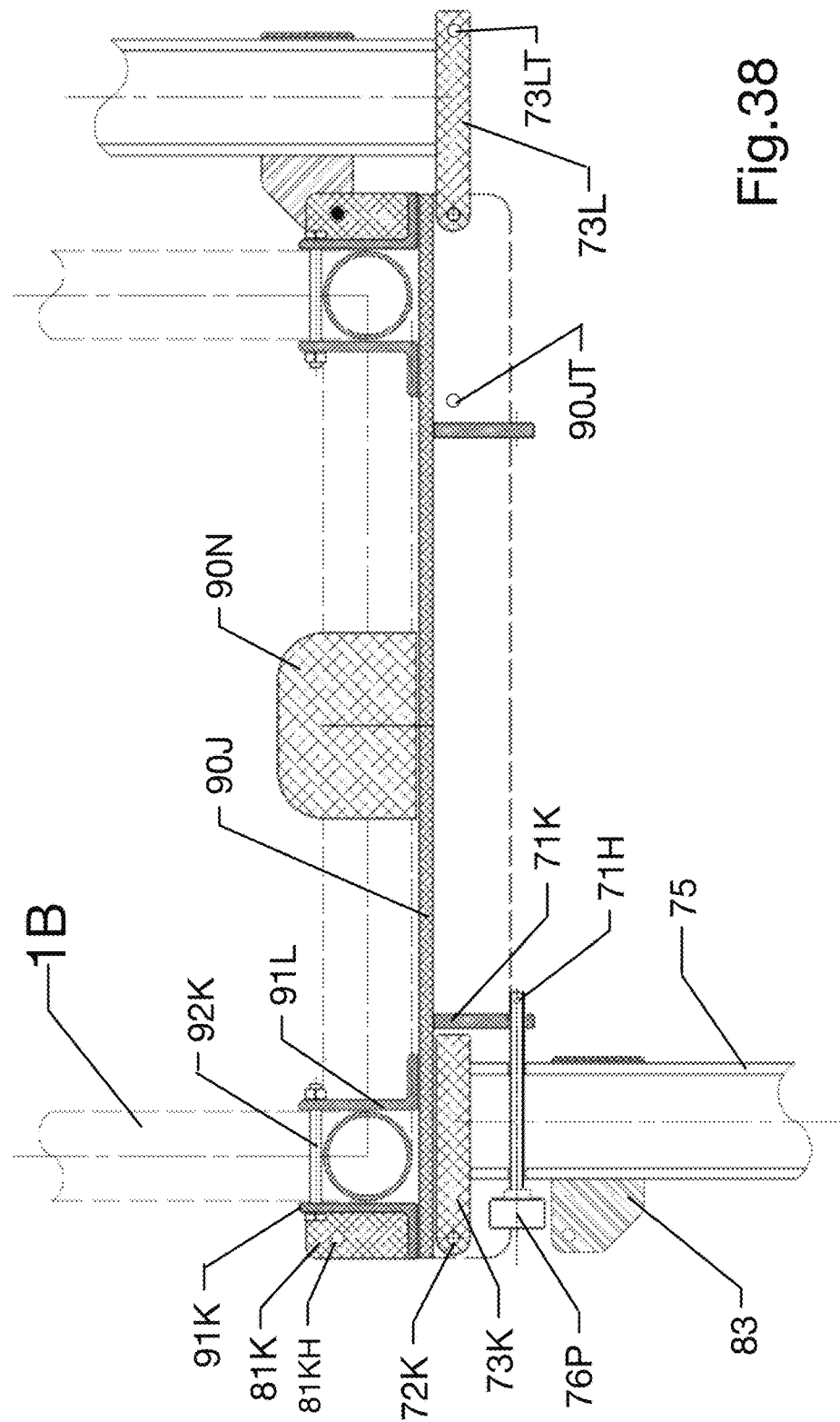
FIG. 38 is sectional view of the truss adaptor of the prior Figures.

The leg can be locked in its transport position by any suitable means, including a second set of pass holes parallel to holes 72K and 73K, such as 73LT and 90JT inboard of the first set. As seen in FIGS. 38 and 39, a method comparable to prior Figures can be employed, including a detail, such as bracket 71K, offering a hole 71H (or other feature) for accepting a locking pin 76P extending through or adjacent to leg sleeve 75, to fix the hinge closed.

The leg can be locked in one or more use positions by any suitable means, here illustrated as an "up-lock" similar to those seen in prior Figures. An up-lock bracket 81K is provided, here attached to bracket 91K, with at least one pass hole 91KH, that will align with a pass hole 83H in lower leg lock bracket 83 on leg sleeve 75. Locking pin 76P can be transferred from its travel lock position 76PT to an up-lock use position 76PU.

As is seen in FIG. 35, fixtures and other loads hung from a generic truss are not part-recessed in the truss structure itself, as is the case with the "pre-hung" type as illustrated in FIG. 31A, resulting in a taller total structure.

Figure 40:
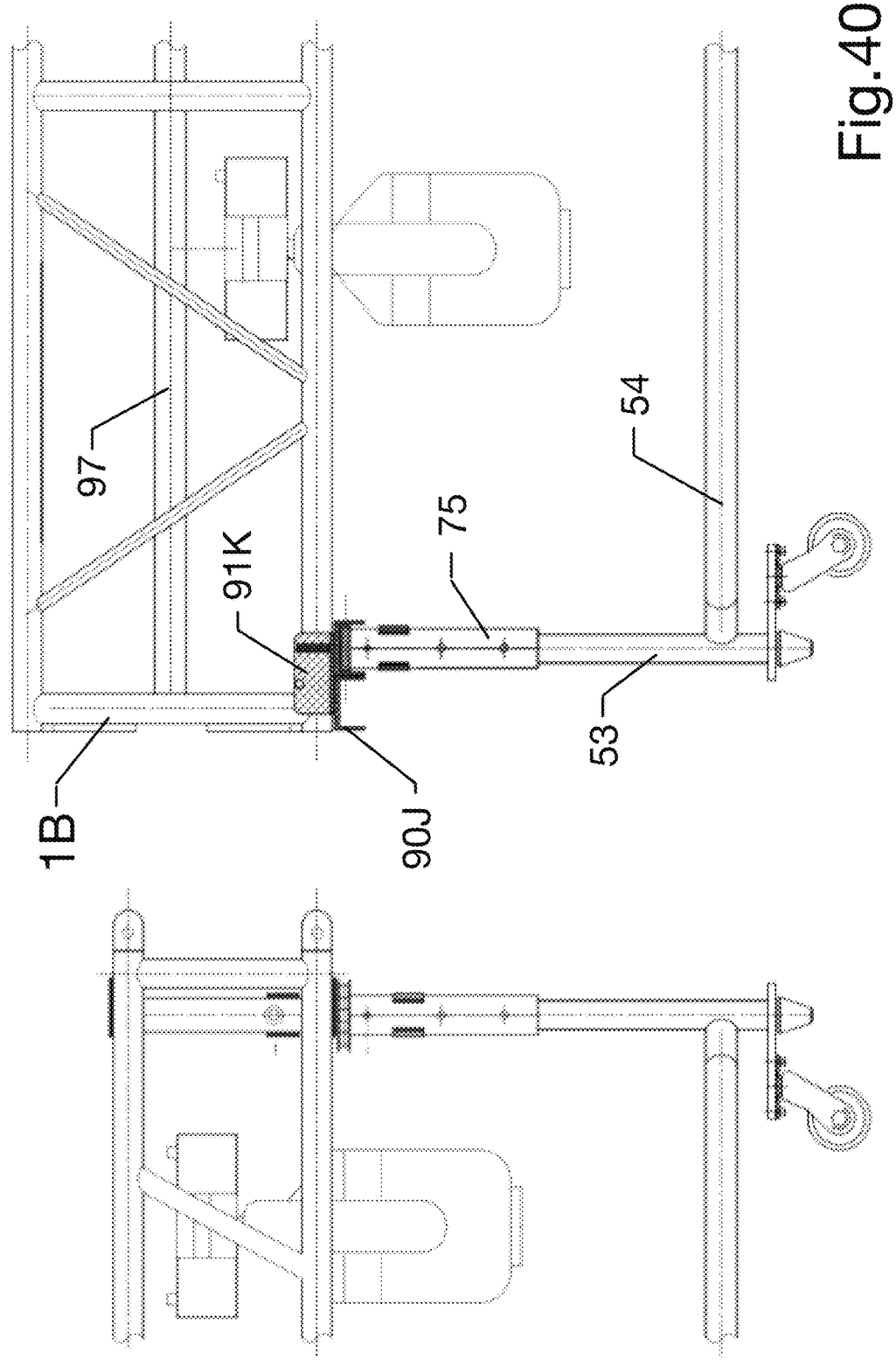
FIG. 40 is a comparative side elevation of the truss adaptor of the prior Figures as installed on the 20.5" truss type of FIG. 31B and of the hinged leg adaptor as installed on the "pre-hung" truss type of FIG. 31A, and showing an additional interior member 97 allowing part-recessing of fixtures within truss type 1B.

As seen in FIG. 40, provision can be made to support an elongated member 97 parallel with the main chords of the truss and also disposed within its interior, such that smaller fixtures are part-recessed within the truss cross-section, and protrude through openings between structural members in the nominal bottom face of the truss in a manner generally comparable to dedicated "pre-hung" types. The adaptor type illustrated in FIGS. 37A-39 has the advantage of minimizing obstruction of such openings in the bottom face of a truss.

Truss adaptors or cradles can be offered for different truss types/cross-sections, as well as models having points of attachment to a truss on different or re-settable spacings/centers to accommodate different truss types.

A modest investment in such adaptors/cradles and legs allows an owner of generic truss to quickly expand their inventory of "pre-hung" truss to meet their needs.

Improvements in Storage and Shipping

Efficient truss design requires addressing its transport and the conversion to and from that configuration and use, including the handling of components used in one mode, but not in the other.

Previously illustrated are methods of captivating stiffeners used in transport, but must be removed for use.

Figure 41:
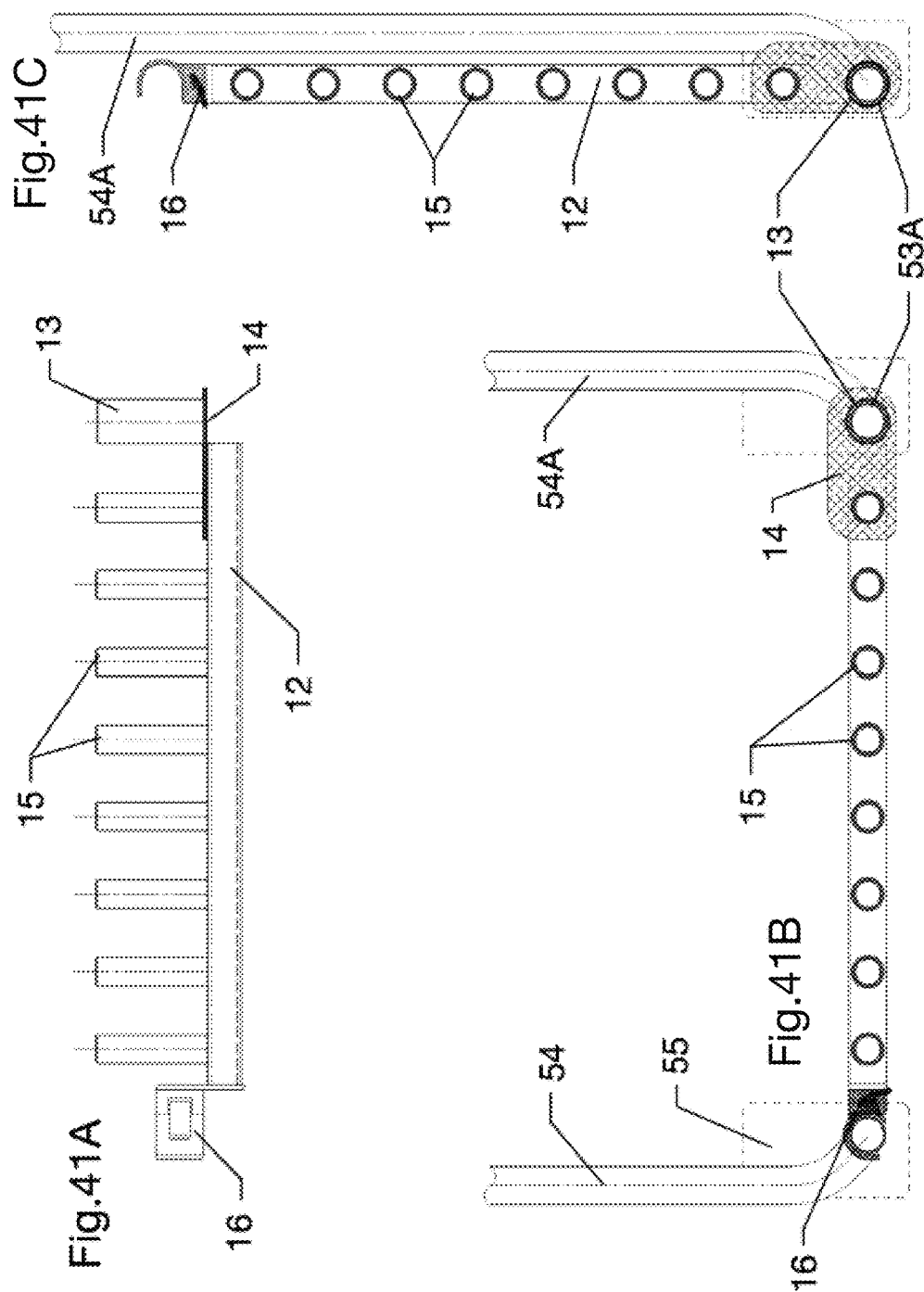
FIG. 41A is a side elevation of a rack for storage of leg carriages.
FIG. 41B is a plan view of the leg carriage storage rack of the prior Figure in use, shown spanning between the vertical legs of two such leg carriages.
FIG. 41C is a plan view of the leg carriage storage rack of the prior Figure in storage, folded against horizontal rail of one such leg carriage.
Figure 42:
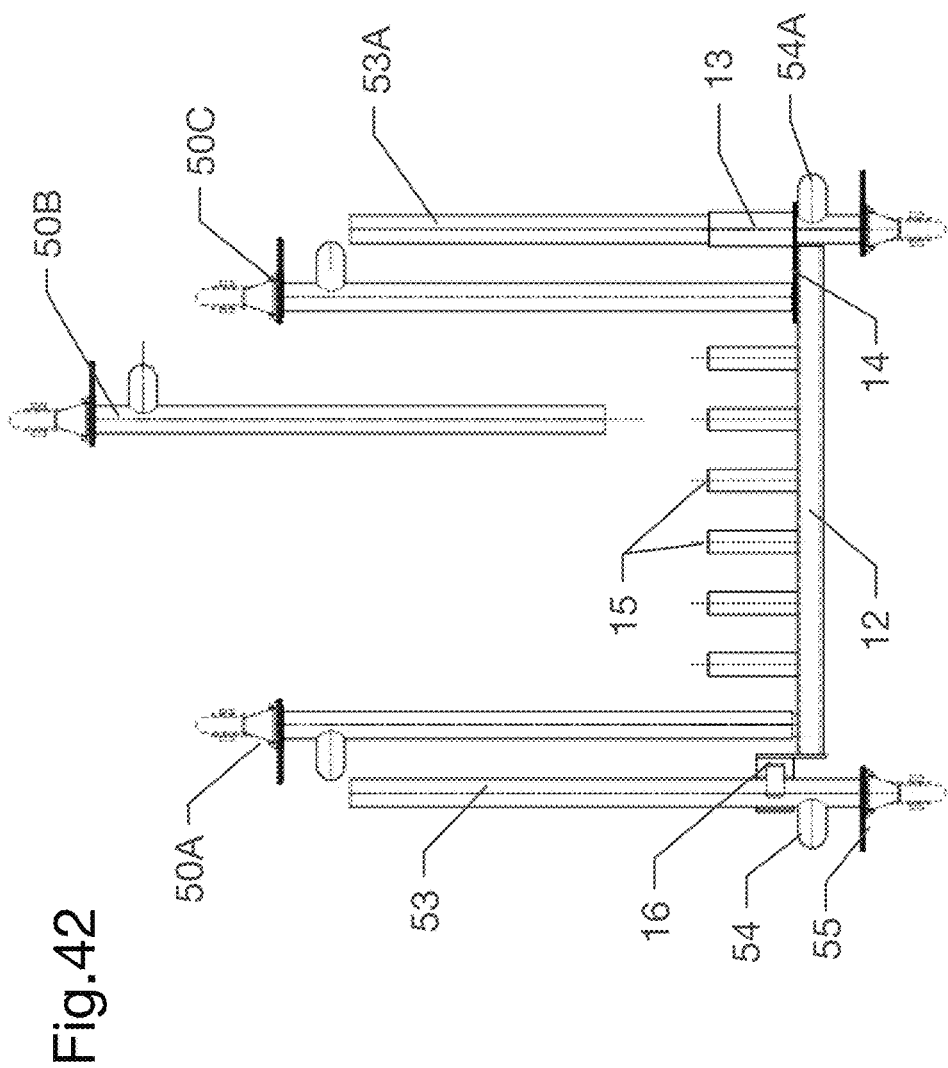
FIG. 42 is an elevation of the subject matter of FIG. 41B showing the assembled rack in use.

In another case, when leg carriages are removed from a "pre-hung" type truss section while it is in use (rather than being inverted on or hinged to the truss) it becomes necessary to store them, generally at a place distant from where they are removed and will later be re-attached. As an alternative to rolling or carrying leg carriages individually to a storage location, they might be collected and inverted, leg-down in groups in a pair of empty roadcases that had been used for other purposes, such as for shipping cable. Or they might be stored on a pair of the castered racks sold by Tyler Truss for the purpose, which have vertical studs to accept ten inverted leg carriages. Such racks are awkward both to use and to ship. Plates 41A-42 illustrate a simplified leg carriage storage approach, which uses an improved rack that can operate in a fashion similar to the captive snap brace of FIGS. 13-14B. Member 12 supports a plurality of vertical studs 15 over which the vertical legs of inverted leg carriages (e.g., 50A-50C of FIG. 42) will fit. At one end, plate 14 mounts a sleeve 13 that slips over the vertical leg 53A of a leg carriage, and rests atop the leg horizontal 54A. The free end of member 12 is here terminated in a "snap-latch" 16, as previously described in connection with stiffeners. Two leg carriages and two such racks together form a rolling rack for storage of leg carriages as is shown in end view in FIG. 42. As illustrated in FIG. 41C the improved rack, when not in use, folds against the horizontal (e.g., 53A) of the leg carriage around which it rotates, with the bottom of member 12 riding at or above the level of the horizontal, so that it does not prevent lifting the truss section with a forklift by means of the carriage horizontal. Therefore, the improved leg rack can be shipped attached to a leg carriage that is holding up a truss section, folding out for assembly of a leg rack with another such carriage and rack set when the leg carriage has been un-pinned from the truss section.

In co-pending applications, the applicant has disclosed a novel truss cross-section (illustrated in FIGS. 31D and 31E) having many advantages, including the labor and space savings of nested stacking.

The benefits of the applicant's truss cross-section are present in embodiments of various sizes. One approach to sizing them is to duplicate the chord-to-chord centers of truss designs in common current use, for reasons of user familiarity in planning and layout and to accommodate hanging hardware designed for such common truss types and their chord spacings.

The larger profile seen in FIG. 31D reproduces the chord-to-chord spacing of the Tyler GT truss on one nominally horizontal face and of standard "12×12" type on the other. The nominally vertical height of the truss section has been here chosen to equal that of 20.5" sections.

FIG. 31E illustrates a smaller version in which the chord spacings of 12×12 and 20.5" types are reproduced. The center, fifth chord is located so that its spacing to either chord on the wider side is also a 12×12 chord spacing, such that a stiffener/snap brace with the same spacing can be used or stored in any of the three directions, as desired.

Handling prior art generic truss sections in quantity requires stacking them and putting wheels under the stack. Dollies have long been known for the purpose, including in versions to attach casters to individual sections, or to stacks of multiple, parallel sections. Additional sections are stacked atop the bottom/castered level. Example designs are seen in FIGS. 9A-9O of the '426 application.

Although the applicant's 5-chord truss can be used with comparable dollies, FIGS. 43A-46E also illustrate an improved design, one additional aspect of which is integration with the transport of a pre-hung truss like the Dodd/Tyler. Even when a lighting package employs pre-hung truss for fixture support, generic truss will often also be employed for other purposes such as the support of cable, and where limited space and/or limited fixture count do not justify pre-hung truss use. Other departments on the same production might also employ generic trusses in quantity. This presents the problem that pre-hung trusses, while designed to stack on each other, differ significantly enough from generic trusses that the handling and shipping of the types are essentially two independent projects.

The applicant discloses a method of truss handling that is highly efficient in space and labor, and that achieves further efficiencies by integrating the pre-hung and other truss types.

Refer now to FIGS. 43A-43C, in which are seen three views of one truss dolly adaptor suitable for the applicant's 5-chord truss.

As here illustrated, a member 12M spans between two plates 14M and 14N, each of which mounts a sleeve (13M and 13N) that slip-fits over the vertical leg 53 of a leg carriage, and mounts a support block (14M and 14N) having grooves. FIGS. 44A and 44B are a composite plan view illustrating two such truss dolly adaptors slipped over the vertical legs of a facing pair of leg carriages, with FIG. 44B illustrating the dolly as having been loaded with truss sections, illustrating the passage through the truss structure of the leg vertical of the leg carriages used in assembling the dolly.

Grooves (e.g., 16MM and 16MW of block 16M) in the support block are spaced on the same centers as the nominal top and bottom chords of the truss 1D, such that, as will be seen in FIGS. 45B and 45C, chords of the truss section will nest in a set of grooves, whether the truss is oriented in its the "M" or the "W" rotation.

The standard Tyler leg assembly employs a canted flat plate 52 (also visible in the Dodd '913 figures) bracing the underside of the horizontal 54 from the plate 55 mounting both caster 56 and stacking cone 57. As shown in Figures, beveling the ends 12MB and 12MC of the member 12M to conform to the canted flat plate 52 (or other provision), under the weight of the trusses stacked, pushes and locks the dolly as a whole into square.

When not carrying truss sections, the dolly can be disassembled into its component parts, but as FIGS. 46A-46E illustrate, it can also be folded flat, with support 12 used in locking it so.

As FIGS. 48A-49C illustrate, 5-chord trusses can be stacked on a dolly, and, as illustrated in FIGS. 48A and 48B, truss dollies can be stacked on one another, the stacking cone 57 of one carriage accepted in the open end of the leg vertical 53 of the carriage below it below it. When trimmed leg carriages are used or additional height is desired for a tall stack, a leg extender 53X, as previously illustrated in FIG. 17B, can be employed, as illustrated in FIG. 48C.

The profile of the applicant's truss inherently interlocks laterally in stacking.

To align the truss ends in a stack and to prevent them shifting when less than all of the sections are pushed or encounter an obstruction, the sections can be manually aligned in stacking and then strapped together, in the known manner.

One or more details can be provided on the truss to assure alignment and its retention. FIGS. 47A and 47B illustrate but one approach, in which one or more "wings" 19 and 19A projecting from a section engage the tubing of the section stacked atop it (e.g., 9 and 9A), steering the section above into alignment as it is lowered and maintaining that alignment despite length-wise force applied unequally to the two sections. A single such detail can be provided on a truss section. Two "wings" can also be split between two different members on the section, for example at or near the two ends.

Figures 49A, 49B, 49C:
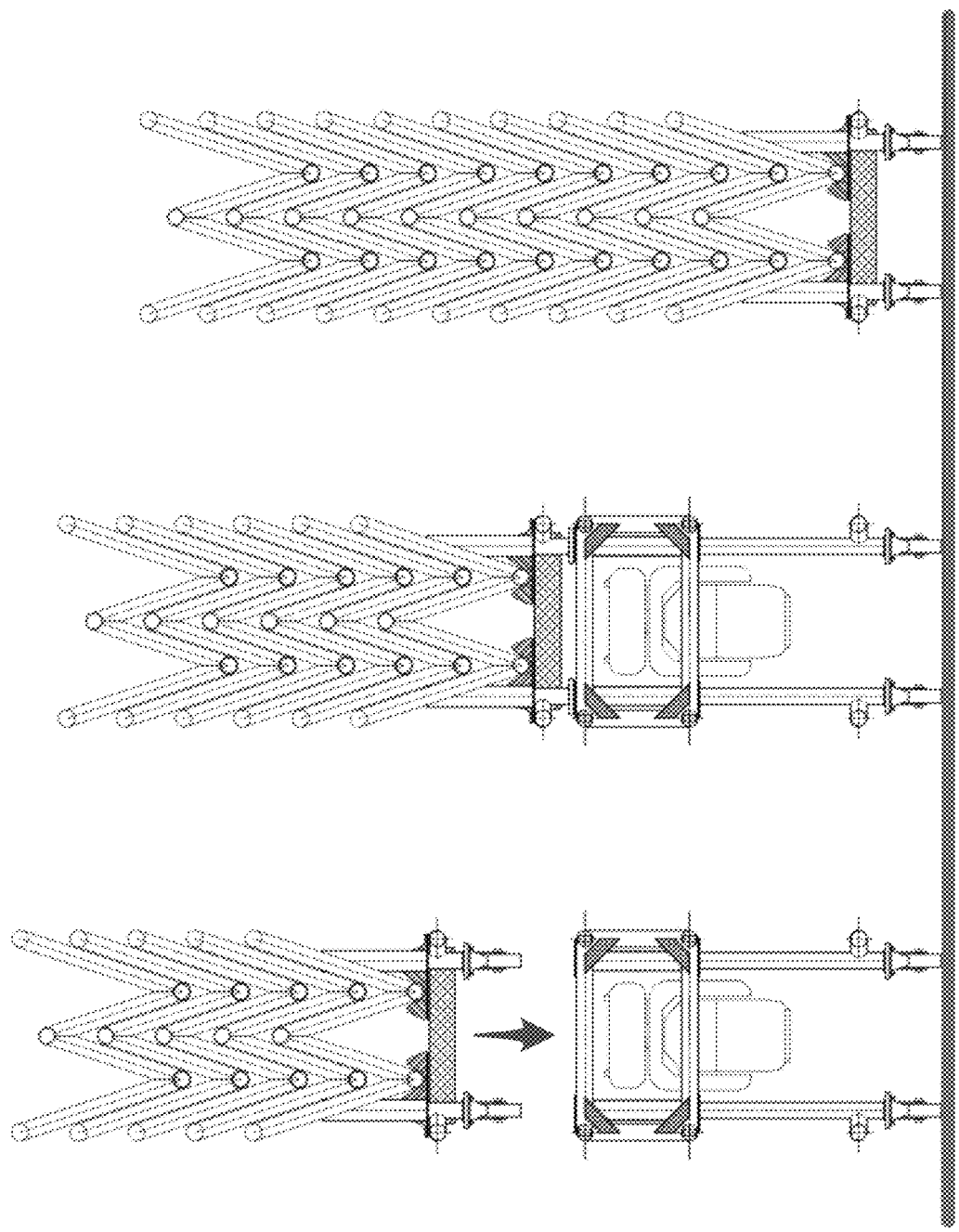
FIG. 49A is an end elevation illustrating the stacking a truss dolly atop a section of pre-hung truss.
FIG. 49B is an end elevation illustrating the two truss types stacked.
FIG. 49C illustrates a tall stack of truss on a single dolly.
Figure 50:
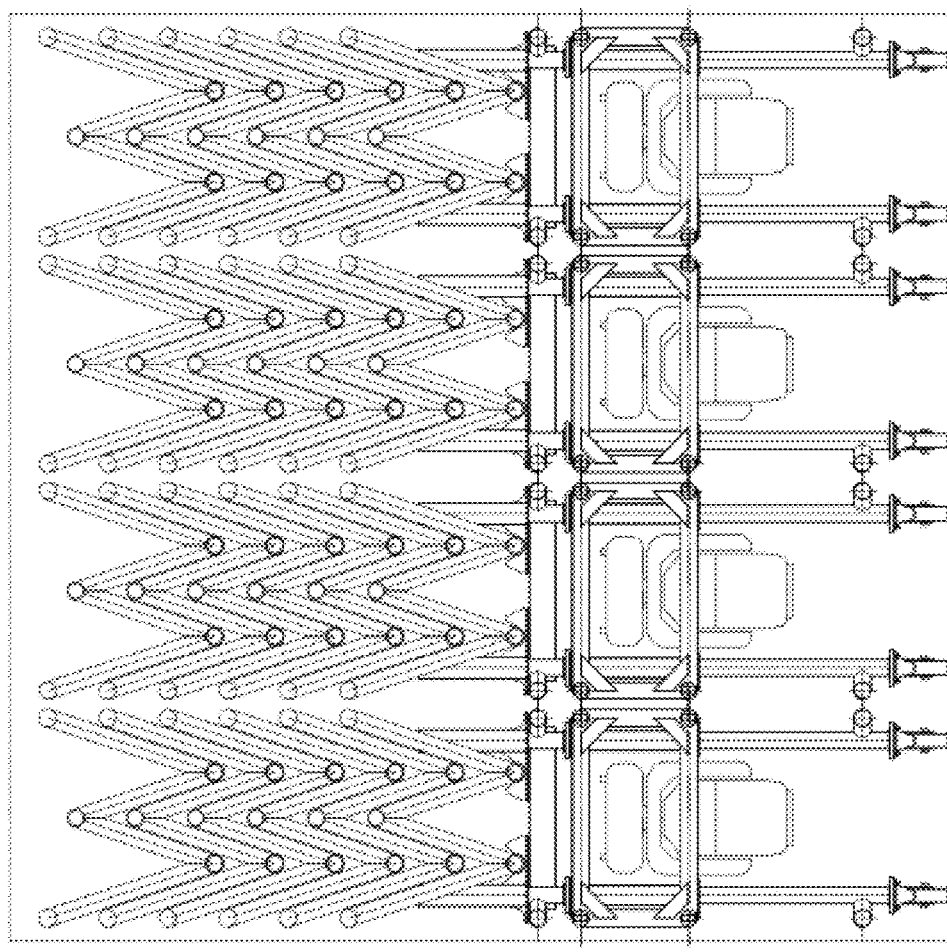
FIG. 50 illustrates four pre-hung truss sections and twenty-four 5-chord truss sections accommodated in a typical tractor-trailer width in four rolling units.

As illustrated in FIGS. 49A and 49B, the use of the disclosed truss dollies (or equivalents) also means that a stack of the applicant's 5-chord truss can be deposited atop a pre-hung truss section in the same manner as pre-hung is itself stacked, resulting in a single rolling unit that is highly efficient to handle and ship. FIG. 50 illustrates that a total of four pre-hung sections and twenty-four 5-chord sections can be carried in the width of a standard tractor-trailer.

Additional Figures illustrate additional improvements.

One known problem with the Dodd/Tyler design is mis-pinning of leg height adjustment. Mechanical stops are employed, but are attached to the leg vertical, such that different leg heights on the same project require keeping track of the leg carriages with stops (or markings) required for a given section.

FIGS. 51A and 51B illustrate a simpler solution. The leg receiving sleeve 40 of the truss is provided with spaced apart pass hole sets (e.g., 40L) through one of which a bolt or locking pin 41P is inserted, such that leg 53 can only be inserted in the receiver tube 40 until the leg is stopped by the fastener 41P. The leg height adjustment for a given truss is thus "programmed" in the section and no marks or mechanical stops are required on the leg carriage. A notch in the leg vertical (e.g., 53N) allows additional insertion.

FIGS. 52A and 53A illustrate a leg receiver tube that extends above the top surface of the truss, allowing for additional insertion of the leg vertical for lower floor clearance. It supports a cone 42C to receive the stacking cone 57T of a truss above. This raises caster 56T sufficiently above the top chord 24 of the truss on which it is stacked to prevent conflict between the two in stacking, eliminating the need for a worker at each end to manually rotate the casters inboard, which is potentially hazardous. Receiving cone 42C and stacking cone 57 can be provided with pass holes for locking pins, or latches, or other means to lock two stacked sections together for safety.

FIG. 51C illustrates a leg vertical 53G with features to reduce binding of the legs on insertion. The leg vertical tube is significantly smaller in diameter than is the diameter of the leg receiving tube 40. Bumpers 53H, 53J, and 53K are sized to fit the leg receiver tube. Alternatively, the cross-sectional shape of leg 53 can also be made an ovoid, with the smaller dimension on the long axis of the carriage.

It is often desirable to add lighting fixtures to a truss or other structure that are hung at an angle their mounting axis (nominal fixture "pan") other than vertical. FIG. 53A illustrates a fixture 7 mounted to top chord 24 of a truss using a known half-cheseboro or scaffold-type clamp 80. Yoke 7Y of the fixture 7 is fixed to the clamp 80 by a bolt 80B through a pass hole in the yoke, permitting rotation of the yoke and fixture about the now-horizontal axis through the mounting. As such, for proper appearance, the fixture must be adjusted so that the long axis of the yoke (and therefore fixture) is parallel with the truss chord or other member to which is it mounted. In handling, such rotational alignment can be disturbed, resulting in a visibly off-kilter fixture, requiring correction.

FIGS. 53C and 53C illustrate a simple solution. Shape 85, which could be an extrusion, has a toothed profile 85T on one face and a return 85R or similar detail on the other. A pass hole 85H is provided for a bolt (e.g., 80B) used to fix a fixture to a clamp (e.g., 80) by means of its yoke 7Y and the pass hole therein.

Shape 85 is placed against the face of clamp 80 with its return 85R aligned against an edge 80E of the clamp 80. Shape 85A is placed against the yoke 7Y of the fixture with its return 85AR aligned against an edge 7YE of yoke 7Y. The toothed profiles of the two shapes are meshed together. Bolt 80B is threaded through pass hole 7YH of yoke 7Y, the pass holes in both shape 85 and 85A (e.g., hole 85H in shape 85), and threaded into tapped hole 80H in clamp 80. Tightening bolt 80B locks the relationships between clamp 80 and shape 85, shapes 85 and 85A, and shape 85A and yoke 7Y. Thus, the fixture is locked in correct rotational alignment. The elongated pass hole (e.g. 85H) in the shape allows varying the distance between the bolt and the shape's return (e.g., 85R) to adjust to different clamp and yoke designs. Most clamps employed have a rectangular face at their attachment point, so that the same parts can also be used to lock a fixture with its yoke axis rotated at right angles to the centerline of the member mounted to. Other shapes/features can be used for interlocking. And the face of a clamp can incorporate such a feature.

Outboard mounting of fixtures, as illustrated in FIG. 53A, is time-consuming because such fixtures cannot be shipped in position on the truss. They must be re-hung internally in the truss for transport or packed in a separate case, and be both hung and plugged for use at setup.

FIGS. 54A-54C illustrate one method of eliminating such operations. FIG. 54A and detail FIG. 54B illustrate in section a pre-hung truss, here employing the applicant's hinging of the leg carriage. The horizontal rail 54S of the leg carriage illustrated here as being square in section with a nut track 54T included. A "trunnion" bracket 86 is terminated in a shape 86F that conforms to the profile of horizontal 54S and is bolted to the track 54T with a fastener 54B. A trunnion 86 attaches to each end of the fixture 7, in the known manner. Fixture 7 attached to horizontal 54S is shown with the leg carriage folded up and locked in the use position, the fixture in a comparable placement to the conventional attachment seen in FIG. 54A. Yet, when the leg carriage is folded down to transport position (as illustrated with leg 53A and its horizontal), the fixture 7A attached is tucked inside the truss envelope and can be shipped without need of removal. A fixture (e.g., 8 in FIG. 54C) can be designed to mount to a leg horizontal.

Other horizontal rail shapes and mounting methods are possible.

FIG. 55 is a view of the underside of a motorized fixture comparable to fixture 6 in prior Figures. The base enclosure 6B, which includes electronics, in and thru power and data connections, pan actuator, and fixture mounting means is of narrow width (which is an advantage when hung) and includes fold-out legs 6FA and 6FB to stabilize the fixture when floor-supported. A feature is shown for direct attachment of a clamp or hanger such as clamp 85 in prior Figures or a standard theatrical "c-clamp". A keyhole slot 86 is formed in the bottom surface 6BP of base enclosure 6B. The slot has a wider and narrower portion. The wider portion 86A accepts the head of a standard ½" hex bolt with two opposing flat sides parallel with the slot edges. The bolt is then slid in the slot towards the narrower portion 86B, past two inward projections 86C in the face of the panel 6BP located between the portions 86A and 86B. Preferably the projections are ramped on the side of the wider opening and perpendicular. A leaf spring or other means urges the bolt head towards the panel 6BP. Once past the projections, the bolt is captive in the narrower portion of the slot, which is sized to the thread diameter and less than the width of the bolt head. The clamp or hanger is then threaded onto the projecting bolt until tight against the base enclosure panel, fixing the former to the enclosure. Receptacles 87 can be provided to accept known quarter-turn fasteners used to rapidly attach clamps and other hanging hardware.

The text and drawings herein are disclosures, including some possible embodiments, and the inventions herein and other embodiments of them not be understood as limited.

What is claimed is:

1. A truss section, said truss section being elongated and having two ends, each of said ends suitable for mechanically coupling said truss section with another one of said truss sections, said truss section having an elongated central axis extending between said ends, a first elongated chord, said first chord extending between said ends, said first chord being substantially parallel to said central axis, a second elongated chord, said second chord extending between said ends, said second chord being substantially parallel to and spaced apart from said first chord, a third elongated chord, said third chord extending between said ends, said third chord being substantially parallel to and spaced apart from said first chord and said second chord, a fourth elongated chord, said fourth chord extending between said ends, said fourth chord being substantially parallel to and spaced apart from said first, said second, and said third chords, first cross-members mechanically connecting said first chord with said second chord, second cross-members mechanically connecting said second chord with said third chord, third cross-members mechanically connecting said third chord with said fourth chord, said four chords and said cross-members together defining a first volume, said first volume being substantially rectangular in cross-section and having, at least between said ends, one substantially unobstructed side, first and second leg carriages, said leg carriages each having at least a first and a second elongated leg, said first and said second elongated leg each having one and another end;

said leg carriages also having an additional elongated structural member, said additional elongated member having first and second ends, and being attached at said first end to said first leg proximate to said one end of said first leg, said additional elongated member being attached at said second end to said second leg proximate to said one end of said second leg, each of said leg carriages having at least two casters, one of said casters being attached to each said leg, proximate to said one end of said leg, the improvement comprising said another ends of said first and said legs of said leg carriage being attached to said truss structure so as to permit rotation of said leg carriage between:

a first position, in which said additional elongated members of said first and second leg carriages are parallel to each other and to said chords, and said legs of said first and said second leg carriages are parallel to each other, said additional elongated members and said first and said fourth chords of said truss defining a second volume, said second volume adjacent said substantially unobstructed side of said first volume, generally rectangular in cross-section, and at least equal in area to said first volume, and at least a second position in which said additional elongated members of said carriages have been rotated to positions closer to said second and said third chords than to said first and said fourth chords.

2. The improvement according to claim 1, wherein said first and said second leg carriages can be detached from said truss structure.

3. The improvement according to claim 1, wherein said legs of said first and said second leg carriages can be adjusted in length, such that said cross-section of said second volume can be altered.

4. The improvement according to claim 1, wherein said first and said second legs of said leg carriage can be fixed in each of a plurality of said second positions.

5. The improvement according to claim 1, wherein said first and said second legs of said leg carriage can be fixed in a said second position wherein said legs are substantially parallel to said first cross-members.

6. A truss section, said truss section being elongated and having two ends, each of said ends suitable for mechanically coupling said truss section with another one of said truss sections, said truss section having an elongated central axis extending between said ends, a first elongated chord, said first chord extending between said ends, said first chord being substantially parallel to said central axis, a second elongated chord, said second chord extending between said ends, said second chord being substantially parallel to and spaced apart from said first chord, a third elongated chord, said third chord extending between said ends, said third chord being substantially parallel to and spaced apart from said first chord and said second chord, a fourth elongated chord, said fourth chord extending between said ends, said fourth chord being substantially parallel to and spaced apart from said first, said second, and said third chords, first cross-members mechanically connecting said first chord with said second chord, second cross-members mechanically connecting said second chord with said third chord, third cross-members mechanically connecting said third chord with said fourth chord, said four chords and said cross-members together defining a first volume, said first volume being substantially rectangular in cross-section and having, at least between said ends, one substantially unobstructed side, first and second leg carriages, said leg carriages each having at least a first and a second elongated leg, said first and said second elongated leg each having one and another end;

said leg carriages also having an additional elongated structural member, said additional elongated member having first and second ends, and being attached at said first end to said first leg proximate to said one end of said first leg, said additional elongated member being attached at said second end to said second leg proximate to said one end of said second leg, each of said leg carriages having at least two casters, one of said casters being attached to each said leg, proximate to said one end of said leg, said truss section having receptacles suitable for receiving said another end of said first and said second leg, the improvement comprising a hinge disposed in each of said first and said second legs between said first and said second ends of said leg.

7. The improvement according to claim 6, wherein said first and said second leg carriages can be detached from said truss structure.

8. The improvement according to claim 6, wherein said legs of said first and said second leg carriages can be adjusted in length, such that said cross-section of said second volume can be altered.

9. The improvement according to claim 6, wherein said leg carriage can be fixed in each of a plurality of positions relative to said truss.

* * * * *